(12) United States Patent
Simoneau

(10) Patent No.: US 10,308,759 B2
(45) Date of Patent: Jun. 4, 2019

(54) ALIPHATIC POLYCARBONATE POLYOL COMPOSITIONS

(71) Applicant: Saudi Aramco Technologies Company, Dhahran (SA)

(72) Inventor: Christopher A. Simoneau, Oxford, CT (US)

(73) Assignee: Saudi Aramco Technologies Company, Dhahran (SA)

( * ) Notice: Subject to any disclaimer, the term of this patent is extended or adjusted under 35 U.S.C. 154(b) by 151 days.

(21) Appl. No.: 15/301,095

(22) PCT Filed: Apr. 3, 2015

(86) PCT No.: PCT/US2015/024299
§ 371 (c)(1),
(2) Date: Sep. 30, 2016

(87) PCT Pub. No.: WO2015/154001
PCT Pub. Date: Oct. 8, 2015

(65) Prior Publication Data
US 2017/0022319 A1    Jan. 26, 2017

Related U.S. Application Data

(60) Provisional application No. 61/974,500, filed on Apr. 3, 2014.

(51) Int. Cl.
| | |
|---|---|
| *C08G 63/64* | (2006.01) |
| *C08G 64/42* | (2006.01) |
| *C08G 64/02* | (2006.01) |
| *C08G 18/44* | (2006.01) |
| *C08G 18/72* | (2006.01) |

(52) U.S. Cl.
CPC ............. *C08G 63/64* (2013.01); *C08G 18/44* (2013.01); *C08G 18/72* (2013.01); *C08G 64/0216* (2013.01); *C08G 64/42* (2013.01)

(58) Field of Classification Search
CPC .... C08G 63/64; C08G 18/72; C08G 64/0216; C08G 64/42; C08G 18/44
See application file for complete search history.

(56) References Cited

U.S. PATENT DOCUMENTS

| | | | |
|---|---|---|---|
| 5,637,739 A | 6/1997 | Jacobsen et al. | |
| 5,663,393 A | 9/1997 | Jacobsen et al. | |
| 5,665,890 A | 9/1997 | Jacobsen et al. | |
| 5,929,232 A | 7/1999 | Jacobsen et al. | |
| 6,130,340 A | 10/2000 | Jacobsen et al. | |
| 6,309,997 B1 | 10/2001 | Fujita et al. | |
| 6,639,087 B2 | 10/2003 | Larrow et al. | |
| 6,844,448 B2 | 1/2005 | Jacobsen et al. | |
| 6,884,750 B2 | 4/2005 | Kim et al. | |
| 6,903,043 B2 | 6/2005 | Kim et al. | |
| 7,145,022 B2 | 12/2006 | Luinstra et al. | |
| 7,244,805 B2 | 7/2007 | Park et al. | |
| 7,674,873 B2 | 3/2010 | Coates et al. | |
| 8,163,867 B2 | 4/2012 | Lee et al. | |
| 8,207,365 B2 | 6/2012 | Zheng et al. | |
| 8,232,267 B2 | 7/2012 | Groves | |
| 8,247,520 B2 | 8/2012 | Allen et al. | |
| 8,252,955 B2 | 8/2012 | Gao et al. | |
| 8,461,290 B2 | 6/2013 | Carpentier et al. | |
| 8,470,956 B2 | 6/2013 | Allen et al. | |
| 8,507,733 B2 | 8/2013 | Ok et al. | |
| 8,598,309 B2 | 12/2013 | Jeong et al. | |
| 8,604,155 B2 | 12/2013 | Allen et al. | |
| 8,642,721 B2 | 2/2014 | Ok et al. | |
| 8,791,274 B2 | 7/2014 | Ok et al. | |
| 8,921,508 B2 | 12/2014 | Allen et al. | |
| 9,376,531 B2 | 6/2016 | Allen et al. | |
| 9,809,678 B2 | 11/2017 | Allen et al. | |
| 2010/0256329 A1 | 10/2010 | Nozaki et al. | |
| 2013/0150526 A1 | 6/2013 | Wamprecht et al. | |
| 2013/0296450 A1* | 11/2013 | Hofmann ............. | C08G 64/183 521/157 |
| 2014/0249279 A1 | 9/2014 | Williams et al. | |
| 2018/0022869 A1 | 1/2018 | Allen et al. | |

FOREIGN PATENT DOCUMENTS

| | | | |
|---|---|---|---|
| EP | 2465890 A1 * | 6/2012 | |
| JP | 2008-280399 A | 11/2008 | |
| WO | WO-2009/148889 A2 | 12/2009 | |
| WO | WO-2010/028362 A1 | 3/2010 | |
| WO | WO-2010/062703 A1 | 6/2010 | |
| WO | WO-2012/027725 A1 | 3/2012 | |
| WO | WO-2012/040454 A1 | 3/2012 | |
| WO | WO-2012/071505 A1 | 5/2012 | |
| WO | WO-2012/094619 A1 | 7/2012 | |
| WO | WO-2012/154849 A1 | 11/2012 | |
| WO | WO-2013/016331 A2 | 1/2013 | |
| WO | WO-2013/022932 A1 | 2/2013 | |
| WO | WO-2013/138161 A1 | 9/2013 | |
| WO | WO-2013/158621 A1 | 10/2013 | |
| WO | WO-2013/163442 A1 | 10/2013 | |
| WO | WO-2014/074706 A1 | 5/2014 | |
| WO | WO-2014/186397 A1 | 11/2014 | |

OTHER PUBLICATIONS

International Search Report for PCT/US15/024299, 3 pages (dated Jun. 11, 2015).
Shouping, X. and Min, Z., A novel carbon dioxide copolymer based aqueous polyurethane, China Synthetic Rubber Industry, Communication, 30(4): 310 (Jul. 15, 2007).

* cited by examiner

*Primary Examiner* — Rabon A Sergent
(74) *Attorney, Agent, or Firm* — Choate, Hall & Stewart LLP; Charles E. Lyon; John P. Rearick

(57) ABSTRACT

The present invention encompasses $CO_2$-based polycarbonate polyols that do not degrade from the chain ends to form cyclic carbonate. Importantly, the inventive polyol compositions retain —OH end group functionality desirable for thermoset applications.

55 Claims, 5 Drawing Sheets

ALIPHATIC POLYCARBONATE POLYOL COMPOSITIONS

CROSS REFERENCE TO RELATED APPLICATIONS

The present application claims priority to U.S. provisional patent application No. 61/974,500, filed Apr. 3, 2014, the entire contents of which are hereby incorporated by reference.

FIELD OF THE INVENTION

This invention pertains to novel aliphatic polycarbonate (APC) compositions having improved thermal and chemical stability, as well as methods of making, formulating and using these novel materials. Also provided are films and higher polymers made from the novel APC compositions, as well as articles coated with, made from, or incorporating these compositions.

BACKGROUND OF THE INVENTION

Aliphatic polycarbonate polyols derived from the copolymerization of carbon dioxide and epoxides such as those described in U.S. Pat. No. 8,247,520 have recently emerged as promising materials for use in thermoset applications. Applications include polyurethane foams (WO2012/071505), thermoplastic polyurethanes (WO2013/138161), adhesives (WO2013/158621), coatings (WO2012/071505), SPUR sealants (WO2013/163442), and composites (WO2012/040454).

$CO_2$-based polyols provide valuable features in these applications. Depending on the specific application, incorporation of these polyols can provide enhanced strength, high hardness, good adhesion, and UV resistance. However, incorporating these new polyols into thermoset formulations can present certain challenges. Among these challenges are high viscosity, variable compatibility with other polyols, sensitivity to certain urethane catalysts, and limited stability to extended heating.

There has been substantial effort to address the thermal instability of high molecular weight aliphatic polycarbonates derived from copolymerization of $CO_2$ and epoxides; however, all such methods addressing the issue depend on cross-linking or endcapping reactions. Such strategies can not be applied to polyols for thermoset applications since the —OH end groups of such polyols are a required feature for use in these applications and end-capping or cross-linking removes or masks the terminal —OH groups of the polymer chains.

Similarly, the present inventors have disclosed aliphatic polycarbonate polyol compositions with various endgroup modifications. Such end-group modifications introduce new functionality such as vinyl groups (WO2013/022932), epoxides (WO2012/094619), silanes (WO2013/163442), isocyanates (WO2013/138161) and various polar groups (WO2012/154849). Some of these modifications happen to also decrease the tendency of the polyols to degrade to cyclic carbonate at elevated temperature, but these modified compositions are no longer polyols in the strict sense since chain ends are no longer —OH groups.

As such, there remains a need for aliphatic polycarbonate polyols with improved stability, but which retain —OH end group functionality desirable for urethane and related thermoset applications.

SUMMARY OF THE INVENTION

Without being bound by theory or thereby limiting the scope of the present invention, it is believed that stability challenges encountered with epoxide-$CO_2$ based aliphatic polycarbonate polyols arise from the ability of these polycarbonate to 'unzip' from the chain ends to form stable 5-membered ring cyclic carbonates:

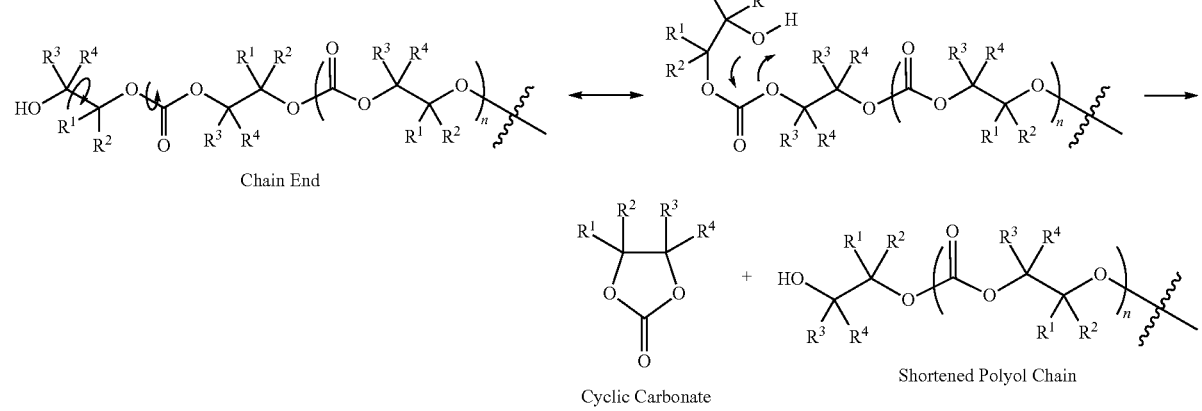

Chain End

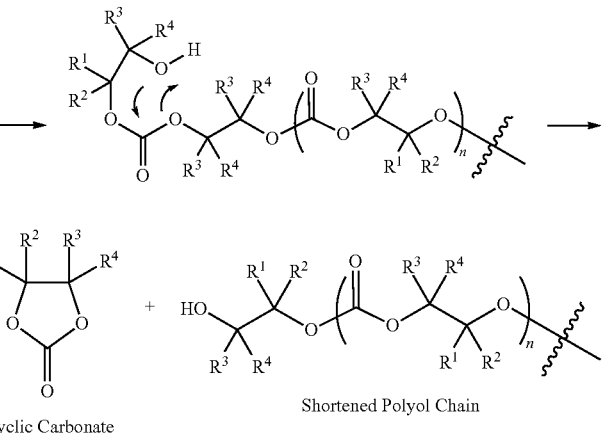

Cyclic Carbonate

Shortened Polyol Chain

Among other things, the present invention encompasses $CO_2$-based polycarbonate polyols that do not degrade from the chain ends to form cyclic carbonate. Importantly, the inventive polyol compositions retain —OH end group functionality desirable for thermoset applications.

In considering various approaches to solve this problem, several strategies were considered and found to be unsuitable. For example, simply treating the polycarbonate polyol with additional epoxide would seem to be a good solution. This strategy can prevent decomposition, but a problem arises since the new chain ends formed during epoxide end-capping can react with additional epoxide to produce polyethers. As such, it is not possible to ensure all chain ends of the polycarbonate chain have been derivatized without also producing polyether end groups. This leads to formation of mixtures, results in a relatively large increase in the molecular weight of the derivatized polymer and introduces ether linkages into the polymer chain which can be undesirable.

Acylating the end groups can also be performed (for example by addition of caprolactone or betabutyrolactone) but again, the process proceeds in such a way that formation of oligomers on the chain ends is unavoidable. Furthermore, most acylating conditions cause rapid degradation of epoxide-$CO_2$ based polycarbonates. Capping with acid anhydrides has been practiced for high molecular weight polymers, but this results in unreactive end-groups (as when acetic anhydride is used), or in —$CO_2H$ end groups in the case of cyclic anhydrides—in either case, the resulting materials are not suitable for urethane applications.

Against this backdrop, the present invention provides an efficient solution to the thermal and chemical instability of epoxide/$CO_2$-based polyols. Importantly, the inventive compositions have only —OH end groups, well defined structures, and contain little or no oligomerization on the chain ends. The inventive methods used to make these materials utilize readily available reagents and result in stable polyols suitable for thermoset applications.

In certain embodiments, provided polyol compositions have chain ends conforming to formula E1:

E1

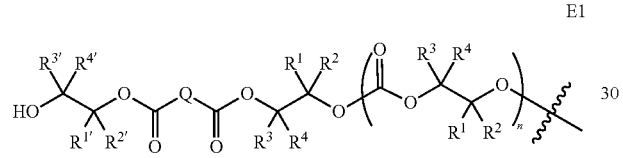

where n, $R^1$, $R^2$, $R^3$, $R^4$, $R^{1'}$, $R^{2'}$, $R^{3'}$, and $R^{4'}$ are as defined below and in the classes and subclasses herein, and -Q- is a bivalent moiety derived from an acid anhydride.

In certain embodiments, provided polyol compositions comprise polymer chains having a formula P1:

P1

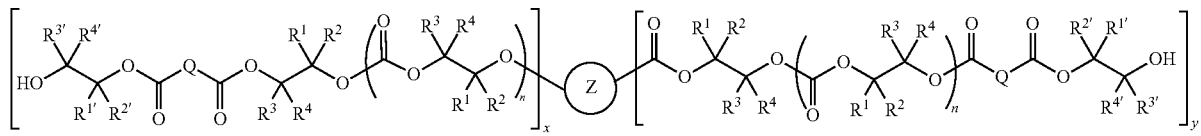

where Q is as defined above and each of $R^1$, $R^2$, $R^3$, $R^4$, $R^{1'}$, $R^{2'}$, $R^{3'}$, $R^{3'}$,

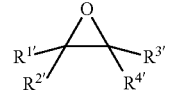

x, y, and n is as defined below and in the classes and subclasses herein.

In another aspect, the present invention encompasses methods of producing polycarbonates with chain ends of formula E1. In certain embodiments, such methods comprise the steps of reacting a polycarbonate polyol with end groups of formula

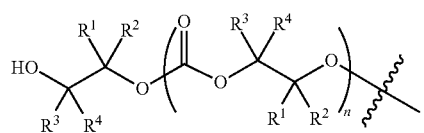

with a cyclic acid anhydride having a formula

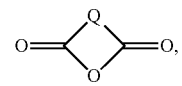

to provide a polycarbonate polyol with chain ends having a formula

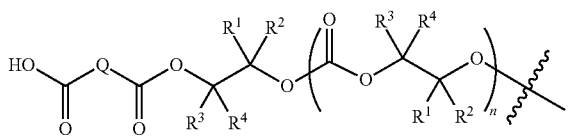

and then further treating this polyol with an epoxide of formula

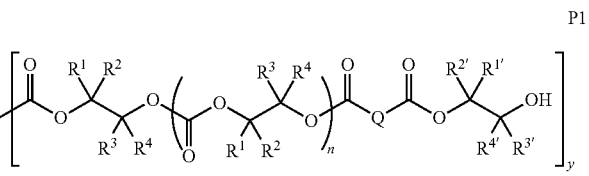

to yield a polymer composition with end groups having formula E1.

In another aspect, the present invention encompasses higher polymers resulting from the reaction of polymers of formula P1 with cross-linking agents. In certain embodiments, such cross-linging agents comprise polyisocyanates, melamine, phenol formaldehyde resins, and the like.

In another aspect, the present invention encompasses articles of manufacture comprising thermoset polymers derived from polyols of formula P1.

DEFINITIONS

Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5th Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3rd Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain embodiments, mixtures of enantiomers or diastereomers are provided.

Furthermore, certain compounds, as described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound or polymer is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., *Tetrahedron* 33:2725 (1977); Eliel, E. L. *Stereochemistry of Carbon Compounds* (McGraw-Hill, N.Y., 1962); Wilen, S. H. *Tables of Resolving Agents and Optical Resolutions* p. 268 (E. L. Eliel, Ed., Univ. of Notre Dame Press, Notre Dame, Ind. 1972).

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of substantially alternating units derived from $CO_2$ and an epoxide (e.g., poly(ethylene carbonate). In certain embodiments, a polymer of the present invention is a copolymer, terpolymer, heteropolymer, block copolymer, or tapered heteropolymer incorporating two or more different epoxide monomers. With respect to the structural depiction of such higher polymers, the convention of showing enchainment of different monomer units or polymer blocks separated by a slash may be used herein:

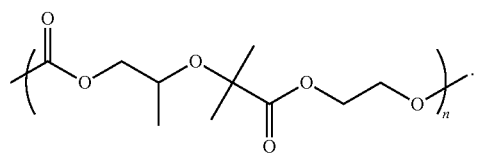

These structures are to be interpreted to encompass copolymers incorporating any ratio of the different monomer units depicted unless otherwise specified. This depiction is also meant to represent random, tapered, block co-polymers, and combinations of any two or more of these and all of these are implied unless otherwise specified.

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-40 carbon atoms. In certain embodiments, aliphatic groups contain 1-20 carbon atoms. In certain embodiments, aliphatic groups contain 3-20 carbon atoms. In certain embodiments, aliphatic groups contain 1-12 carbon atoms. In certain embodiments, aliphatic groups contain 2-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in some embodiments aliphatic groups contain 1-3 carbon atoms, and in some embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic," as used herein, refers to aliphatic groups wherein one or more carbon atoms are independently replaced by one or more atoms selected from the group consisting of oxygen, sulfur, nitrogen, or phosphorus. In certain embodiments, one to six carbon atoms are independently replaced by one or more of oxygen, sulfur, nitrogen, or phosphorus. Heteroaliphatic groups may be substituted or unsubstituted, branched or unbranched, cyclic or acyclic, and include saturated, unsaturated, or partially unsaturated groups.

As used herein, the term "bivalent moiety", refers to a bivalent aliphatic, heteroaliphatic, aryl, heteroaryl, or heterocyclic group as defined herein.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring system, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in some embodiments alkyl groups contain 1-3 carbon atoms, and in some embodiments alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in some embodiments alkenyl groups contain 2-3 carbon atoms, and in some embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in some embodiments alkynyl groups contain 2-3 carbon atoms, and in some embodiments alkynyl groups contain 2 carbon atoms. Representative alkynyl groups include, but are not limited to, ethynyl, 2-propynyl (propargyl), 1-propynyl, and the like.

The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy.

The term "acyl," as used herein, refers to a carbonyl-containing functionality, e.g., —C(=O)R', wherein R' is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like, where the radical or point of attachment is on the aryl ring. In certain embodiments, the terms "6- to 10-membered aryl" and "$C_{6-10}$ aryl" refer to a phenyl or an 8- to 10-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 12-membered heteroaryl" refers to a 5- to 6-membered heteroaryl ring having 1 to 3 heteroatoms independently selected from nitrogen, oxygen, or sulfur, or an 8- to 12-membered bicyclic heteroaryl ring having 1 to 4 heteroatoms independently selected from nitrogen, oxygen, or sulfur.

As used herein, the terms "heterocycle", "heterocyclyl", "heterocyclic radical", "heterocyclyl", "heterocyclyl ring", "heterocyclic group", "heterocyclic moiety" and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. Heterocyclic rings also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —$(CH_2)_{0-4}R°$; —$(CH_2)_{0-4}OR°$; —O—$(CH_2)_{0-4}C(O)OR°$; —$(CH_2)_{0-4}CH(OR°)_2$; —$(CH_2)_{0-4}SR°$; —$(CH_2)_{0-4}$-Ph, which may be substituted with R°; —$(CH_2)_{0-4}O(CH_2)_{0-1}$Ph which may be substituted with R°; —CH=CHPh, which may be substituted with R°; —$NO_2$; —CN; —$N_3$; —$(CH_2)_{0-4}N(R°)_2$; —$(CH_2)_{0-4}N(R°)C(O)R°$; —$N(R°)C(S)R°$; —$(CH_2)_{0-4}N(R°)C(O)NR°_2$; —$N(R°)C(S)NR°_2$; —$(CH_2)_{0-4}N(R°)C(O)OR°$; —$N(R°)N(R°)C(O)R°$; —$N(R°)N(R°)C(O)NR°_2$; —$N(R°)N(R°)C(O)OR°$; —$(CH_2)_{0-4}C(O)R°$; —C(S)R°; —$(CH_2)_{0-4}C(O)OR°$; —$(CH_2)_{0-4}C(O)N(R°)_2$; —$(CH_2)_{0-4}C(O)SR°$; —$(CH_2)_{0-4}C(O)OSiR°_3$; —$(CH_2)_{0-4}OC(O)R°$; —$OC(O)(CH_2)_{0-4}SR°$; —SC(S)SR°; —$(CH_2)_{0-4}SC(O)R°$; —$(CH_2)_{0-4}C(O)NR°_2$; —$C(S)NR°_2$; —C(S)SR°; —SC(S)SR°, —$(CH_2)_{0-4}OC(O)NR°_2$; —C(O)N(OR°)R°; —C(O)C(O)R°; —$C(O)CH_2C(O)R°$; —C(NOR)R°; —$(CH_2)_{0-4}SSR°$; —$(CH_2)_{0-4}S(O)_2R°$; —$(CH_2)_{0-4}S(O)_2OR°$; —$(CH_2)_{0-4}OS(O)_2R°$; —$S(O)_2NR°_2$; —$(CH_2)_{0-4}S(O)R°$; —$N(R°)S(O)_2NR°_2$; —$N(R°)S(O)_2R°$; —$N(OR°)R°$; —$C(NH)NR°_2$; —$P(O)_2R°$; —$P(O)R°_2$; —$OP(O)R°_2$; —$OP(O)(OR°)_2$; $SiR°_3$; —($C_{1-4}$ straight or branched alkylene)O—$N(R°)_2$; or —($C_{1-4}$ straight or branched alkylene)C(O)O—$N(R°)_2$, wherein each R° may be substituted as defined below and is independently hydrogen, $C_{1-8}$ aliphatic, —$CH_2$Ph, —$O(CH_2)_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R°, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R° (or the ring formed by taking two independent occurrences of R° together with their intervening atoms), are independently halogen, —$(CH_2)_{0-2}R^●$, -(haloR$^●$), —$(CH_2)_{0-2}$OH, —$(CH_2)_{0-2}OR^●$, —$(CH_2)_{0-2}CH(OR^●)_2$; —O(haloR$^●$), —CN, —$N_3$, —$(CH_2)_{0-2}C(O)R^●$, —$(CH_2)_{0-2}C(O)OH$, —$(CH_2)_{0-2}C(O)OR^●$, —$(CH_2)_{0-4}C(O)N(R°)_2$; —$(CH_2)_{0-2}SR^●$, —$(CH_2)_{0-2}SH$, —$(CH_2)_{0-2}NH_2$, —$(CH_2)_{0-2}NHR^●$, —$(CH_2)_{0-2}NR^●_2$, —$NO_2$, —$SiR^●_3$, —$OSiR^●_3$, —C(O)SR$^●$, —($C_{1-4}$ straight or branched alkylene)C(O)OR$^●$, or —SSR$^●$ wherein each R$^●$ is unsubstituted or where preceded by "halo" is substituted only with one or more halogens, and is independently selected from $C_{1-4}$ aliphatic, —$CH_2$Ph, —$O(CH_2)_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R° include =O and =S.

Suitable divalent substituents on a saturated carbon atom of an "optionally substituted" group include the following: =O, =S, =$NNR^*_2$, =NNHC(O)R*, =NNHC(O)OR*, =$NNHS(O)_2R^*$, =NR*, =NOR*, —$O(C(R^*_2))_{2-3}O$—, or —$S(C(R^*_2))_{2-3}S$—, wherein each independent occurrence of R* is selected from hydrogen, $C_{1-6}$ aliphatic which may be substituted as defined below, or an unsubstituted 5-6- membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^\dagger$, —NR$^\dagger_2$, —C(O)R$^\dagger$, —C(O)OR$^\dagger$, —C(O)C(O)R$^\dagger$, —C(O)CH$_2$C(O)R$^\dagger$, —S(O)$_2$R$^\dagger$, —S(O)$_2$NR$^\dagger_2$, —C(S)NR$^\dagger_2$, —C(NH)NR$^\dagger_2$, or —N(R$^\dagger$)S(O)$_2$R$^\dagger$; wherein each R$^\dagger$ is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^\dagger$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^\dagger$ are independently halogen, —R$^\bullet$, -(haloR$^\bullet$), —OH, —OR$^\bullet$, —O(haloR$^\bullet$), —CN, —C(O)OH, —C(O)OR$^\bullet$, —NH$_2$, —NHR$^\bullet$, —NR$^\bullet_2$, or —NO$_2$, wherein each R$^\bullet$ is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

When substituents are described herein, the term "radical" or "optionally substituted radical" is sometimes used. In this context, "radical" means a moiety or functional group having an available position for attachment to the structure on which the substituent is bound. In general the point of attachment would bear a hydrogen atom if the substituent were an independent neutral molecule rather than a substituent. The terms "radical" or "optionally-substituted radical" in this context are thus interchangeable with "group" or "optionally-substituted group".

As used herein, the "term head-to-tail" or "HT", refers to the regiochemistry of adjacent repeating units in a polymer chain. For example, in the context of poly(propylene carbonate) (PPC), the term head-to-tail is based on the three regiochemical possibilities depicted below:

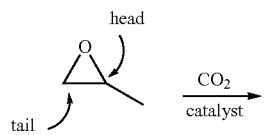

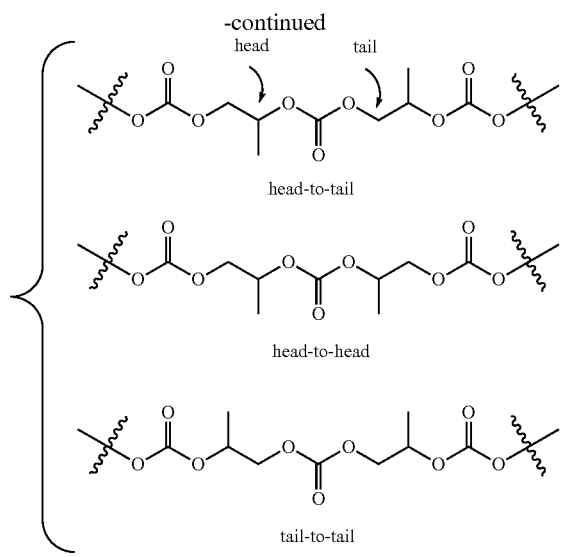

The term head-to-tail ratio (H:T) refers to the proportion of head-to-tail linkages to the sum of all other regiochemical possibilities. With respect to the depiction of polymer structures, while a specific regiochemical orientation of monomer units may be shown in the representations of polymer structures herein, this is not intended to limit the polymer structures to the regiochemical arrangement shown but is to be interpreted to encompass all regiochemical arrangements including that depicted, the opposite regiochemistry, random mixtures, isotactic materials, syndiotactic materials, racemic materials, and/or enantioenriched materials and combinations of any of these unless otherwise specified.

As used herein the term "alkoxylated" means that one or more functional groups on a molecule (usually the functional group is an alcohol, amine, or carboxylic acid, but is not strictly limited to these) has appended to it a hydroxy-terminated alkyl chain. Alkoxylated compounds may comprise a single alkyl group or they may be oligomeric moieties such as hydroxyl-terminated polyethers. Alkoxylated materials can be derived from the parent compounds by treatment of the functional groups with epoxides.

As used herein the phrase "taken together with an R-group on a nearby carbon atom to form an optionally substituted ring" means that a variable chemical group thus described can be joined (either by a direct bond or via one or more atoms) to another variable chemical group (the R-group) on a carbon atom in the proximity of the atom to which the variable chemical group being defined is attached: for example the variable chemical group could be joined to an R group on an adjacent carbon atom (i.e. to a carbon atom directly bonded to the atom to which the R-group is attached); or the variable chemical group could be joined to an R group on a carbon atom two to six atoms away from the atom on which the variable chemical group is attached. For example, if the language "taken together with an R-group on a nearby carbon atom to form an optionally substituted ring" is used to describe R$^e$ in a structure

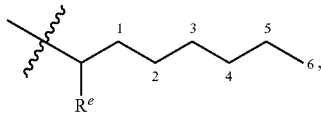

R$^e$ could be joined with an R-group attached to any of the carbon atoms labeled 1-6 in the structure.

Unless otherwise specified, "a," "an," "the," and "at least one" are used interchangeably and mean one or more than one.

DETAILED DESCRIPTION OF CERTAIN EMBODIMENTS

I. Polyol Compositions

Figure 1:
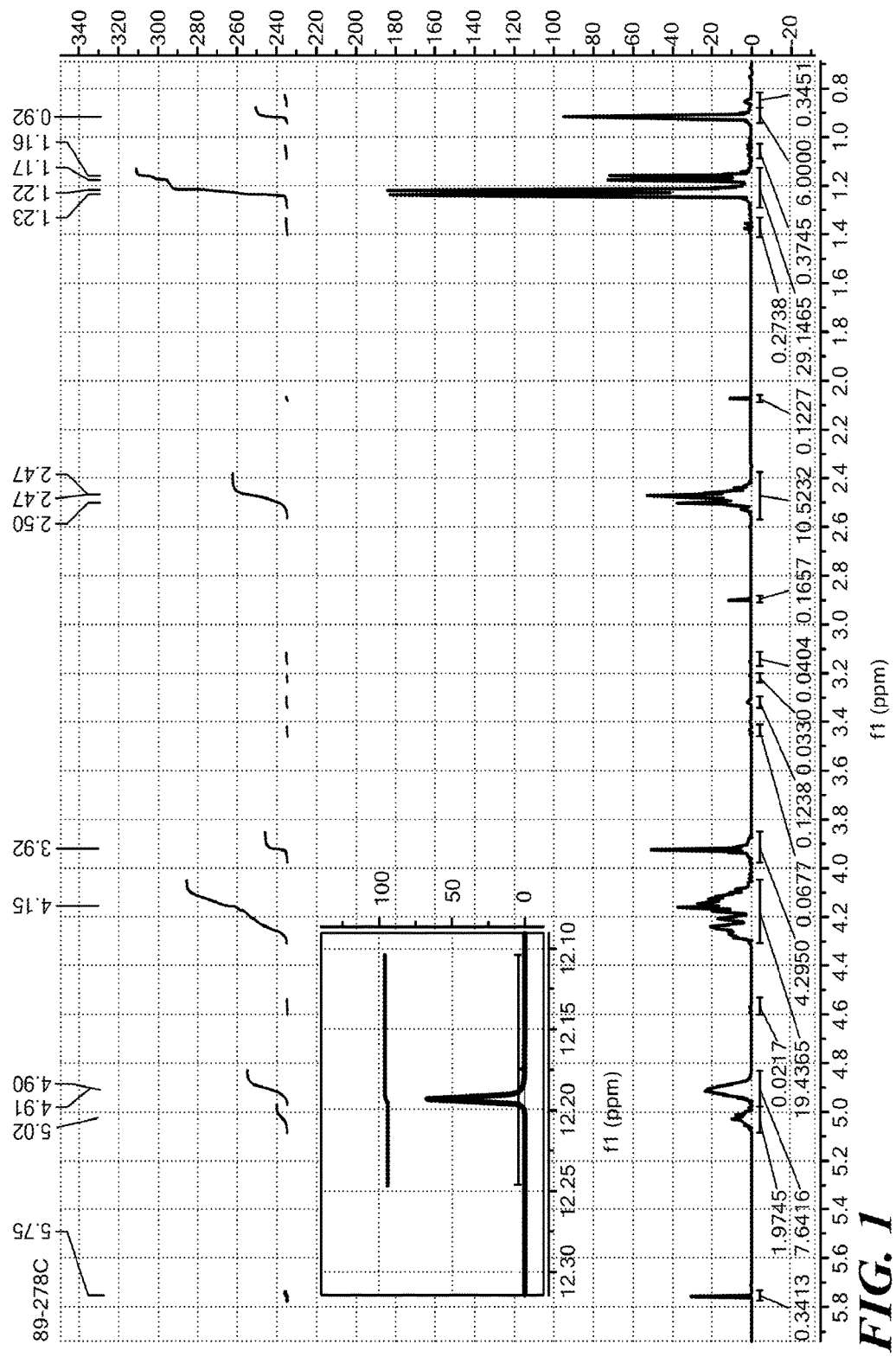
FIG. 1 depicts a $^1$H-NMR of the product of step 1a of Example 1.

The present invention provides, among other things, novel aliphatic polycarbonate polyols. These materials comprise polymer chains having repeat units conforming to the formula:

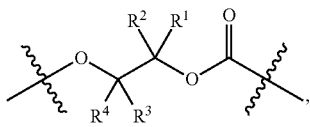

where R$^1$, R$^2$, R$^3$, and R$^4$ are, at each occurrence in the polymer chain, independently selected from the group consisting of —H, fluorine, an optionally substituted C$_{1-40}$ aliphatic group, an optionally substituted C$_{1-20}$ heteroaliphatic group, and an optionally substituted aryl group, where any two or more of R$^1$, R$^2$, R$^3$, and R$^4$ may optionally be taken together with intervening atoms to form one or more optionally substituted rings optionally containing one or more heteroatoms.

In certain embodiments, aliphatic polycarbonate polyols of the invention incorporate copolymers derived from one or more epoxides and carbon dioxide. In certain embodiments, copolymers are derived from ethylene oxide, propylene oxide, 1,2 butene oxide, 1,2 hexene oxide, oxides of higher alpha olefins (e.g. C$_{6-40}$ alpha olefins), butadiene monoepoxide, styrene oxide, epichlorohydrin, ethers or esters of glycidol, cyclopentene oxide, cyclohexene oxide, 3 vinyl cyclohexene oxide, 3-ethyl cyclohexene oxide, and combinations of any two or more of these.

In certain embodiments, aliphatic polycarbonate polyols of the invention incorporate copolymers derived from propylene oxide. In certain embodiments, aliphatic polycarbonate polyols of the invention incorporate copolymers derived from propylene oxide and one or more additional epoxides. In certain embodiments, aliphatic polycarbonate polyols of the invention incorporate copolymers derived from ethylene oxide. In certain embodiments, aliphatic polycarbonate polyols of the invention incorporate copolymers derived from ethylene oxide and one or more additional epoxides.

In another embodiment, aliphatic polycarbonate polyol compositions encompassed by the present invention comprise polymer chains having a formula P1:

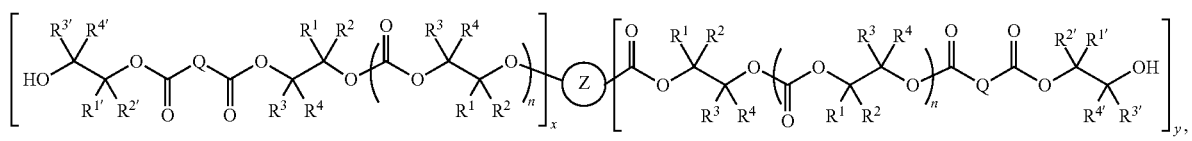

P1 where each of R$^1$, R$^2$, R$^3$, and R$^4$ are as defined above and in the classes and subclasses herein;

R$^{1'}$, R$^{2'}$, R$^{3'}$, and R$^{4'}$ are at each occurrence, independently selected from the group consisting of —H, fluorine, an optionally substituted C$_{1-40}$ aliphatic group, an optionally substituted C$_{1-20}$ heteroaliphatic group, and an optionally substituted aryl group, where any two or more of R$^{1'}$, R$^{2'}$, R$^{3'}$ and R$^{4'}$ may optionally be taken together with intervening atoms to form one or more optionally substituted rings optionally containing one or more heteroatoms;

n is, on average in the composition, within a range from about 2 to about 200;

Q is any bivalent moiety derived from a cyclic acid anhydride;

Z is a multivalent moiety; and x and y are each independently an integer from 0 to 6, where the sum of x and y is between 2 and 6.

In certain embodiments, for polymer chains of formula P1, Q is an optionally substituted bivalent moiety. In certain embodiments, for polymer chains of formula P1, Q is an optionally substituted bivalent moiety selected from the group consisting of: saturated or unsaturated, straight or branched, C$_2$-C$_{30}$ aliphatic group, wherein one or more methylene units are optionally and independently replaced by —NR$^y$—, —N(R$^y$)C(O)—, —C(O)N(R$^y$)—, —OC(O)N(R$^y$)—, —N(R$^y$)C(O)O—, —OC(O)O—, —O—, —C(O)—, —OC(O)—, —C(O)O—, —S—, —SO—, —SO$_2$—, —C(=S)—, —C(=NR$^y$)—, —C(=NOR$^y$)—, or —N=N—; C$_{7-12}$ arylalkyl; 6-10-membered aryl; 5-10-membered heteroaryl having 1-4 heteroatoms independently selected from nitrogen, oxygen, or sulfur; 4-7-membered heterocyclic having 1-2 heteroatoms independently selected from the group consisting of nitrogen, oxygen, and sulfur; where each occurrence of R$^y$ is independently hydrogen or an optionally substituted C$_{1-6}$ aliphatic group.

In certain embodiments, for polymer chains of formula P1, Q is an optionally substituted bivalent moiety selected from the group consisting of:

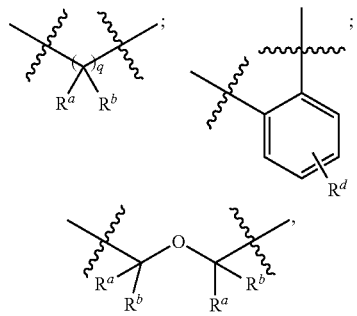

where
- $R^a$ and $R^b$ are each independently selected from the group consisting of: —H, halogen, optionally substituted $C_{1-8}$ aliphatic, and optionally substituted $C_{1-8}$ heteroaliphatic, where two or more $R^a$ and/or $R^b$ groups (whether on the same or different carbon atoms) may be taken together with intervening atoms to form one or more optionally substituted, optionally unsaturated rings, optionally containing one or more heteroatoms, and where two $R^a$ and $R^b$ groups on the same carbon atom or on adjacent carbon atoms may optionally be taken together to form an alkene or, if on the same carbon atom, a carbonyl group (e.g., oxo);
- q is an integer from 1 to 10; and
- $R^d$ groups are optionally present, and if present are, independently at each occurrence selected from the group consisting of: halogen, —OR, —$NR_2$, —SR, —CN, —$NO_2$, —$SO_2R$, —SOR, —$SO_2NR_2$, —CNO, —$NRSO_2R$, —NCO, —$N_3$, —$SiR_3$; or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6-10-membered aryl; 5-10-membered heteroaryl having 1-4 heteroatoms independently selected from nitrogen, oxygen, or sulfur; and 4-7-membered heterocyclic having 1-2 heteroatoms independently selected from the group consisting of nitrogen, oxygen, and sulfur; where two or more $R^d$ groups may be taken together with the carbon atoms to which they are attached and any intervening atoms to form one or more optionally substituted rings optionally containing one or more heteroatoms.

In certain embodiments, for polymer chains of formula P1, Q is selected from the group consisting of:

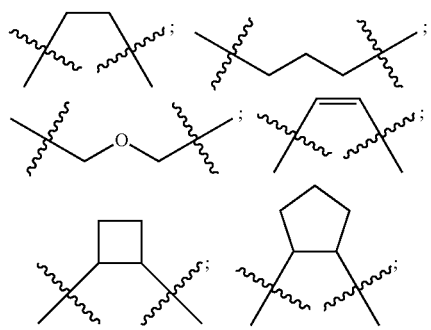

-continued

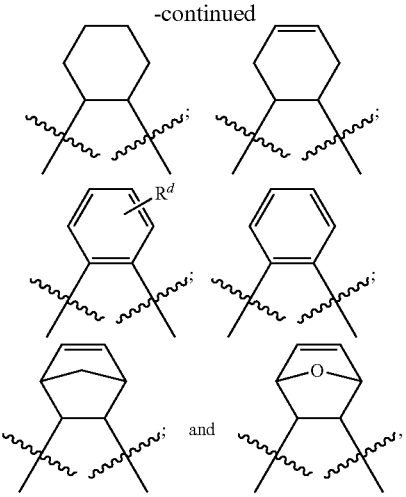

where $R^d$ is as defined above.

In certain embodiments, for polymer chains of formula P1, Q is a bivalent moiety derived from a cyclic acid anhydride selected from the group consisting of:

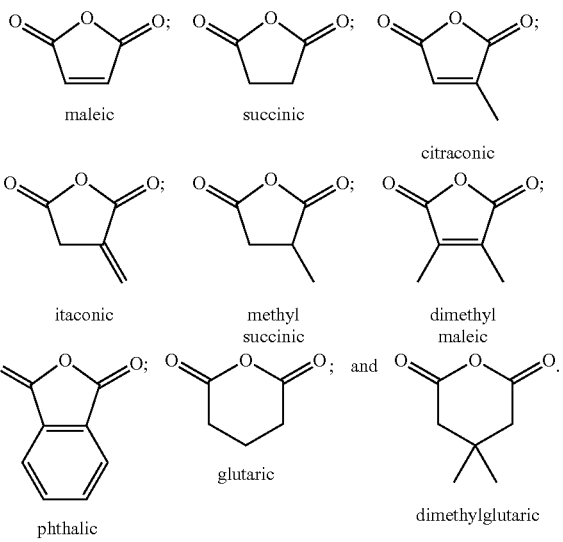

e.g., Section II below.

In certain embodiments, for polymer chains of formula P1, Q is a bivalent moiety derived from Succinic anhydride. In certain embodiments, for polymer chains of formula P1, Q is a bivalent moiety derived from methyl succinic anhydride. In certain embodiments, for polymer chains of formula P1, Q is a bivalent moiety derived from dimethylsuccinic anhydride. In certain embodiments, for polymer chains of formula P1, Q is a bivalent moiety derived from phenyl succinic anhydride. In certain embodiments, for polymer chains of formula P1, Q is a bivalent moiety derived from octadecenylsuccinic anhydride. In certain embodiments, for polymer chains of formula P1, Q is a bivalent moiety derived from hexadecenyl succinic anhydride. In certain embodiments, for polymer chains of formula P1, Q is a bivalent moiety derived from eicosodecenyl succinic anhydride. In certain embodiments, for polymer chains of formula P1, Q is a bivalent moiety derived from 2-methylene succinic anhydride. In certain embodiments, for polymer chains of formula P1, Q is a bivalent moiety derived from n-octenyl succinic anhydride. In certain embodiments, for polymer chains of formula P1, Q is a bivalent moiety derived from nonenyl succinic anhydride. In certain embodiments, for polymer chains of formula P1, Q is a bivalent moiety derived from tetrapropenyl succinic anhydride. In certain embodiments, for polymer chains of formula P1, Q is a bivalent moiety derived from 14 dodecyl succinic anhydride. In certain embodiments, for polymer chains of formula P1, Q is a bivalent moiety derived from glutaric anhydride. In certain embodiments, for polymer chains of formula P1, Q is a bivalent moiety derived from 3-methylglutaric anhydride. In certain embodiments, for polymer chains of formula P1, Q is a bivalent moiety derived from phenyl glutaric anhydride. In certain embodiments, for polymer chains of formula P1, Q is a bivalent moiety derived from diglycolic anhydride. In certain embodiments, for polymer chains of formula P1, Q is a bivalent moiety derived from 2-ethyl 3-methyl glutaric anhydride. In certain embodiments, for polymer chains of formula P1, Q is a bivalent moiety derived from 3,3-dimethyl glutaric anhydride. In certain embodiments, for polymer chains of formula P1, Q is a bivalent moiety derived from 2,2-dimethyl glutaric anhydride. In certain embodiments, for polymer chains of formula P1, Q is a bivalent moiety derived from 3,3-tetramethyleneglutaric anhydride. In certain embodiments, for polymer chains of formula P1, Q is a bivalent moiety derived from phthalic anhydride. In certain embodiments, for polymer chains of formula P1, Q is a bivalent moiety derived from 4-methyl phthalic anhydride. In certain embodiments, for polymer chains of formula P1, Q is a bivalent moiety derived from 4-t-butyl phthalic anhydride. In certain embodiments, for polymer chains of formula P1, Q is a bivalent moiety derived from tetrahydrophthalic anhydride. In certain embodiments, for polymer chains of formula P1, Q is a bivalent moiety derived from hexahydrophthalic anhydride. In certain embodiments, for polymer chains of formula P1, Q is a bivalent moiety derived from maleic anhydride. In certain embodiments, for polymer chains of formula P1, Q is a bivalent moiety derived from 2-methyl maleic anhydride. In certain embodiments, for polymer chains of formula P1, Q is a bivalent moiety derived from 3,4,5,6-tetrahydrophthalic anhydride. In certain embodiments, for polymer chains of formula P1, Q is a bivalent moiety derived from 1-cyclopentene-1,2-dicarboxylic anhydride. In certain embodiments, for polymer chains of formula P1, Q is a bivalent moiety derived from dimethyl maleic anhydride. In certain embodiments, for polymer chains of formula P1, Q is a bivalent moiety derived from diphenyl maleic anhydride.

In certain embodiments, a multivalent moiety ⊙ embedded within aliphatic polycarbonate chains described herein is derived from a polyfunctional chain transfer agent having two or more sites from which epoxide/$CO_2$ copolymerization can occur. In certain embodiments, the multivalent moiety ⊙ comprises one or more atoms selected from the group consisting of carbon, nitrogen, phosphorous, sulfur, and boron. In certain embodiments, ⊙ comprises one or more carbon atoms. In certain embodiments, ⊙ comprises a phosphorous atom. In certain embodiments, ⊙ comprises a polymer chain. In certain embodiments, ⊙ is derived from any of the polyfunctional chain transfer agents as exemplified in published PCT application WO 2010/028362, the entirety of which is incorporated herein by reference.

In certain embodiments, a polyfunctional chain transfer agent has a formula:

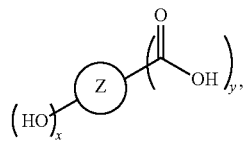

where ⊙, x, and y are as defined above and described in classes and subclasses herein.

In certain embodiments, aliphatic polycarbonate chains in the inventive polymer compositions herein are derived from the copolymerization of one or more epoxides with carbon dioxide in the presence of such polyfunctional chain transfer agents as shown in scheme 2:

Scheme 2

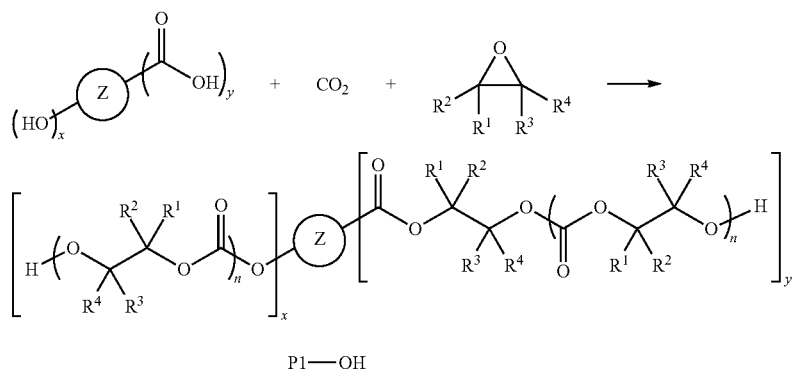

In certain embodiments, aliphatic polycarbonate chains in polymer compositions of the present invention comprise chains with the structure P2:

P2

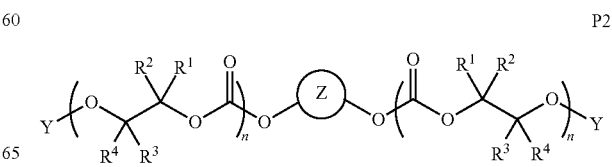

where $R^1$, $R^2$, $R^3$, $R^4$, Ⓩ, and n are as defined above and described in classes and subclasses herein, and the moiety —Y has the formula

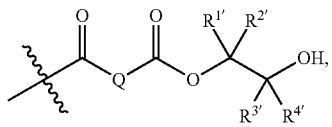

where $R^{1'}$, $R^{2'}$, $R^{3'}$, $R^{4'}$, and Q are as defined above and in the classes and subclasses herein.

In certain embodiments, where aliphatic polycarbonate chains have a structure P2, a moiety Ⓩ is derived from a dihydric alcohol. In such instances the moiety Ⓩ represents the carbon-containing backbone of the dihydric alcohol, while the two oxygen atoms adjacent to Ⓩ are derived from the —OH groups of the diol. For example, if the dihydric alcohol were derived from ethylene glycol, then Ⓩ would be —$CH_2CH_2$— and P2 would have the following structure:

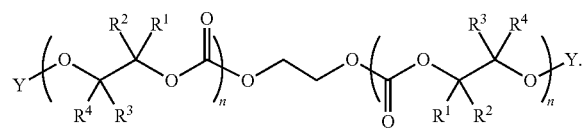

In certain embodiments, where Ⓩ is derived from a dihydric alcohol, the dihydric alcohol comprises a $C_{2-40}$ diol. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these.

In certain embodiments, Ⓩ is derived from a dihydric alcohol having the formula:

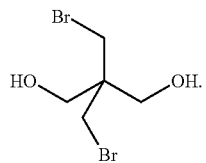

In certain embodiments, where Ⓩ is derived from a dihydric alcohol, the dihydric alcohol is selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly(propylene glycols) such as those having number average molecular weights of from 234 to about 2000 g/mol.

In certain embodiments, where Ⓩ is derived from a dihydric alcohol, the dihydric alcohol comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments, where Ⓩ is derived from a dihydric alcohol, the dihydric alcohol comprises a polymeric diol. In certain embodiments, a polymeric diol is selected from the group consisting of polyethers, polyesters, hydroxy-terminated polyolefins, polyether-copolyesters, polyether polycarbonates, polycarbonate-copolyesters, and alkoxylated analogs of any of these. In certain embodiments, the polymeric diol has an average molecular weight less than about 2000 g/mol.

In certain embodiments, Ⓩ is derived from a polyhydric alcohol with more than two hydroxy groups. In certain embodiments, aliphatic polycarbonate chains in polymer compositions of the present invention comprise aliphatic polycarbonate chains where a moiety Ⓩ is derived from a triol. In certain embodiments, such aliphatic polycarbonate chains have the structure P3:

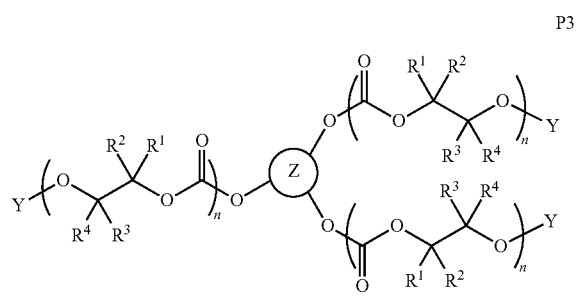

P3 where $R^1$, $R^2$, $R^3$, $R^4$, Y, Ⓩ, and n are as defined above and described in classes and subclasses herein.

In certain embodiments, where Ⓩ is derived from a triol, the triol is selected from the group consisting of: glycerol, 1,2,4-butanetriol, 2-(hydroxymethyl)-1,3-propanediol, hexane triols, trimethylol propane, trimethylol ethane, trimethylolhexane, 1,4-cyclohexanetrimethanol, pentaerythritol mono esters, pentaerythritol mono ethers, and alkoxylated analogs of any of these. In certain embodiments, alkoxylated derivatives comprise ethoxylated or propoxylated compounds.

In certain embodiments, Ⓩ is derived from an alkoxylated derivative of a trifunctional carboxylic acid or trifunctional hydroxy acid. In certain embodiments, alkoxylated polymeric derivatives comprise ethoxylated or propoxylated compounds.

In certain embodiments, where Ⓩ is derived from a polymeric triol, the polymeric triol is selected from the group consisting of polyethers, polyesters, hydroxy-terminated polyolefins, polyether-copolyesters, polyether polycarbonates, polycarbonate-copolyesters, and alkoxylated analogs of any of these. In certain embodiments, alkoxylated polymeric triols comprise ethoxylated or propoxylated compounds.

In certain embodiments, Ⓩ is derived from a polyhydric alcohol with four hydroxy groups. In certain embodiments, aliphatic polycarbonate chains in polymer compositions of the present invention comprise aliphatic polycarbonate chains where the moiety Ⓩ is derived from a tetraol. In certain embodiments, aliphatic polycarbonate chains in polymer compositions of the present invention comprise chains with the structure P4:

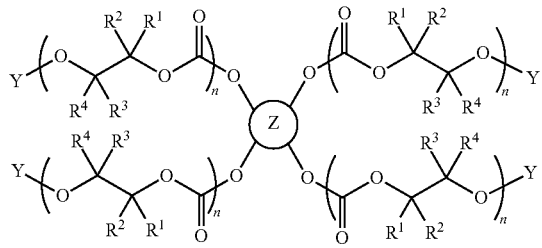

P4 where $R^1$, $R^2$, $R^3$, $R^4$, Y, Ⓩ, and n are as defined above and described in classes and subclasses herein.

In certain embodiments, Ⓩ is derived from a polyhydric alcohol with more than four hydroxy groups. In certain embodiments, Ⓩ is derived from a polyhydric alcohol with six hydroxy groups. In certain embodiments, the polyhydric alcohol is dipentaerithrotol or an alkoxylated analog thereof. In certain embodiments, aliphatic polycarbonate chains in polymer compositions of the present invention comprise chains with the structure P5:

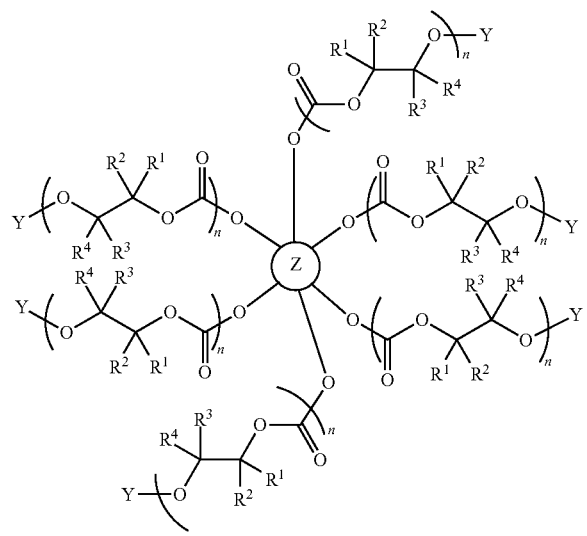

P5 where $R^1$, $R^2$, $R^3$, $R^4$, Y, Ⓩ, and n are as defined above and described in classes and subclasses herein.

In certain embodiments, aliphatic polycarbonates of the present invention comprise a combination of bifunctional chains (e.g. polycarbonates of formula P2) in combination with higher functional chains (e.g. one or more polycarbonates of formulae P3 to P5).

In certain embodiments, Ⓩ is derived from a hydroxy acid. In certain embodiments, aliphatic polycarbonate chains in polymer compositions of the present invention comprise chains with the structure P6:

P6 where $R^1$, $R^2$, $R^3$, $R^4$, Y, Ⓩ, and n are as defined above and described in classes and subclasses herein.

In such instances, Ⓩ represents the carbon-containing backbone of the hydroxy acid, while ester and carbonate linkages adjacent to Ⓩ are derived from the —$CO_2H$ group and the hydroxy group of the hydroxy acid. For example, if Ⓩ were derived from 3-hydroxy propanoic acid, then Ⓩ would be —$CH_2CH_2$— and P6 would have the following structure:

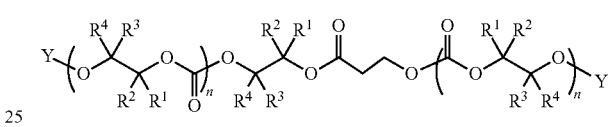

In certain embodiments, Ⓩ is derived from an optionally substituted $C_{2-40}$ hydroxy acid. In certain embodiments, Ⓩ is derived from a polyester. In certain embodiments, such polyesters have a molecular weight less than about 2000 g/mol. In certain embodiments, a hydroxy acid is an alpha-hydroxy acid. In certain embodiments, a hydroxy acid is selected from the group consisting of: glycolic acid, DL-lactic acid, D-lactic acid, L-lactic, citric acid, and mandelic acid.

In certain embodiments, a hydroxy acid is a beta-hydroxy acid. In certain embodiments, a hydroxy acid is selected from the group consisting of: 3-hydroxypropionic acid, DL 3-hydroxybutryic acid, D-3 hydroxybutryic acid, L 3-hydroxybutyric acid, DL-3-hydroxy valeric acid, D-3-hydroxy valeric acid, L-3-hydroxy valeric acid, salicylic acid, and derivatives of salicylic acid.

In certain embodiments, a hydroxy acid is a α-ω hydroxy acid. In certain embodiments, a hydroxy acid is selected from the group consisting of optionally substituted $C_{3-20}$ aliphatic α-ω hydroxy acids and oligomeric esters.

In certain embodiments, Ⓩ is derived from a hydroxy acid selected from the group consisting of:

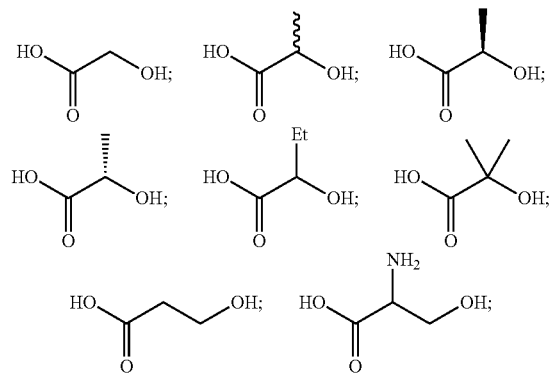

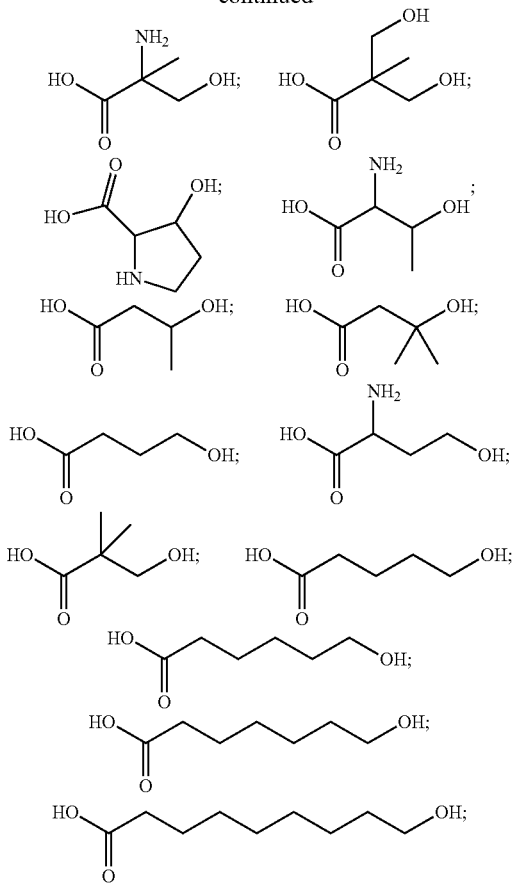

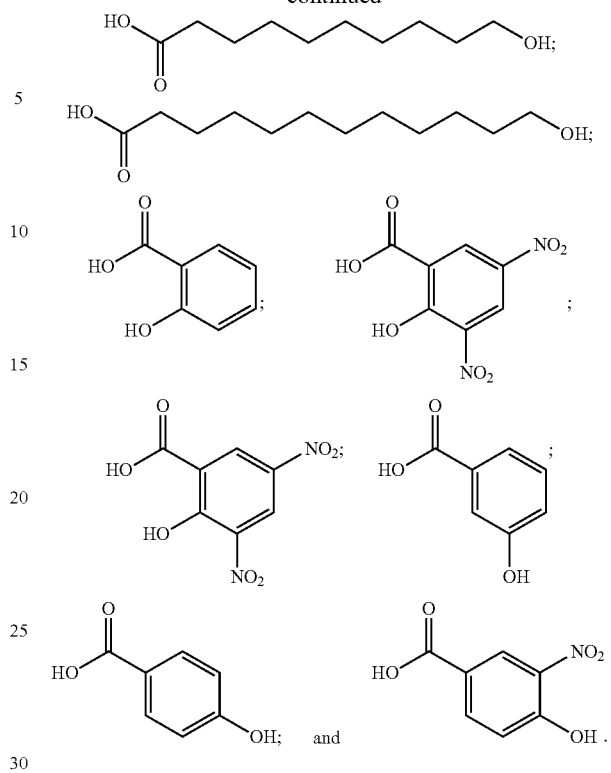

In certain embodiments, ⓩ is derived from a polycarboxylic acid. In certain embodiments, aliphatic polycarbonate chains in polymer compositions of the present invention comprise chains with the structure P7:

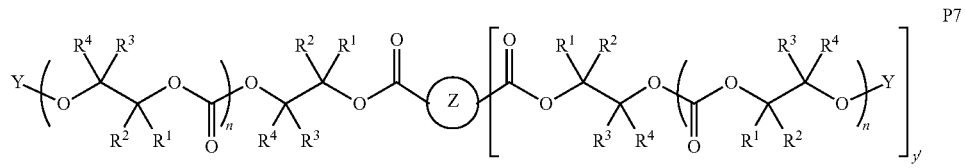

where $R^1$, $R^2$, $R^3$, $R^4$, Y, ⓩ, and n are as defined above and described in classes and subclasses herein, and y' is from 1 to 5, inclusive.

In embodiments where the aliphatic polycarbonate chains have a structure P7, ⓩ represents the carbon-containing backbone (or a bond in the case of oxalic acid) of the polycarboxylic acid, while the ester groups adjacent to ⓩ are derived from the —$CO_2H$ groups of the polycarboxylic acid. For example, if ⓩ were derived from succinic acid ($HO_2CCH_2CH_2CO_2H$), then ⓩ would be —$CH_2CH_2$— and P7 would have the following structure:

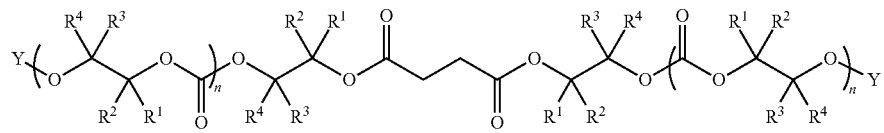

where $R^1$, $R^2$, $R^3$, $R^4$, Y, and n are as defined above and in the classes and subclasses herein.

In certain embodiments, Ⓩ is derived from a dicarboxylic acid. In certain embodiments, aliphatic polycarbonate chains in polymer compositions of the present invention comprise chains with the structure P8:

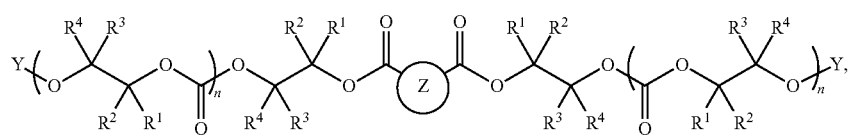

where $R^1$, $R^2$, $R^3$, $R^4$, Y, Ⓩ, and n are as defined above and in the classes and subclasses herein.

In certain embodiments, Ⓩ is derived from a dicarboxylic acid selected from the group consisting of: phthalic acid, isophthalic acid, terephthalic acid, maleic acid, succinic acid, malonic acid, glutaric acid, adipic acid, pimelic acid, suberic acid, and azelaic acid.

In certain embodiments, Ⓩ derived from a dicarboxylic acid selected from the group consisting of:

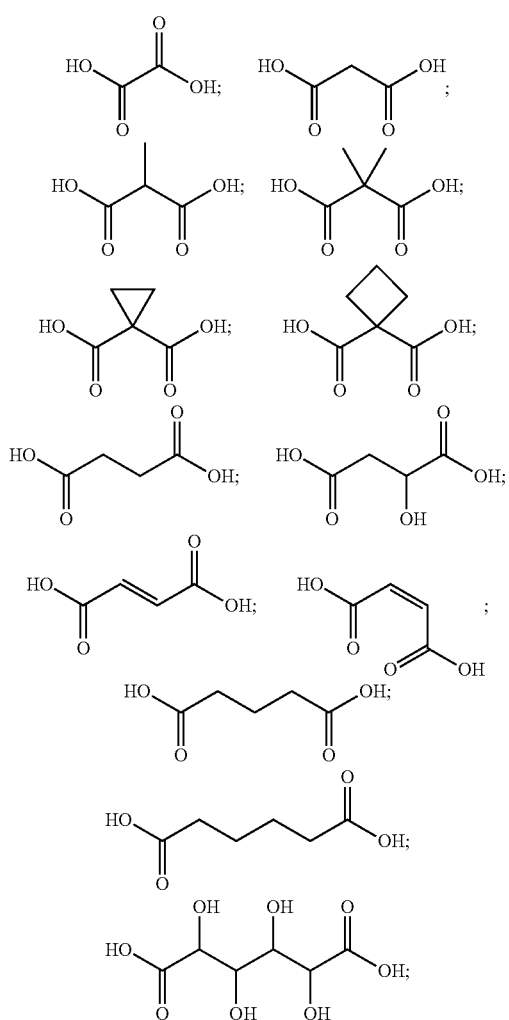

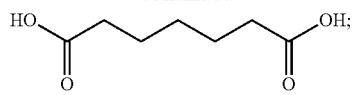

In certain embodiments, Ⓩ is derived from a phosphorous-containing molecule. In certain embodiments, Ⓩ has a formula $—P(O)(OR)_k—$ where each R is independently hydrogen, an optionally substituted $C_{1-20}$ aliphatic group, or an optionally substituted aryl group and k is 0, 1, or 2. In certain embodiments, Ⓩ is derived from a phosphorous-containing molecule selected from the group consisting of:

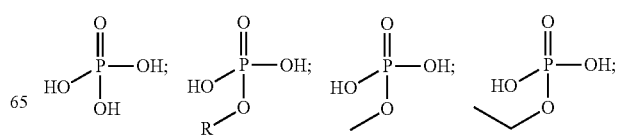

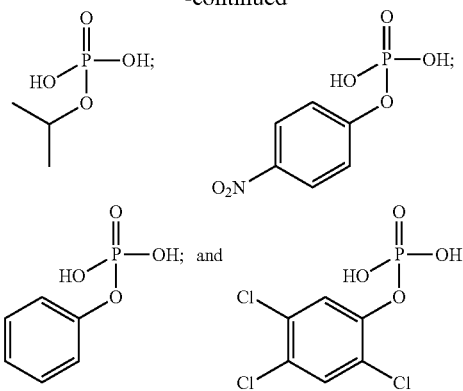

In certain embodiments, ⓔ has a formula —P(O)(OR)$_j$ (R)$_k$— where R is hydrogen, an optionally substituted C$_{1-20}$ aliphatic group, or an optionally substituted aryl group, j is 1 or 2, and k is 0 or 1, wherein the sum of j and k is not more than 2. In certain embodiments, ⓔ is derived from a phosphorous-containing molecule selected from the group consisting of:

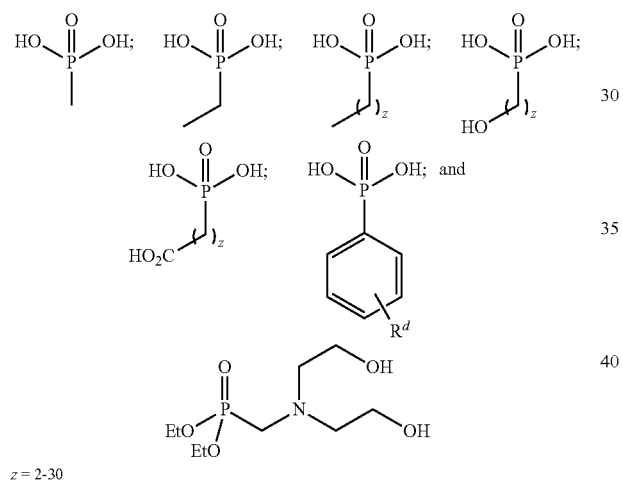

z = 2-30 where $R^d$ is as defined above.

In certain embodiments, in aliphatic polycarbonate chains of any of formulae P1 through P8, a majority of the polymer chain ends comprise —Y groups. In certain embodiments, in aliphatic polycarbonate chains of any of structures P1 through P8, a majority of the polymer chain ends comprise —Y groups capable of participating in epoxide ring-opening reactions. In certain embodiments, at least 75% of the polymer chain ends comprise —Y groups capable of participating in epoxide ring-opening reactions. In certain embodiments, at least 80% of the polymer chain ends comprise —Y groups capable of participating in epoxide ring-opening reactions. In certain embodiments, at least 85% of the polymer chain ends comprise —Y groups capable of participating in epoxide ring-opening reactions. In certain embodiments, at least 90% of the polymer chain ends comprise —Y groups capable of participating in epoxide ring-opening reactions. In certain embodiments, at least 95% of the polymer chain ends comprise —Y groups capable of participating in epoxide ring-opening reactions.

In certain embodiments, a moiety

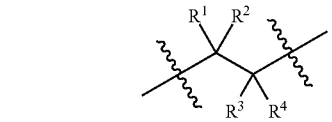

in the structures herein above, is at each occurrence in the aliphatic polycarbonate chains independently selected from the group consisting of:

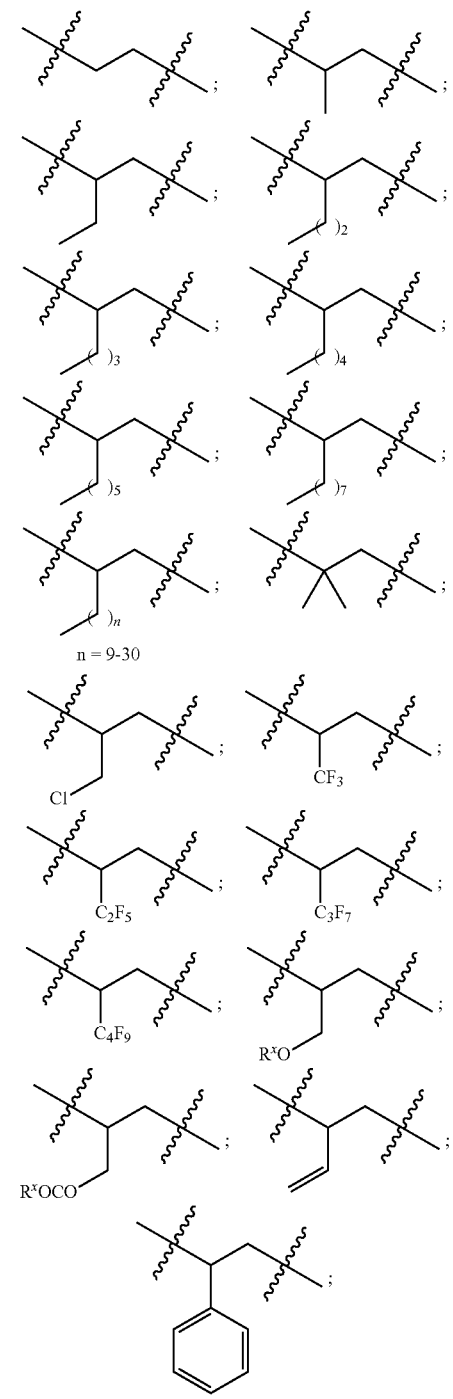

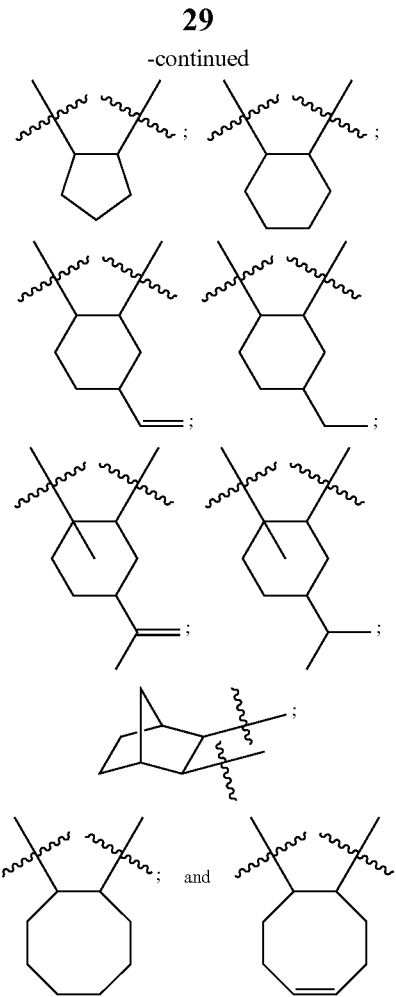

wherein each $R^x$ is independently selected from the group consisting of: optionally substituted aliphatic, optionally substituted heteroaliphatic, optionally substituted aryl and optionally substituted heteroaryl.

In certain embodiments, a moiety

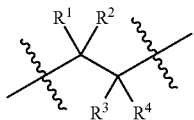

in the structures hereinabove, is at each occurrence in the aliphatic polycarbonate chains independently selected from the group consisting of:

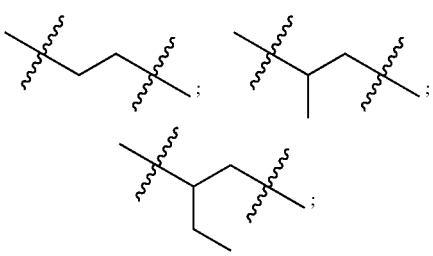

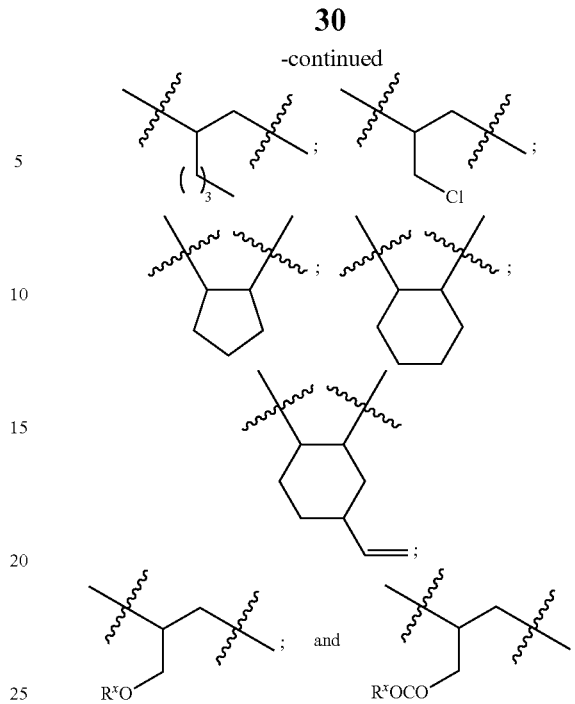

wherein $R^x$ is as defined above.

In certain embodiments, aliphatic polycarbonate chains comprise a copolymer of carbon dioxide and one epoxide. In certain embodiments, aliphatic polycarbonate chains comprise a copolymer of carbon dioxide and propylene oxide.

In certain embodiments, aliphatic polycarbonate chains comprise a copolymer of carbon dioxide and ethylene oxide.

In certain embodiments, aliphatic polycarbonate chains comprise a copolymer of carbon dioxide and cyclohexene oxide.

In certain embodiments, aliphatic polycarbonate chains comprise a copolymer of carbon dioxide and cyclopentene oxide. In certain embodiments, aliphatic polycarbonate chains comprise a copolymer of carbon dioxide and 3-vinyl cyclohexene oxide.

In other embodiments, aliphatic polycarbonate chains comprise a terpolymer of carbon dioxide and two different epoxides. In certain embodiments, aliphatic polycarbonate chains comprise a copolymer of carbon dioxide and propylene oxide along with one or more additional epoxides selected from the group consisting of ethylene oxide, 1,2-butene oxide, 2,3-butene oxide, cyclohexene oxide, 3-vinyl cyclohexene oxide, epichlorohydrin, glycidyl esters, glycidyl ethers, and epoxides of higher alpha olefins. In certain embodiments, these terpolymers contain a majority of repeat units derived from propylene oxide with lesser amounts of repeat units derived from one or more additional epoxides. In certain embodiments, terpolymers contain about 50% to about 99.5% propylene oxide-derived repeat units. In certain embodiments, terpolymers contain greater than 60% propylene oxide-derived repeat units. In certain embodiments, terpolymers contain greater than 75% propylene oxide-derived repeat units. In certain embodiments, terpolymers contain greater than 80% propylene oxide-derived repeat units. In certain embodiments, terpolymers contain greater than 85% propylene oxide-derived repeat units. In certain embodiments, terpolymers contain greater than 90% propylene oxide-derived repeat units. In certain embodiments, terpolymers contain greater than 95% propylene oxide-derived repeat units.

In certain embodiments, aliphatic polycarbonate chains comprise a copolymer of carbon dioxide and ethylene oxide along with one or more additional epoxides selected from the group consisting of propylene oxide, 1,2-butene oxide, 2,3-butene oxide, cyclohexene oxide, 3-vinyl cyclohexene oxide, epichlorohydrin, glycidyl esters, glycidyl ethers, and epoxides of higher alpha olefins. In certain embodiments, these terpolymers contain a majority of repeat units derived from ethylene oxide with lesser amounts of repeat units derived from one or more additional epoxides. In certain embodiments, terpolymers contain about 50% to about 99.5% ethylene oxide-derived repeat units. In certain embodiments, terpolymers contain greater than about 60% ethylene oxide-derived repeat units. In certain embodiments, terpolymers contain greater than 75% ethylene oxide-derived repeat units. In certain embodiments, terpolymers contain greater than 80% ethylene oxide-derived repeat units. In certain embodiments, terpolymers contain greater than 85% ethylene oxide-derived repeat units. In certain embodiments, terpolymers contain greater than 90% ethylene oxide-derived repeat units. In certain embodiments, terpolymers contain greater than 95% propylene oxide-derived repeat units.

In certain embodiments, in polymer compositions described hereinabove, aliphatic polycarbonate chains have a number average molecular weight ($M_n$) in the range of 500 g/mol to about 250,000 g/mol.

In certain embodiments, aliphatic polycarbonate chains have an $M_n$ less than about 100,000 g/mol. In certain embodiments, aliphatic polycarbonate chains have an $M_n$ less than about 70,000 g/mol. In certain embodiments, aliphatic polycarbonate chains have an $M_n$ less than about 50,000 g/mol. In certain embodiments, aliphatic polycarbonate chains have an $M_n$ between about 500 g/mol and about 40,000 g/mol. In certain embodiments, aliphatic polycarbonate chains have an $M_n$ less than about 25,000 g/mol. In certain embodiments, aliphatic polycarbonate chains have an $M_n$ between about 500 g/mol and about 20,000 g/mol. In certain embodiments, aliphatic polycarbonate chains have an $M_n$ between about 1000 g/mol and about 10,000 g/mol. In certain embodiments, aliphatic polycarbonate chains have an $M_n$ between about 1,000 g/mol and about 5,000 g/mol. In certain embodiments, aliphatic polycarbonate chains have an $M_n$ of about 5,000 g/mol. In certain embodiments, aliphatic polycarbonate chains have an $M_n$ of about 4,000 g/mol. In certain embodiments, aliphatic polycarbonate chains have an $M_n$ of about 3,000 g/mol. In certain embodiments, aliphatic polycarbonate chains have an $M_n$ of about 2,500 g/mol. In certain embodiments, aliphatic polycarbonate chains have an $M_n$ of about 2,000 g/mol.

In certain embodiments, in polymer compositions described hereinabove, aliphatic polycarbonate chains are characterized in that they have a narrow molecular weight distribution. This can be indicated by the polydispersity indices (PDI) of the aliphatic polycarbonate polymers. In certain embodiments, aliphatic polycarbonate compositions have a PDI less than 2. In certain embodiments, aliphatic polycarbonate compositions have a PDI less than 1.8. In certain embodiments, aliphatic polycarbonate compositions have a PDI less than 1.5. In certain embodiments, aliphatic polycarbonate compositions have a PDI less than 1.4. In certain embodiments, aliphatic polycarbonate compositions have a PDI between about 1.0 and 1.2. In certain embodiments, aliphatic polycarbonate compositions have a PDI between about 1.0 and 1.1.

In certain embodiments, where aliphatic polycarbonates are derived from monosubstituted epoxides (e.g. such as propylene oxide, 1,2-butylene oxide, epichlorohydrin, or a glycidol derivative), the aliphatic polycarbonates are characterized in that they are regioregular. Regioregularity may be expressed as the percentage of adjacent monomer units that are oriented in a head-to-tail arrangement within the polymer chain. In certain embodiments, aliphatic polycarbonate chains in the inventive polymer compositions have a head-to-tail content higher than about 80%. In certain embodiments, a head-to-tail content is higher than about 85%. In certain embodiments, a head-to-tail content is higher than about 90%. In certain embodiments, a head-to-tail content is greater than about 91%, greater than about 92%, greater than about 93%, greater than about 94%, greater than about 95%, greater than about 97%, or greater than about 99%.

In certain embodiments, the structures of aliphatic polycarbonate chains derived from the polymerization of carbon dioxide with one or more epoxides as described above are represented by the ensuing non-limiting examples.

Structures P2a through P2s below are representative of aliphatic polycarbonates derived from a diol chain transfer agent and one or more aliphatic epoxides such as propylene oxide, ethylene oxide, butylene oxide, cyclohexene oxide, 3-vinyl cyclohexene oxide, 3-ethyl cyclohexene oxide, and esters or ethers of glycidol. It is to be understood that many variations on these compounds are possible including the use of additional or different epoxides, use of different chain transfer agents (such as higher polyhydric alcohols, hydroxy acids, and polyacids), and the introduction of different Y groups. Such variations will be apparent to one skilled in the art based on the disclosure and teachings of the present application and are specifically encompassed within the scope of the present invention.

In certain embodiments, aliphatic polycarbonate chains comprise

P2a

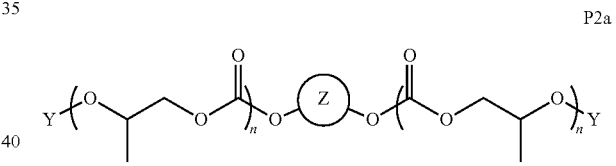

where Ⓩ, —Y, and n are as defined above and described in classes and subclasses herein.

In certain embodiments, aliphatic polycarbonate chains comprise

P2b

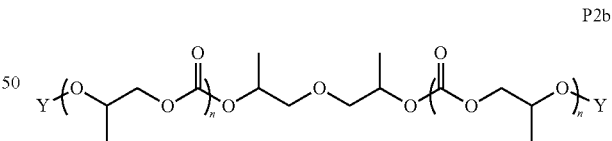

where —Y and n are as defined above and described in classes and subclasses herein.

In certain embodiments, aliphatic polycarbonate chains comprise

P2b-1

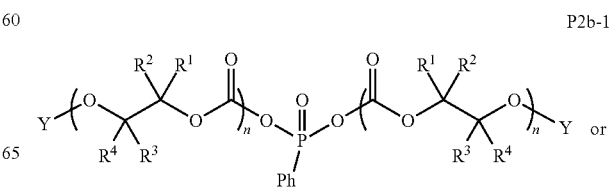

or

-continued

P2b-2

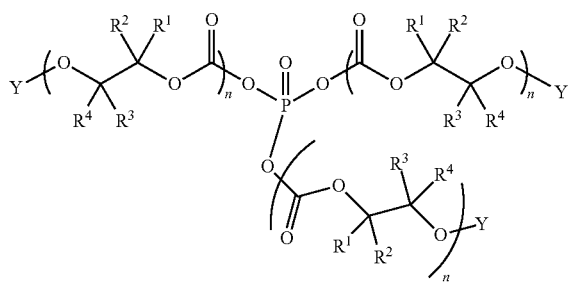

where —Y, $R^1$, $R^2$, $R^3$, $R^4$ and n are as defined above and described in classes and subclasses herein.

In certain embodiments, aliphatic polycarbonate chains comprise

P2b-3

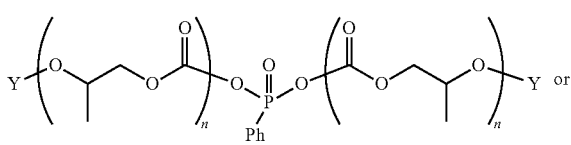

or

P2b-4

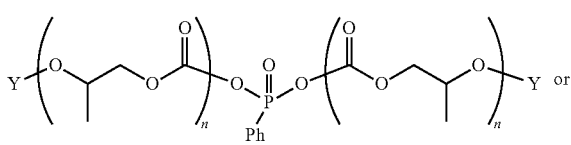

where —Y and n are as defined above and described in classes and subclasses herein.

In certain embodiments, aliphatic polycarbonate chains comprise

P2c

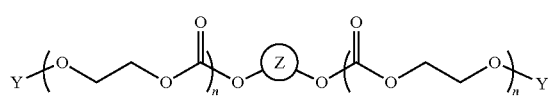

where ⓩ, —Y, and n are as defined above and described in classes and subclasses herein.

In certain embodiments, aliphatic polycarbonate chains comprise

P2d

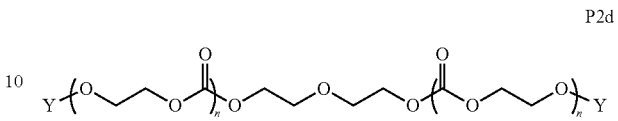

where —Y and n are as defined above and described in classes and subclasses herein.

In certain embodiments, aliphatic polycarbonate chains comprise

P2e

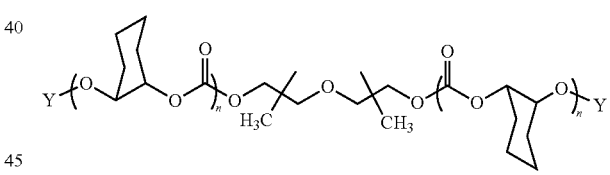

where ⓩ, —Y, and n are as defined above and described in classes and subclasses herein.

In certain embodiments, aliphatic polycarbonate chains comprise

P2e'

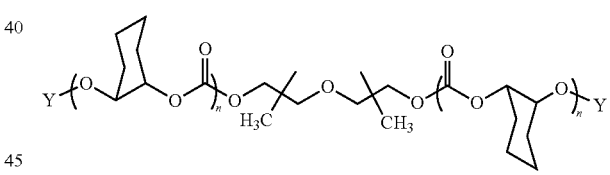

where —Y and n are as defined above and described in classes and subclasses herein.

In certain embodiments, aliphatic polycarbonate chains comprise

P2f

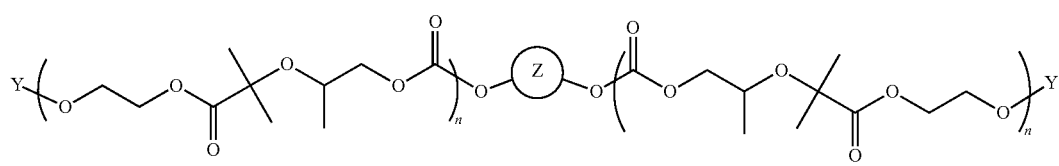

where ⓩ, —Y, and n are as defined above and described in classes and subclasses herein.

In certain embodiments, aliphatic polycarbonate chains comprise

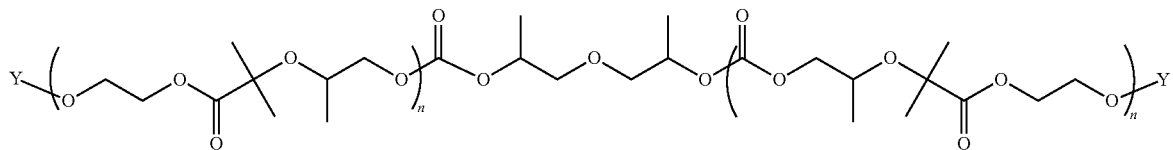
P2g where —Y and n are as defined above and described in classes and subclasses herein.

In certain embodiments, aliphatic polycarbonate chains comprise

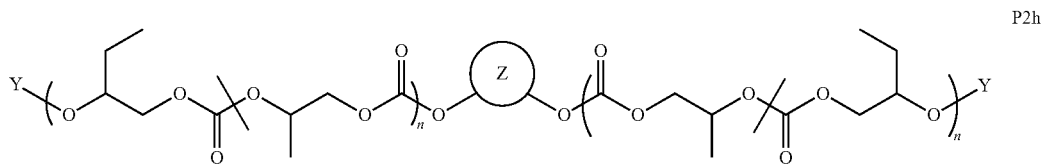
P2h where Ⓩ, —Y and n are as defined above and described in classes and subclasses herein.

In certain embodiments, aliphatic polycarbonate chains comprise

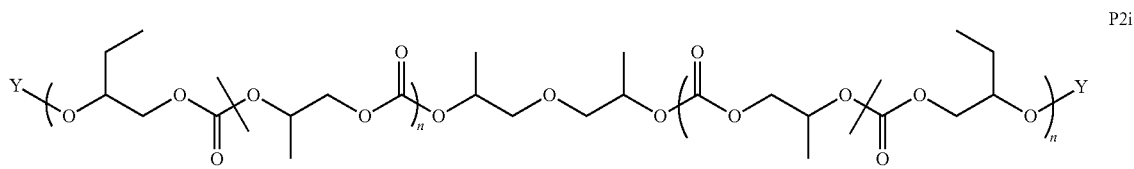
P2i where —Y and n are as defined above and described in classes and subclasses herein.

In certain embodiments, aliphatic polycarbonate chains comprise

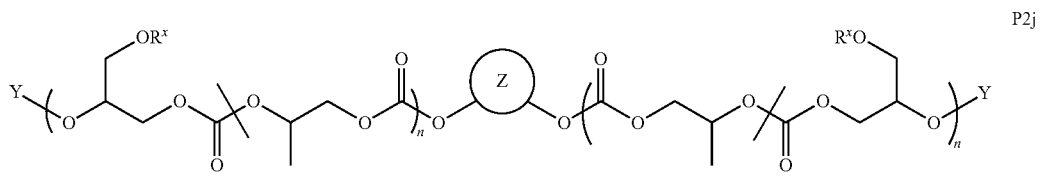
P2j where Ⓩ, —Y, $R^x$, and n are as defined above and described in classes and subclasses herein.

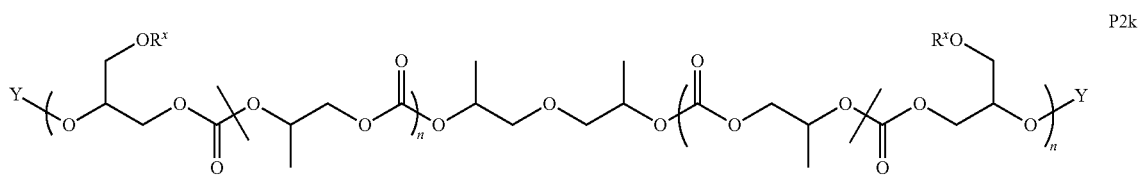
P2k where —Y, $R^x$, and n are as defined above and described in classes and subclasses herein.

In certain embodiments, aliphatic polycarbonate chains comprise

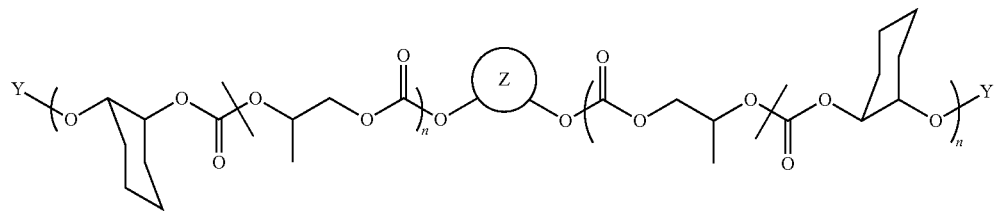

P2l where Ⓩ, —Y, and n are as defined above and described in classes and subclasses herein.

In certain embodiments, aliphatic polycarbonate chains comprise

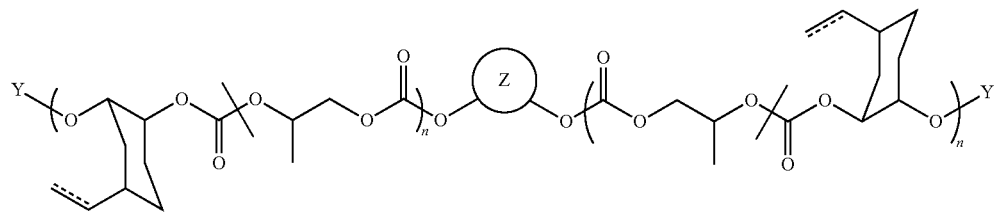

P2l-a where Ⓩ, —Y, and n are as defined above and described in classes and subclasses herein, and ===== is a single or double bond.

In certain embodiments, aliphatic polycarbonate chains comprise

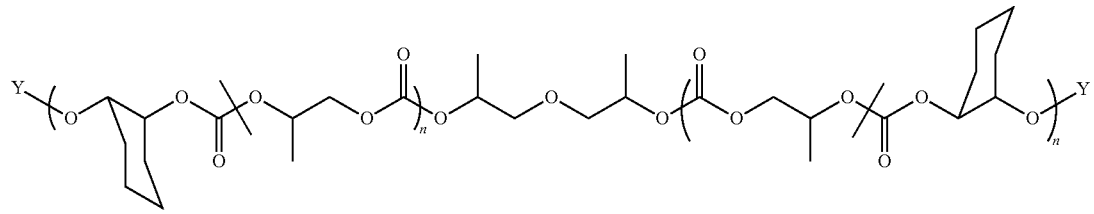

P2m where —Y and n are as defined above and described in classes and subclasses herein.

In certain embodiments, aliphatic polycarbonate chains comprise

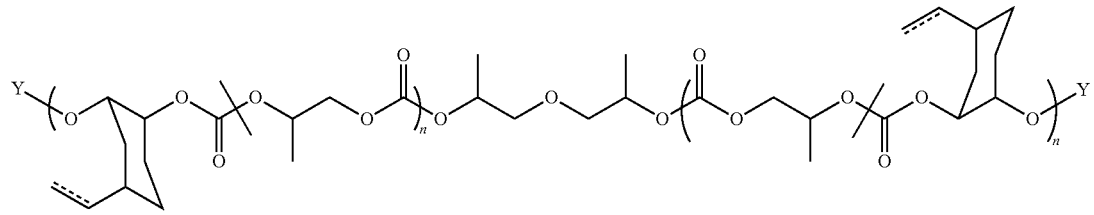

P2m-a where —Y, =====, and n are as defined above and described in classes and subclasses herein.

In certain embodiments, aliphatic polycarbonate chains comprise

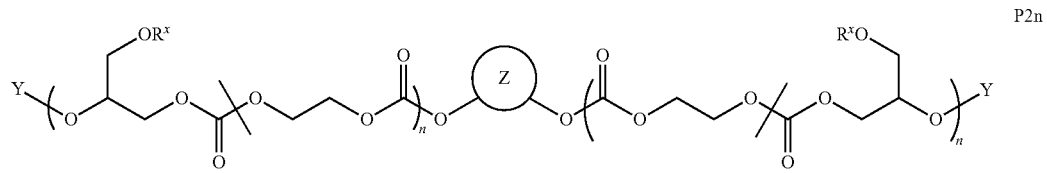

where ⓩ, —Y, —R$^x$, and n are as defined above and described in classes and subclasses herein.

In certain embodiments, aliphatic polycarbonate chains comprise

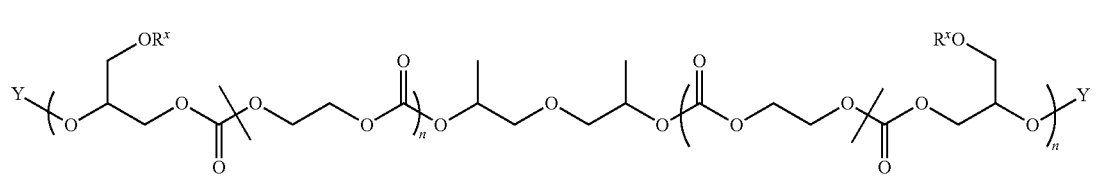

where —Y, R$^x$, and n are as defined above and described in classes and subclasses herein.

In certain embodiments, aliphatic polycarbonate chains comprise

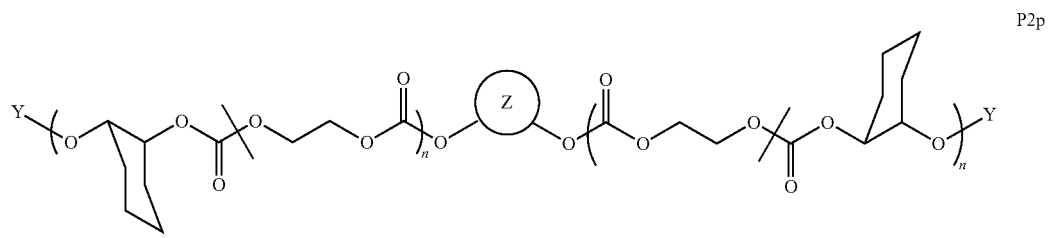

where ⓩ, —Y, and n are as defined above and described in classes and subclasses herein.

In certain embodiments, aliphatic polycarbonate chains comprise

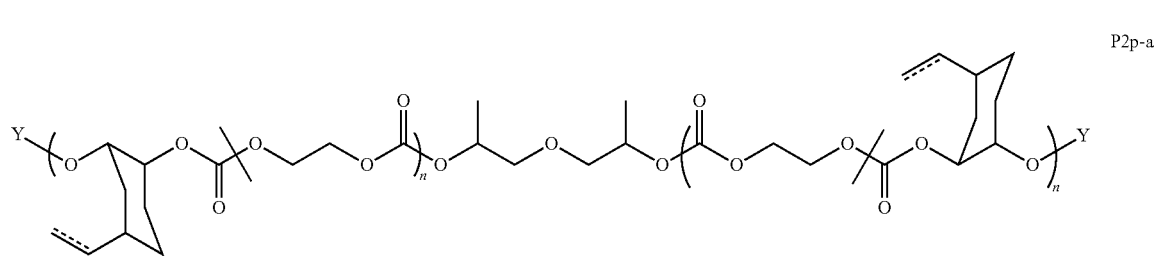

where —Y, ≡≡≡, and n are as defined above and described in classes and subclasses herein.

In certain embodiments, aliphatic polycarbonate chains comprise

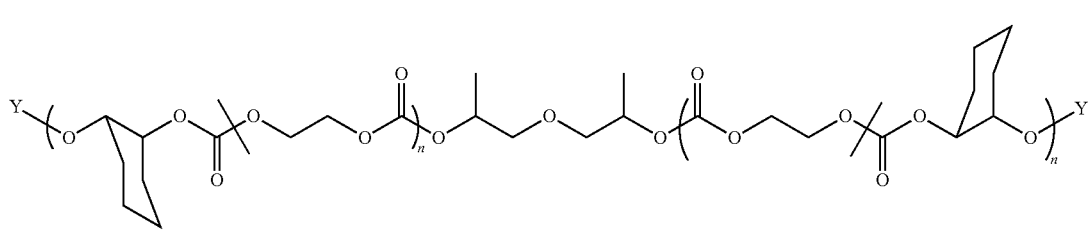

P2q where —Y and n are as defined above and described in classes and subclasses herein.

In certain embodiments, aliphatic polycarbonate chains comprise

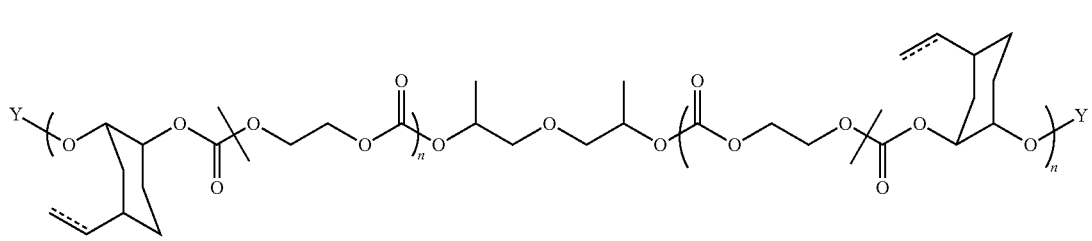

P2q-a where —Y, ─── , and n are as defined above and described in classes and subclasses herein.

In certain embodiments, aliphatic polycarbonate chains comprise

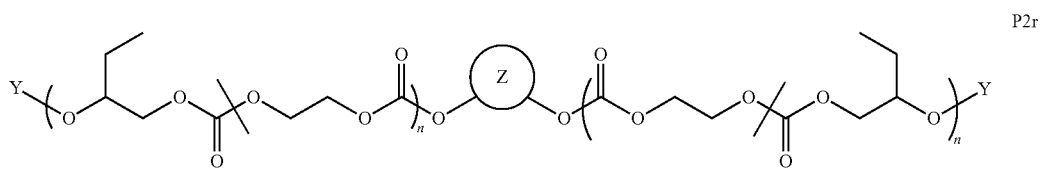

P2r where ⓩ, —Y, and n are as defined above and described in classes and subclasses herein.

In certain embodiments, in polycarbonates of structures P2a through P2r having a ⓩ group, ⓩ is derived from or selected from the group consisting of: ethylene glycol; diethylene glycol, triethylene glycol, 1,3 propane diol; 1,4 butane diol, hexylene glycol, propylene glycol, dipropylene glycol, tripopylene glycol, and alkoxylated derivatives of any of these.

In certain embodiments, aliphatic polycarbonate chains comprise where —Y and n are as defined above and described in classes and subclasses herein.

In certain embodiments, in polycarbonates of structure P2a through P2s, —Y has the formula:

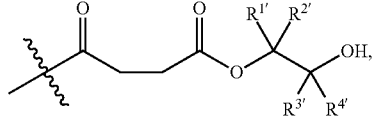

where $R^{1'}$, $R^{2'}$, $R^{3'}$, and $R^{4'}$, are as defined above and described in classes and subclasses herein.

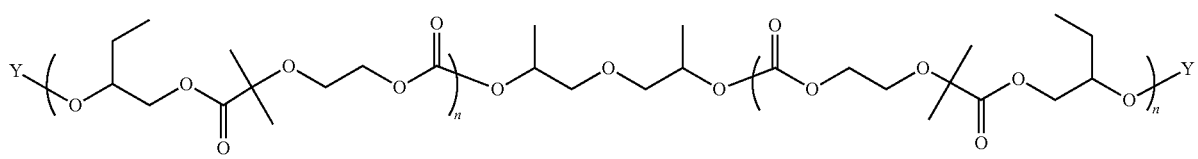

P2s

In certain embodiments, in polycarbonates of structure P2a through P2s, —Y is selected from the group consisting of:

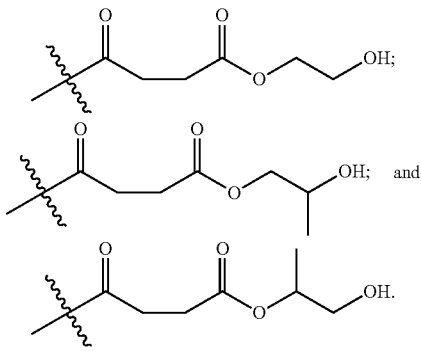

In certain embodiments, in polycarbonates of structure P2a through P2s, —Y has the formula:

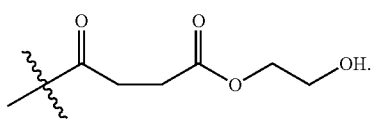 [SMILES: *C(=O)CCC(=O)OCCO]

In certain embodiments, in polycarbonates of structure P2a through P2s, —Y has the formula:

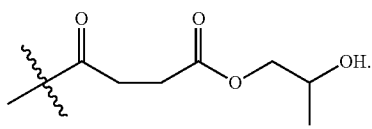 [SMILES: *C(=O)CCC(=O)OCC(C)O]

In certain embodiments, in polycarbonates of structure P2a through P2s, —Y has the formula:

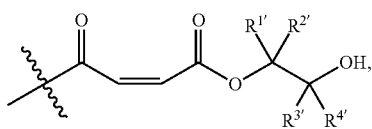

where $R^{1'}$, $R^{2'}$, $R^{3'}$, and $R^{4'}$, are as defined above and described in classes and subclasses herein.

In certain embodiments, in polycarbonates of structure P2a through P2s, —Y is selected from the group consisting of:

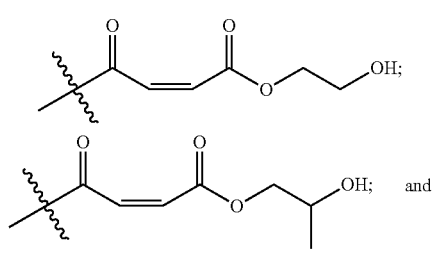

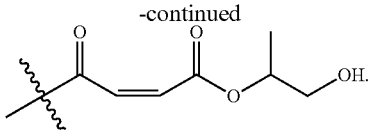

In certain embodiments, in polycarbonates of structure P2a through P2s, —Y has the formula:

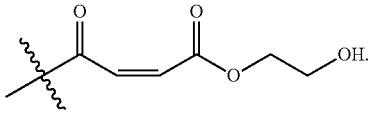

In certain embodiments, in polycarbonates of structure P2a through P2s, —Y has the formula:

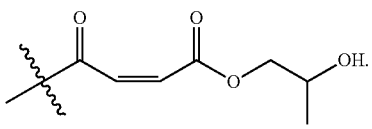 [SMILES: *C(=O)/C=C\C(=O)OCC(C)O]

In certain embodiments, in polycarbonates of structure P2a through P2s, —Y is selected from the group consisting of:

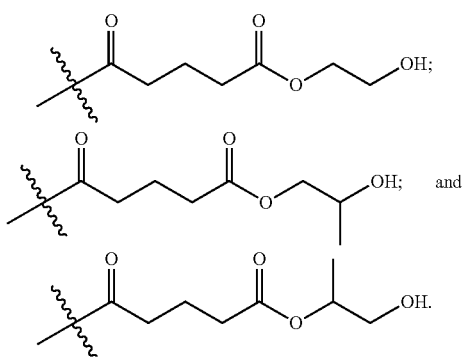

In certain embodiments, in polycarbonates of structure P2a through P2s, —Y has the formula:

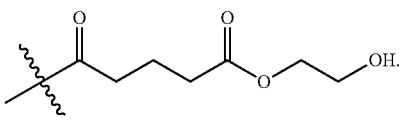 [SMILES: *C(=O)CCCC(=O)OCCO]

In certain embodiments, in polycarbonates of structure P2a through P2s, —Y has the formula:

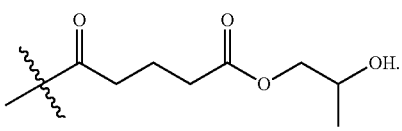 [SMILES: *C(=O)CCCC(=O)OCC(C)O]

In certain embodiments, in polycarbonates of structure P2a through P2s, —Y has the formula:

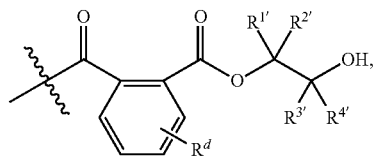

where $R^{1'}$, $R^{2'}$, $R^{3'}$, $R^{4'}$, and $R^d$, are as defined above and described in classes and subclasses herein.

In certain embodiments, in polycarbonates of structure P2a through P2s, —Y is selected from the group consisting of:

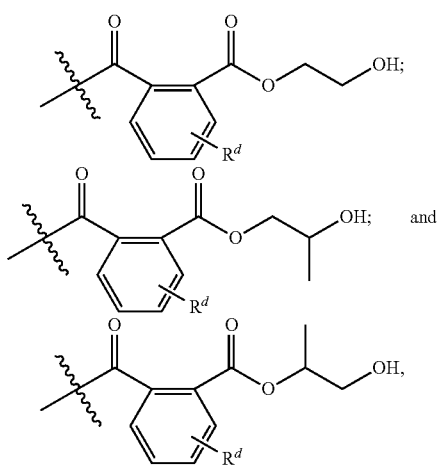

where $R^d$, is as defined above and described in classes and subclasses herein.

In certain embodiments, in polycarbonates of structure P2a through P2s, —Y is selected from the group consisting of:

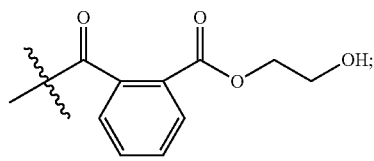 [SMILES: *C(=O)c1ccccc1C(=O)OCCO]

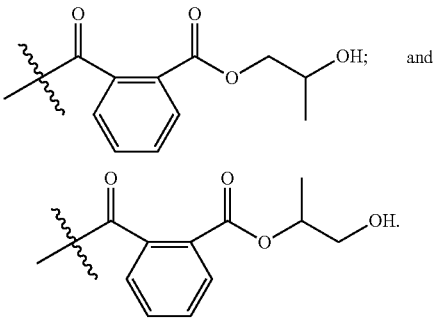

In certain embodiments, in polycarbonates of structure P2a through P2s, —Y has the formula:

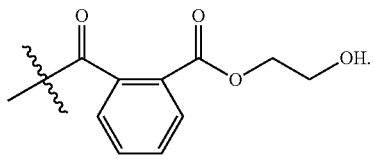

In certain embodiments, in polycarbonates of structure P2a through P2s, —Y has the formula:

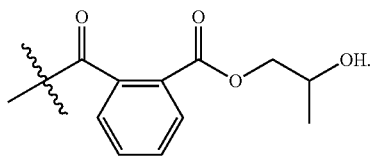

In certain embodiments, the aliphatic polycarbonate polyol compositions of the present invention are selected from the group consisting of Q1, Q2, Q3, Q4, Q5, Q6, Q7, Q8, and mixtures of any two or more of these.

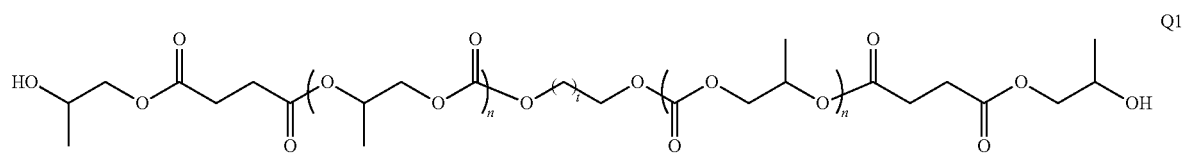

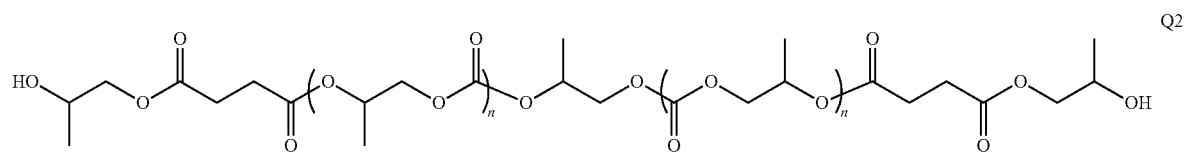

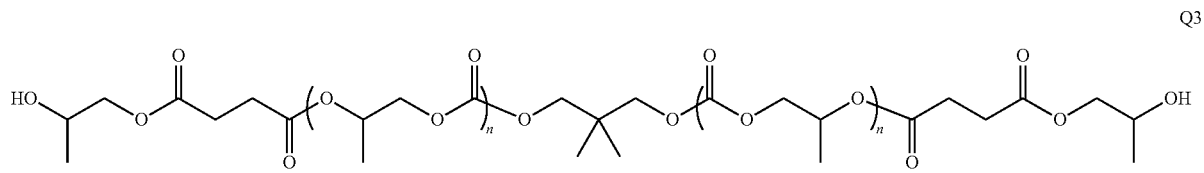

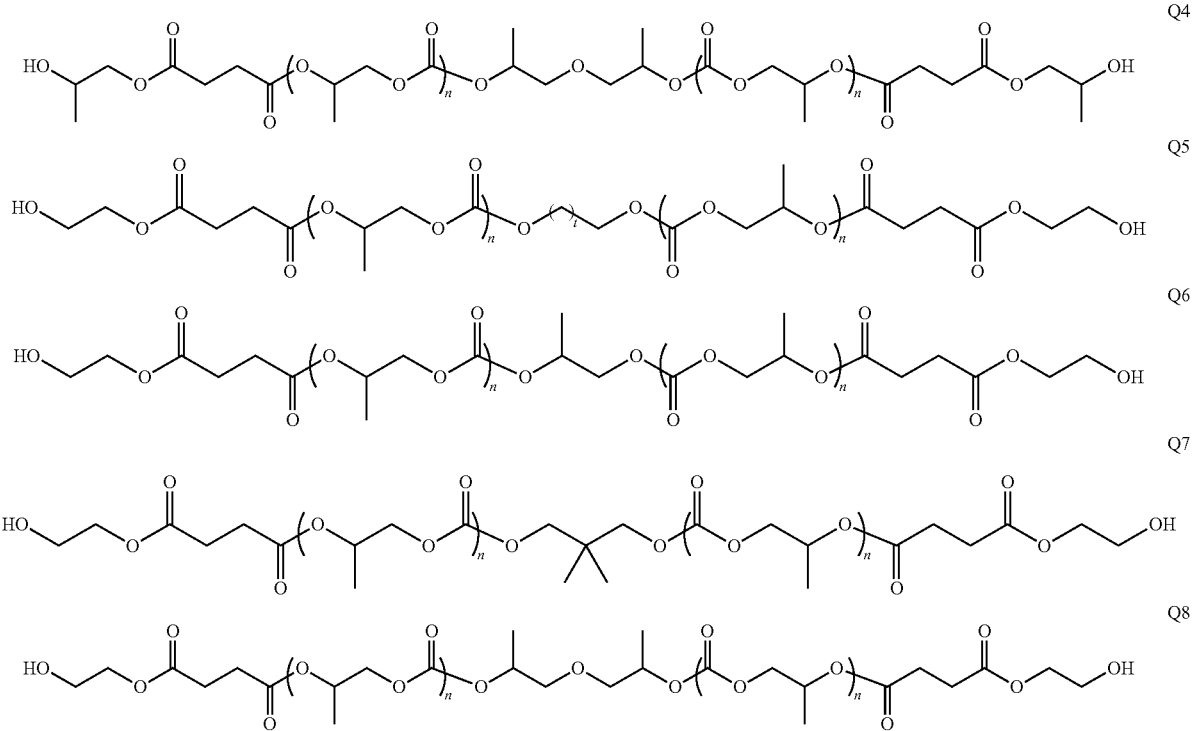

wherein n is as defined above and in classes and subclasses herein, and t is from 0 to 10. In some embodiments, t is from 1 to 10.

In certain embodiments, the present invention encompasses compositions comprising:

Poly(propylene carbonate) of any of formulae Q1 through Q8 having an average molecular weight number of between about 500 g/mol and about 3,000 g/mol (e.g. each n is between about 3 and about 15), a polydisperisty index less than about 1.25, at least 95% carbonate linkages, and at least 98% —OH end groups;

Poly(propylene carbonate) of any of formulae Q1 through Q8 having an average molecular weight number of about 500 g/mol (e.g. n is on average between about 3.5 and about 4.5), a polydisperisty index less than about 1.25, at least 95% carbonate linkages, and at least 98% —OH end groups;

Poly(propylene carbonate) of any of formulae Q1 through Q8 having an average molecular weight number of about 1,000 g/mol (e.g. n is on average between about 3.5 and about 4.5), a polydisperisty index less than about 1.25, at least 95% carbonate linkages, and at least 98% —OH end groups;

Poly(propylene carbonate) of any of formulae Q1 through Q8 having an average molecular weight number of about 2,000 g/mol (e.g. n is on average between about 8 and about 9.5), a polydisperisty index less than about 1.25, at least 95% carbonate linkages, and at least 98% —OH end groups;

Poly(propylene carbonate) of any of formulae Q1 through Q8 having an average molecular weight number of about 3,000 g/mol (e.g. n is on average between about 13 and about 15), a polydisperisty index less than about 1.25, at least 95% carbonate linkages, and at least 98% —OH end groups.

In certain embodiments, the aliphatic polycarbonate polyol compositions of the present invention are selected from the group consisting of Q9, Q10, Q11, Q12, Q13, Q14, and mixtures of any two or more of these.

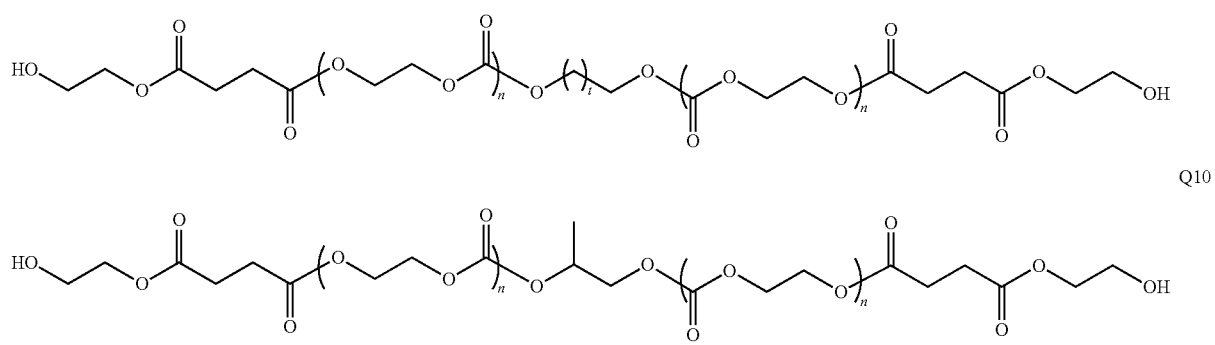

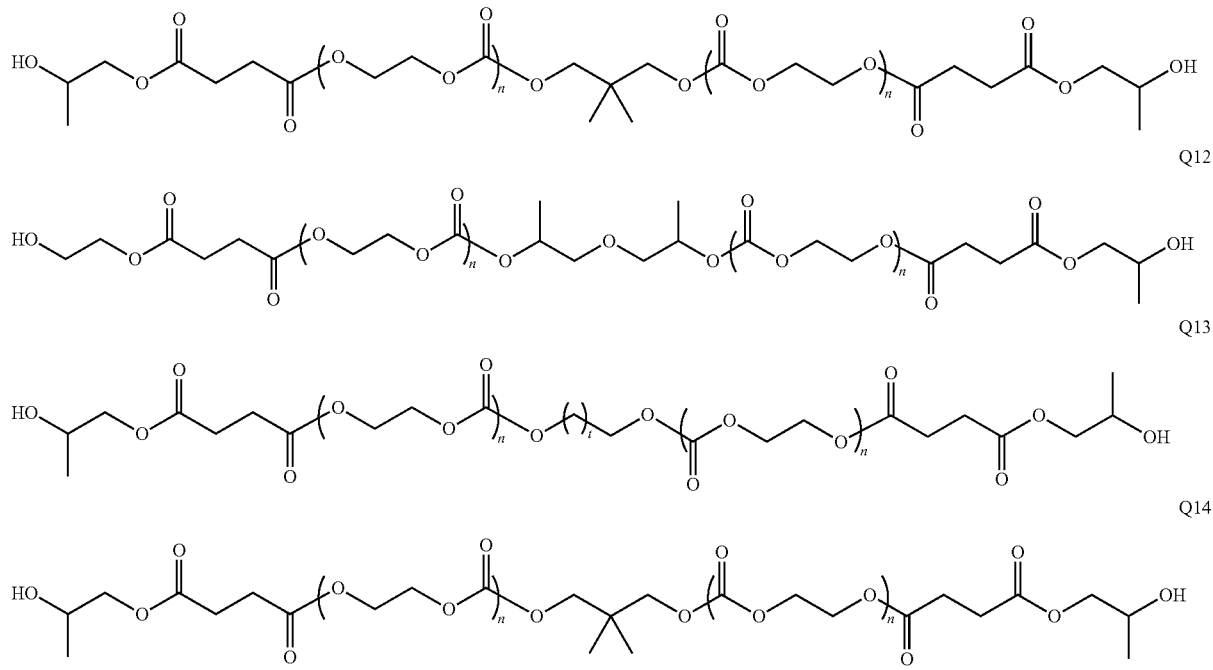

wherein n is as defined above and in classes and subclasses herein, and t is from 0 to 10. In some embodiments, t is from 1 to 10.

In certain embodiments, the present invention encompasses compositions comprising:

Poly(ethylene carbonate) of any of formulae Q9 through Q14 having an average molecular weight number of between about 500 g/mol and about 3,000 g/mol (e.g. each n is between about 4 and about 16), a polydisperisty index less than about 1.25, at least 95% carbonate linkages, and at least 98% —OH end groups;

Poly(ethylene carbonate) of any of formulae Q9 through Q14 having an average molecular weight number of about 500 g/mol (e.g. n is on average between about 4 and about 5), a polydisperisty index less than about 1.25, at least 85% carbonate linkages, and at least 98% —OH end groups;

Poly(ethylene carbonate) of any of formulae Q9 through Q14 having an average molecular weight number of about 1,000 g/mol (e.g. n is on average between about 4 and about 5), a polydisperisty index less than about 1.25, at least 85% carbonate linkages, and at least 98% —OH end groups;

Poly(ethylene carbonate) of any of formulae Q9 through Q14 having an average molecular weight number of about 2,000 g/mol (e.g. n is on average between about 10 and about 11), a polydisperisty index less than about 1.25, at least 85% carbonate linkages, and at least 98% —OH end groups;

Poly(ethylene carbonate) of any of formulae Q9 through Q14 having an average molecular weight number of about 3,000 g/mol (e.g. n is on average between about 15 and about 17), a polydisperisty index less than about 1.25, at least 85% carbonate linkages, and at least 98% —OH end groups;

II. Methods of Making

In another aspect, the present invention encompasses methods of producing the polyol compositions described above. In certain embodiments, such methods comprise the steps of reacting a polycarbonatepool with end groups of formula

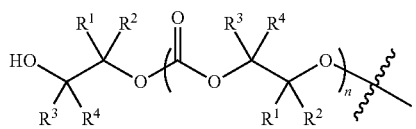

with a cyclic acid anhydride having a formula

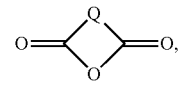

to provide a polycarbonate polyol with chain ends having a formula

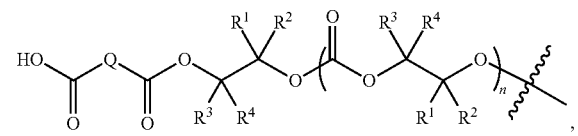

and then further treating this polyol with an epoxide of formula

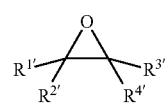

to yield a polymer composition with end groups having formula E1,

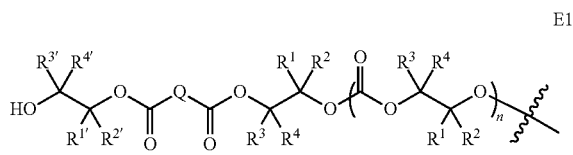

E1

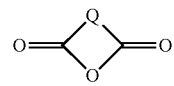

where each of $R^1$, $R^2$, $R^3$, $R^4$, $R^{1'}$, $R^{2'}$, $R^{3'}$, $R^{4'}$, n, and Q are as defined above and in the classes and subclasses herein.

In certain embodiments, aliphatic polycarbonate polymers described above are derived from a polycarbonate polyol of formula P1-OH by end-capping with a suitable cyclic acid anhydride, followed by addition of an epoxide. In certain embodiments, such reactions conform to the Scheme 1 below, where each of $R^1$, $R^2$, $R^3$, $R^4$, $R^{1'}$, $R^{2'}$, $R^{3'}$, $R^{4'}$, n, ⊘, and Q are as defined above and in the classes and subclasses herein.

where Q is as defined above and in the classes and subclasses herein.

In certain embodiments, the present invention comprises the step of treating a polymer of formula P1-OH with succinic anhydride. In certain embodiments, the present invention comprises the step of treating a polymer of formula P1-OH with maleic anhydride. In certain embodiments, the present invention comprises the step of treating a polymer of formula P1-OH with glutaric anhydride. In certain embodiments, the present invention comprises the step of treating a polymer of formula P1-OH with phthalic anhydride. In certain embodiments, the present invention comprises the step of treating a polymer of formula P1-OH with methyl succinic anhydride.

In certain embodiments, the step of treating the polymer of formula P1-OH with a cyclic acid anhydride comprises Scheme 1

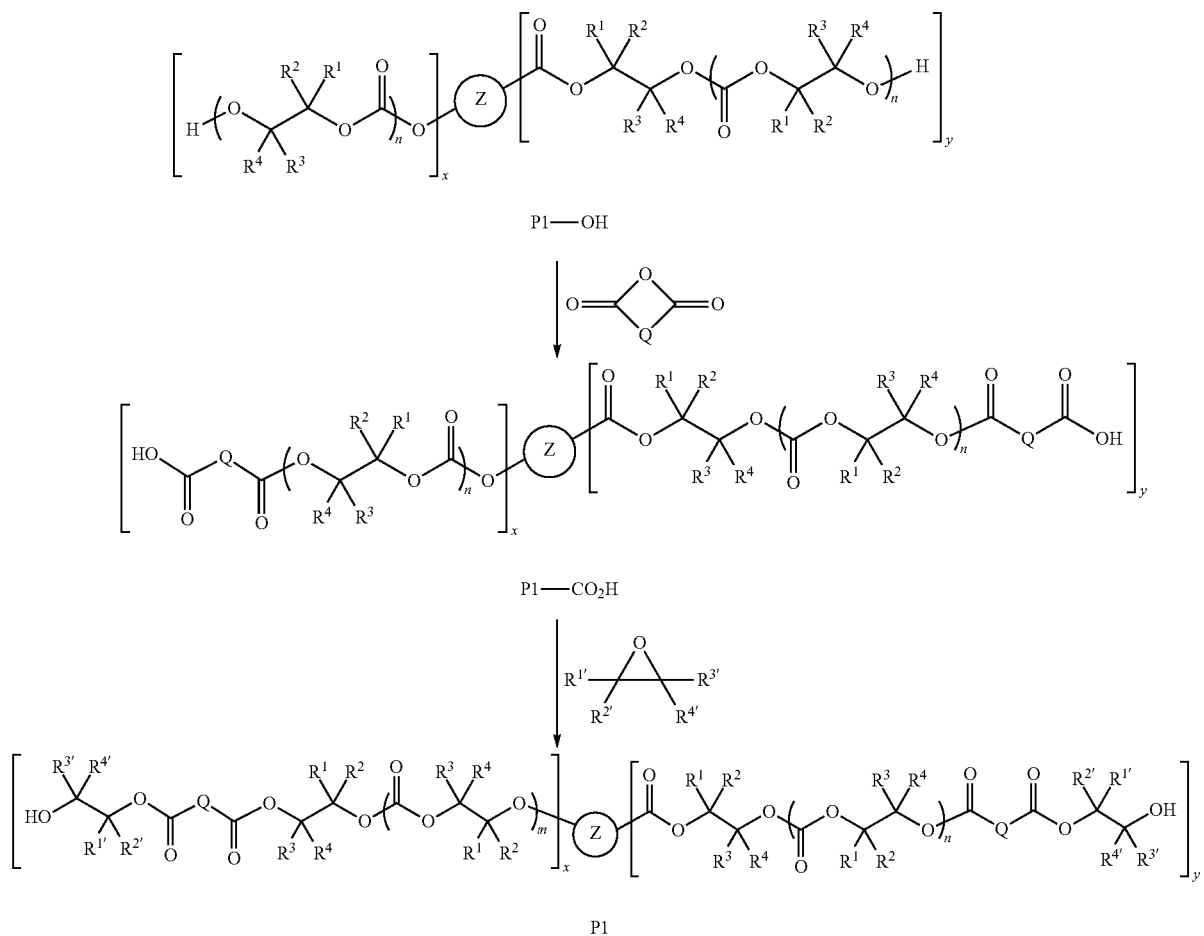

In certain embodiments, methods of the present invention comprise the step of treating a polymer of formula P1-OH with a cyclic acid anhydride to provide a polymer of formula P1-CO$_2$H. In certain embodiments, the cyclic anhydride has a formula contacting the polymer with the cyclic anhydride in the presence of one or more catalysts. In certain embodiments, a catalyst comprises an esterification catalyst. In certain embodiments, an esterification catalyst is selected from the group consisting of:

Esterification and acylation catalysts such as those reported in Grasa, G. A.: et al. *Synthesis* 2004, 7, 971. and Otera, *J. Chem. Rev.* 1993, 93, 1449;

Aromatic and alkyl amines, for example: Pyridine, lutidine, 4-dimethylaminopyridine, tetramethylethylenediamine, triethylamine, diisopropylethylamine, DBU, TBD, MTBD, DABCO, guanidines;

Phosphines and phosphazenes, for example: tributylphosphine, triphenylphosphine, and Bis(triphenylphosphphine) iminium chloride (PPNCl);

Metal salts. For example, halide, triflate or perchlorate salts derived from: trimethylsilyl, lithium, magnesium, indium, tin, bismuth, titanium, copper, scandium, nickel, cobalt, ruthenium, silver, lanthium, and zinc;

Other nitrogen-containing heterocycles. For example, imidazoles, such as 1-methylimidazole, 1-phenethylimidazole, 1-isopropylimidazole, imidazole and the like;

Bronsted Acids, for example: HCl, $H_2SO_4$, methanesulfonic acid, toluenesulfonic acid, and $H_3PO_4$;

Lewis acids, for example: bismuth 2-ethylhexanoate, tin (2-ethylhexanoate), tin(II)sterate, tin(II)acetate, dibutyltin dilaurate, molybdenum dichloro dioxide, iron trichloride, zinc oxide, tin oxide, silica chloride;

Organometallic catalysts known to form polycarbonates from epoxides and carbon dioxide, for example: (salcy) MX (salcy=N,N'-bis(3,5-di-tert-butylsalicylidene)-1,2-diaminocyclohexane; M=Al, Co, Cr, Mn; X=halide or carboxylate), zinc glutarate, TPPM-X (TPP=tetraphenylphorphyrin; M=Al, Co, Cr; X=halide or alkoxide), (beta-diiminate)zinc acetate;

Solid acids or bases and ion exchange resins, for example: Amberlyst-15, poly(4-vinylpyridine), montmorillite K-10, montmorillite KSF, zeolite, alumina, silica, solid supported sulfonic acids, Nafion-H, $HBF_4$ on $SiO_2$, $HClO_4$ on $SiO_2$.

In certain embodiments, the step of treating the polymer of formula P1-OH with a cyclic acid anhydride comprises contacting the polymer with the cyclic anhydride in the presence of a catalyst utilized to copolymerize the epoxide(s) and $CO_2$. In certain embodiments, the present invention comprises quenching a copolymerization of $CO_2$ and one or more epoxides with a cyclic acid anhydride to provide a product of formula P1-$CO_2$H.

In certain embodiments, methods of the present invention comprise the additional step of treating the product of formula P1-$CO_2$H with epoxide to provide a product of formula P1. In certain embodiments, the epoxide is selected from ethylene oxide, propylene oxide, and mixtures of these.

In certain embodiments, methods of the present invention comprise contacting the product of formula P1-$CO_2$H with epoxide. In certain embodiments, the step of contacting with epoxide is performed in the presence of one or more second catalysts. In certain embodiments, the step of contacting with epoxide is performed with heating. In certain embodiments, the second catalyst is characterized in that it catalyzes the ring-opening of epoxide by carboxylic acids or their salts. In certain embodiments, the second catalyst is characterized in that it catalyzes the ring-opening of epoxide by carboxylic acids or their salts, but does not catalyze the ring-opening of epoxide by alcohols. In certain embodiments, a second catalyst is selected from the group consisting of:

Bronsted bases capable of deprotonation of carboxylic acids, for example: triethylamine, pyridine, lutidine, 4-dimethylaminopyridine, tetramethylethylenediamine, triethylamine, diisopropylethylamine, DBU, TBD, MTBD, DABCO, guanidine, ammonia, $K_3PO_4$, $K_2CO_3$, $NaHCO_3$, and NaOH;

Lewis and Bronsted acids known to activate epoxides for nucleophilic addition, for example: boron trifluoride, $H_3PO_4$, toluenesulfonic acid, tetrabutylammonium bromide, tetrabutylphosphonium bromide, cesium triflate, chromium acetate;

Organometallic catalysts known to form polycarbonates from epoxides and carbon dioxide, for example: (salcy) MX (salcy=N,N'-bis(3,5-di-tert-butylsalicylidene)-1,2-diaminocyclohexane; M=Al, Co, Cr, Mn; X=halide or carboxylate), zinc glutarate, TPPM-X (TPP=tetraphenylphorphyrin; M=Al, Co, Cr; X=halide or alkoxide), (beta-diiminate) zinc acetate;

Solid supported bases and ion exchange resins, for example: Poly(4-vinylpyridine, zeolite, alumina, Amberlyst A-21, Amberlite IRA-743.

In certain embodiments, the present invention provides methods of quenching a reaction mixture resulting from the copolymerization of $CO_2$ and one or more epoxides. In certain embodiments, the said copolymerization is catalyzed by a metal complex and the reaction mixture contains the metal complex or residues thereof. In certain embodiments, the reaction comprises treating a polymerization reaction mixture or aliphatic polycarbonate polyol with a cyclic acid anhydride of formula

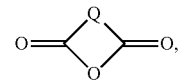

optionally in the presence of an esterification catalyst.

In certain embodiments, where the reaction mixture to be quenched contains unreacted epoxide and the copolymerization was catalyzed by a metal complex, the product of the quenching method is a compound of formula P1. In certain embodiments of the inventive quench methods, the treatment of the reaction mixture with the acid anhydride results first in formation of an intermediate product of formula P1-$CO_2$H and the metal complex or residues thereof further catalyze reaction of residual epoxide from the copolymerization reaction with intermediate P1-$CO_2$H to provide the product P1. In certain embodiments, such methods include the additional step of removing $CO_2$ pressure from the copolymerization mixture prior to treating with the cyclic acid anhydride.

III. Higher Polymers

In another aspect, the present invention encompasses higher polymers resulting from the reaction of polymers of formula P1 with cross-linking agents. In certain embodiments, such cross-linking agents comprise polyisocyanates, melamine, phenol formaldehyde resins, and the like. In certain embodiments, such high polymers comprise the reaction product of any of the inventive polyols described herein above with one or more polyisocyanates. In certain embodiments, the present invention encompasses higher polymers resulting from the reaction of polymers of formula P1 as defined above and in the classes and subclasses herein with any of the isocyanates described in APPENDIX I.

In certain embodiments, the present invention encompasses higher polymers resulting from the reaction of polymers of formula P1 as defined above and in the classes and subclasses herein in combination with any of the coreactants described in APPENDIX II with any of the isocyanates described in APPENDIX I.

In certain embodiments, the present invention encompasses articles of manufacture comprising from polyol compositions of formula P1 as defined above and in the classes and subclasses herein. In certain embodiments, the present invention encompasses coatings, adhesives, foams, thermoplastics, composites, sealants, or elastomers derived from polyol compositions of formula P1.

EXEMPLIFICATION

Example 1

Synthesis of Aliphatic a Polycarbonate Composition of Formula Q3

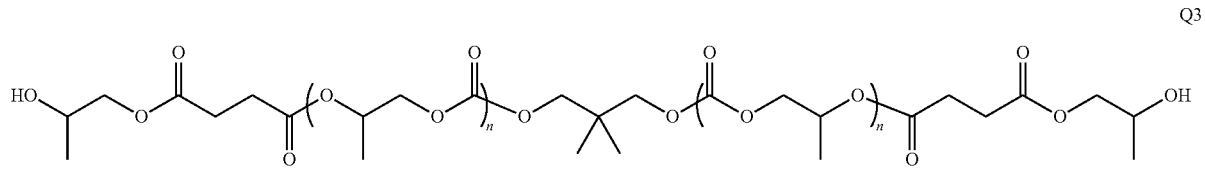

Step 1a Synthesis of Acid-Terminated Polymer 100 g of poly(propylene carbonate) polyol of formula

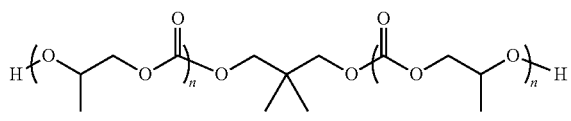

and having a number average molecular weight (Mn) of 1,490 g/mol, a PDI of 1.1, and a carbonate content greater than 99% was combined with acetonitrile (100 mL) in a 500 mL round bottom flask. Succinic anhydride (20 g, 0.2 mol) was charged and the reaction was allowed to stir at rt for 20 min. 4-dimethylaminopyridine (DMAP) (12 g, 0.1 mol) was added portion-wise over 1 min and the reaction was held at rt, under nitrogen, for 21 h.

The reaction was concentrated, in vacuo, at 50° C. and diluted with dichlormethane (100 mL) and quenched with 1N HCl (50 mL). The reaction mixture was allowed to stir at rt for 15 min, then layers separated. The organic layer was washed with water (3×50 mL), brine (20 mL), and dried over $MgSO_4$. The organic layer was filtered and concentrated, in vacuo, at 65° C. to produce a faint yellow polyol (101 g, 80% yield). The product conforms to formula:

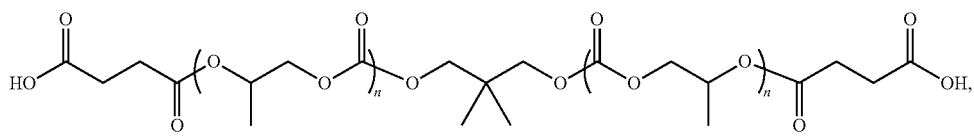

GPC: Mn=1,743 g/mol, PDI=1.1; Acid#81.5 mg KOH/g; $^1$H NMR (DMSO-$d_6$, 400 MHz, see FIG. 1).

Figure 2:
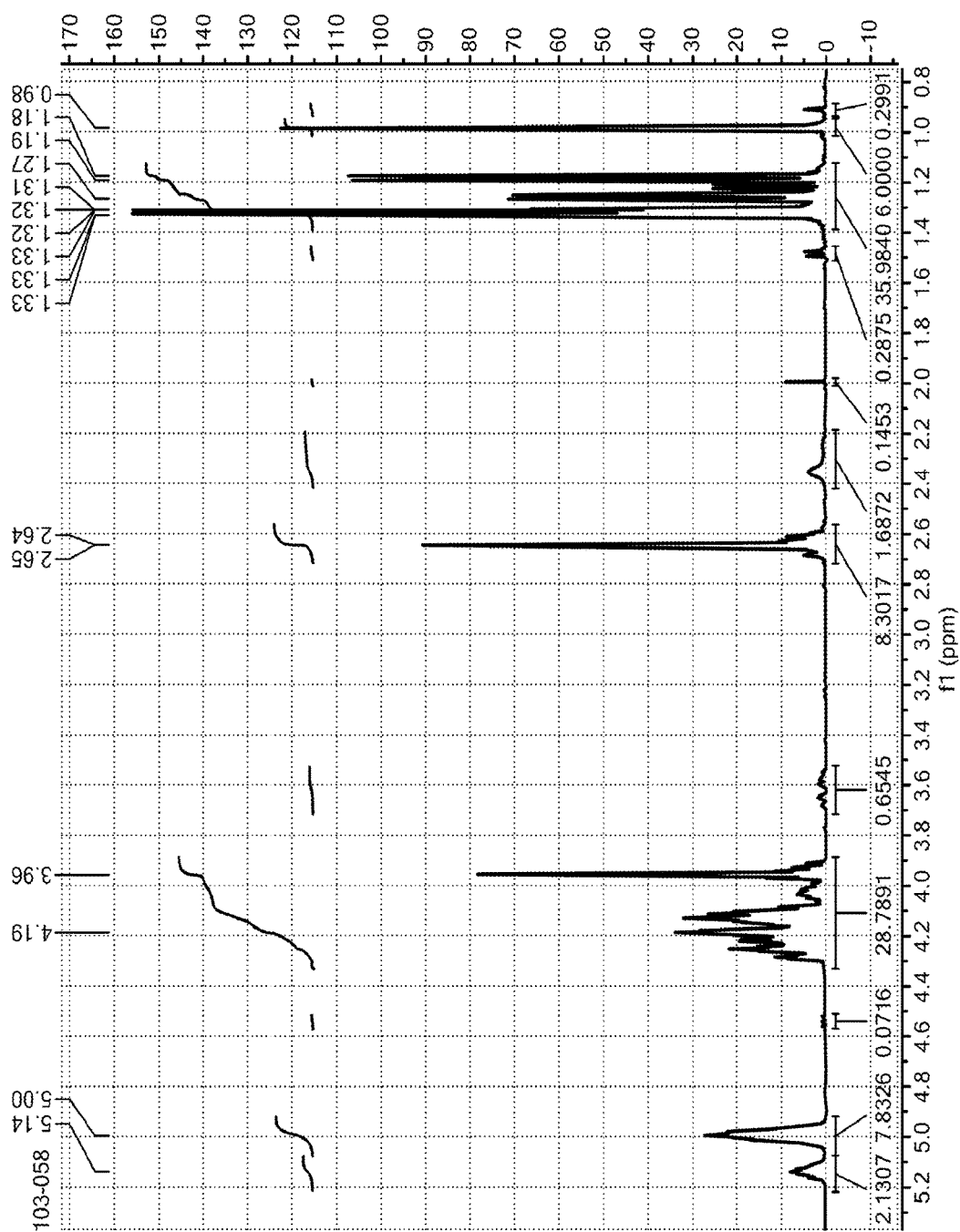
FIG. 2 depicts a $^1$H-NMR of a polycarbonate composition of formula Q3.

Step 1b Reaction of the Acid-Terminated Polymer with Epoxide 100 g of product from Step 1a was combined with acetonitrile (25 mL) and propylene oxide (50 mL, 0.71 mol) in a 250 mL round bottom flask and stirred at rt, under nitrogen, for 1 h. ($7.0 \times 10^{-4}$ mol) of a cobalt(III) salcy catalyst was charged and the reaction was stirred at rt for 16 h, then concentrated, in vacuo. The reaction mixture was diluted with 50 mL acetonitrile, stirred over celite, filtered and concentrated, in vacuo, to provide a polymer of formula Q3 as a faint yellow viscous liquid (77 g, 80% yield): $M_n$=1980 g/mol, PDI=1.1; OH#77 mg KOH/g. $^1$H NMR ($CDCl_3$, 400 MHz, FIG. 2)

Example 2

Synthesis of an Aliphatic Polycarbonate Composition of Formula P2a:

where ⓩ is and Y is

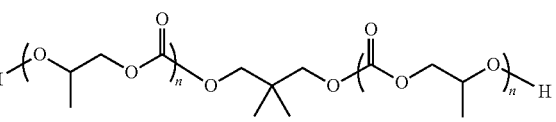

Step 2a Synthesis of Acid-Terminated Polymer 100 g of poly(propylene carbonate) polyol of formula and having a number average molecular weight (Mn) of 1,490 g/mol and a PDI of 1.1, is treated according to the conditions of Example 1, Step 1a, except glutaric anhydride is used in place of succinic anhydride to afford a product of formula P1-CO₂H

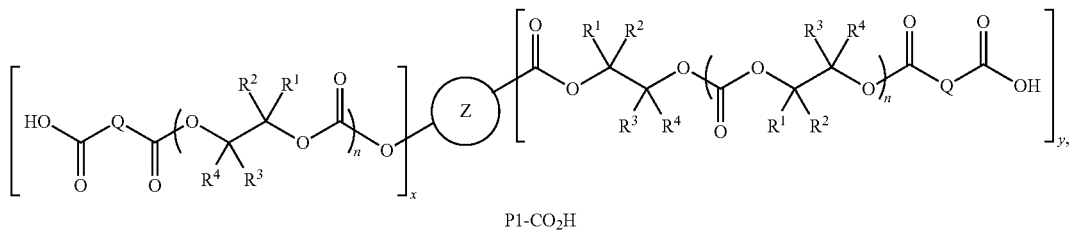

P1-CO₂H where Ⓩ is

$R^1$, $R^2$, and $R^3$ are —H, $R^4$ is —CH$_3$, Q is —CH$_2$CH$_2$CH$_2$—, x is 2 and y is 0.

Step 2b Reaction of the Acid-Terminated Polymer with Epoxide

The product of Step 2a is combined with acetonitrile (25 mL) and propylene oxide (50 mL, 0.71 mol) in a 250 mL round bottom flask and stirred at rt, under nitrogen, for 1 h. (7.0×10⁻⁴ mol) of a cobalt(III) salcy catalyst is added and the reaction is stirred at rt for 16 h, then concentrated, in vacuo. The reaction mixture is diluted with acetonitrile (50 mL), stirred over celite, filtered and concentrated, in vacuo, to provide the desired product.

Example 3

Synthesis of an Aliphatic Polycarbonate Composition of Formula

P2a:

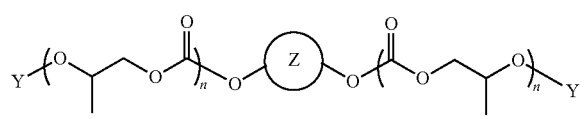

P2a where Ⓩ is

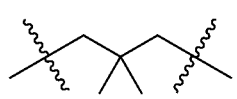 [SMILES: *CC(C)(C)C*]

and Y is

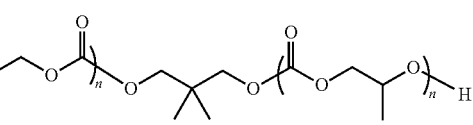

Step 3a Synthesis of Acid-Terminated Polymer 100 g of poly(propylene carbonate) polyol of formula

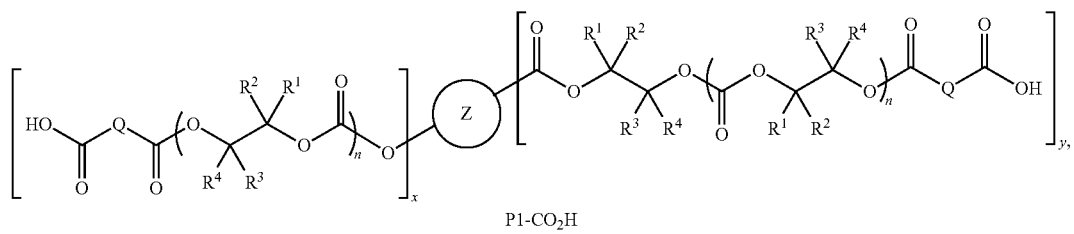

and having a number average molecular weight (Mn) of 1,490 g/mol and a PDI of 1.1, is treated according to the conditions of Example 1, Step 1a, except phthalic anhydride is used in place of succinic anhydride to afford a product of formula P1-CO₂H

P1-CO₂H where ⊙ is

$R^1$, $R^2$, and $R^3$ are —H, $R^4$ is —CH$_3$, Q is

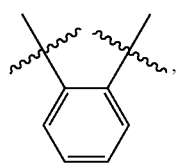 [SMILES: *c1ccccc1*]

x is 2 and y is 0.

Step 3b Reaction of the Acid-Terminated Polymer with Epoxide

The product of Step 3a is combined with acetonitrile (25 mL) and propylene oxide (50 mL, 0.71 mol) in a 250 mL round bottom flask and stirred at rt, under nitrogen, for 1 h. (7.0×10$^{-4}$ mol) of a cobalt(III) salcy catalyst is added and the reaction is stirred at rt for 16 h, then concentrated, in vacuo. The reaction mixture is diluted with acetonitrile (50 mL), stirred over celite, filtered and concentrated, in vacuo, to provide the desired product.

Example 4

Synthesis of Aliphatic a Polycarbonate Composition of Formula Q7

100 g of product from Step 1a of Example 1 above is combined with acetonitrile (25 mL) and ethylene oxide (0.71 mol) in a 250 mL round bottom flask and stirred at rt, under nitrogen, for 1 h. (7.0×10$^{-4}$ mol) of a cobalt(III) salcy catalyst is charged and the reaction is stirred at rt for 16 h, then concentrated, in vacuo. The reaction mixture is diluted with 50 mL acetonitrile, stirred over celite, filtered and concentrated, in vacuo, to provide a polymer of formula Q7.

Example 5

Examples of Improved Thermal and Base Stability of the Inventive Polymers

Example 5a

Experimental Determination of Thermal Stability of Aliphatic Polycarbonate Compositions of Formula Q3

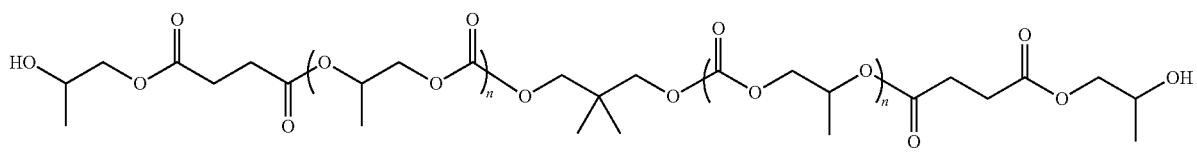

Q3

Figure 3:
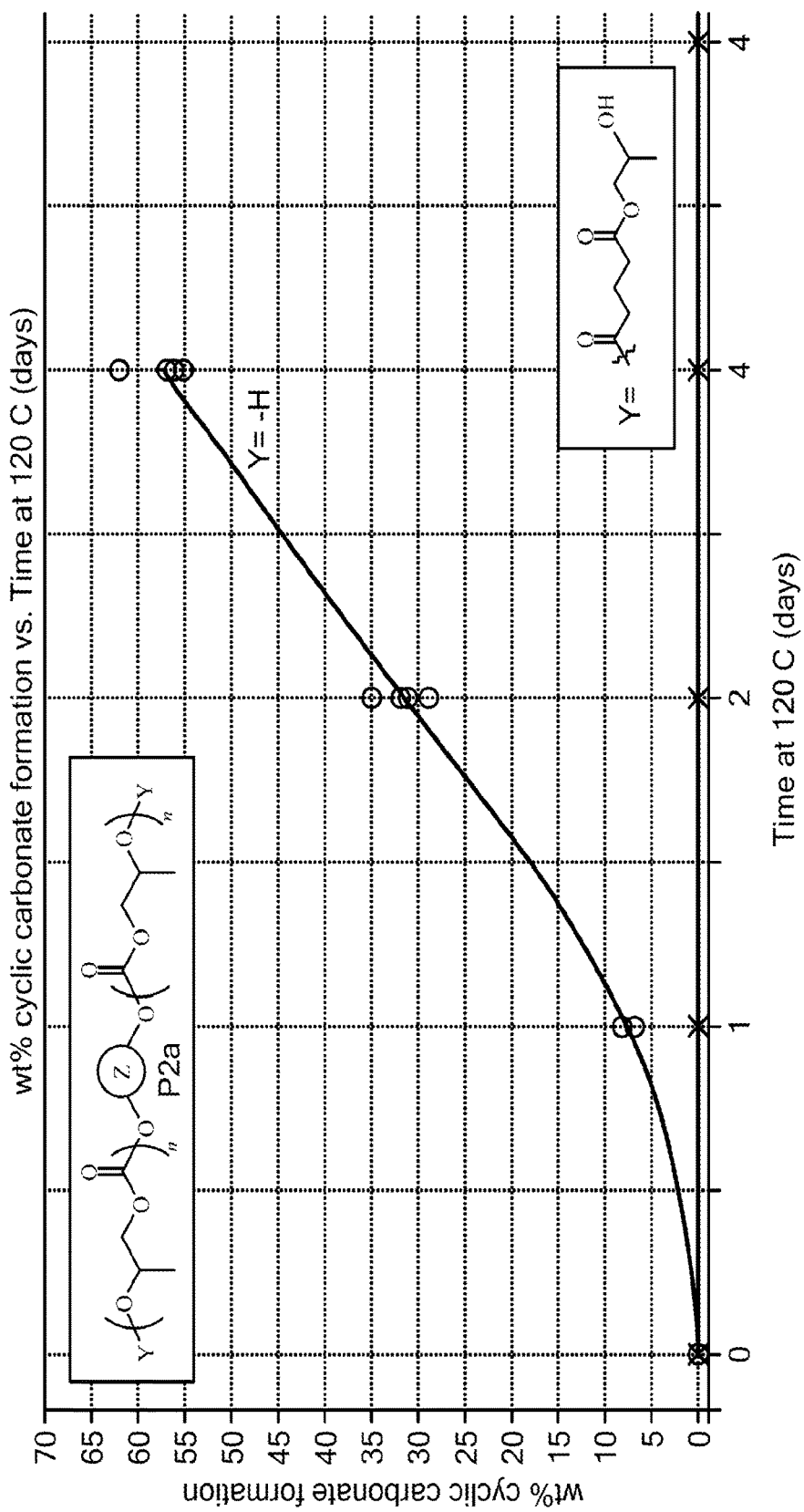
FIG. 3 depicts the results of a comparative thermal stability study on aliphatic polycarbonate compositions of formula Q3.

10 g of poly(propylene carbonate) polyol of formula Q3 having an a number average molecular weight (Mn) of 1,743 g/mol, and a PDI=1.1 and 10 g of a control poly(propylene carbonate) polyol of formula:

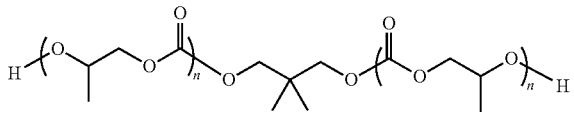

having an Mn of 1,490 g/mol and a PDI of 1.1 were placed in 4 oz steel cans and heated in a 120° C. convection oven. Samples were removed at 24 h intervals and analyzed by $^1$H NMR for formation of cyclic carbonate. The results in FIG. 3 show that the aliphatic polycarbonate with composition Q3 produced <1 wt % cyclic carbonate over 3 days at 120° C., while the control poly(propylene carbonate) polyol had decomposed to >50 wt % cyclic carbonate.

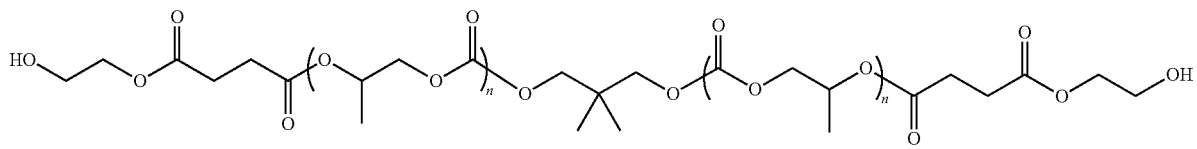

Q7

Example 5b

Experimental Determination of Improved Stability of Aliphatic Polycarbonate Compositions of Formula Q3 in the Presence of Triethylamine

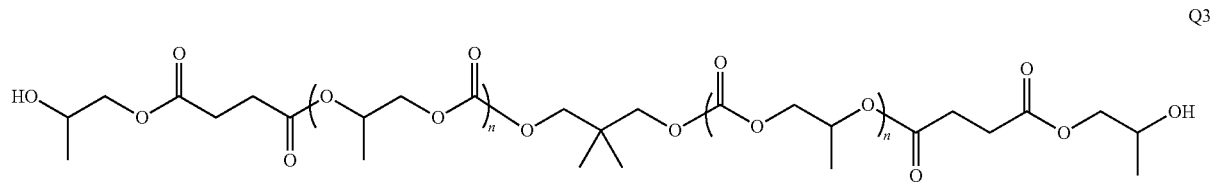

Q3

Figure 4:
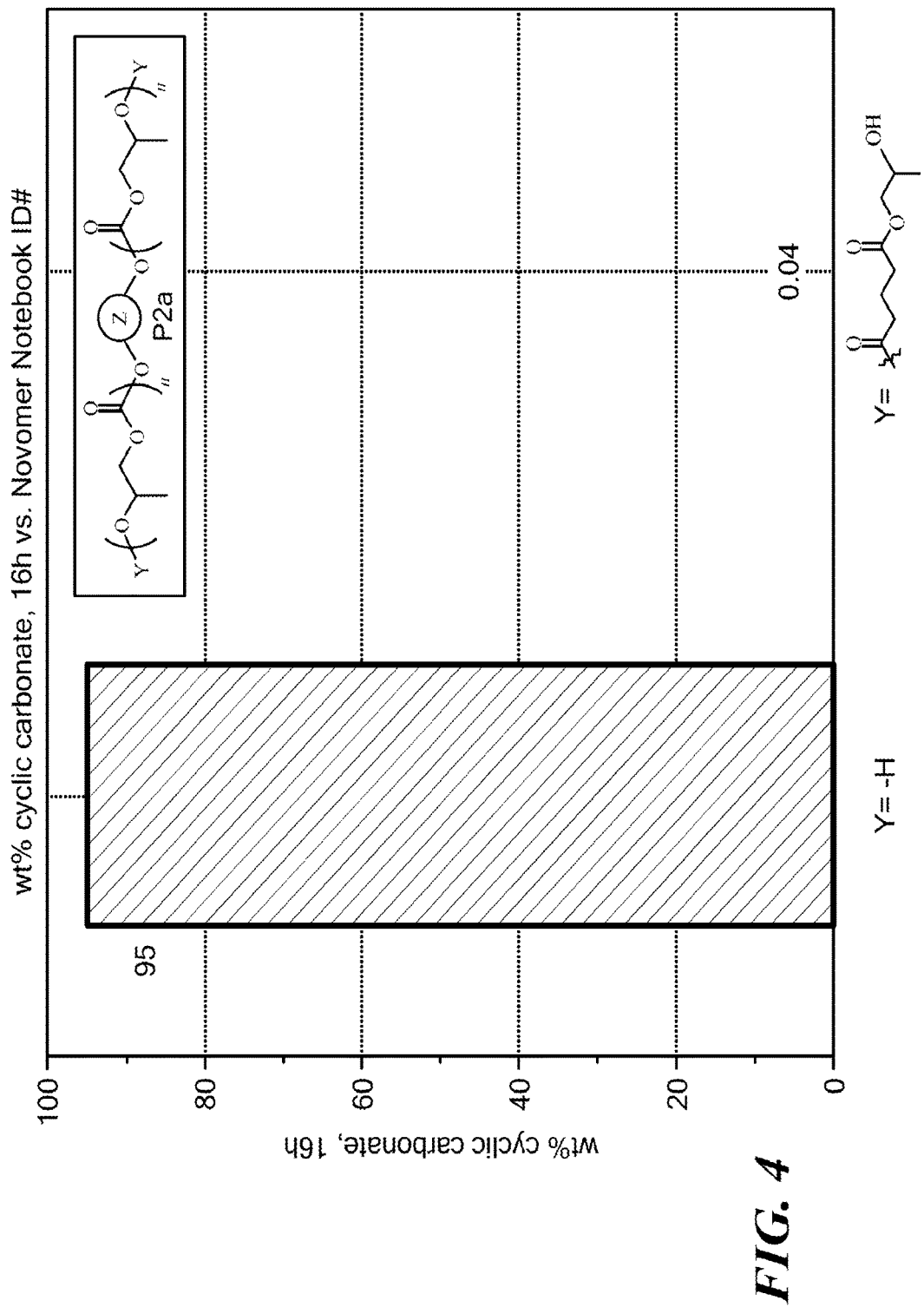
FIG. 4 depicts comparative stability of aliphatic polycarbonate compositions in the presence of trimethylamine.

0.5 g of poly(propylene carbonate) polyol of formula Q3 and 0.5 g of the control poly(propropylene carbonate) polyol (both as described in Example 5a) were placed in 20 mL glass vials, charged with triethylamine (25 mg, 5 wt %) and heated to 50° C. in an aluminum reaction block. Samples were removed after 16 h and analyzed by $^1$H NMR for formation of cyclic carbonate (FIG. 4). The results confirm that the inventive polycarbonate Q3 is more stable to triethylamine than the unmodified polyol.

Example 5c

Figure 5:
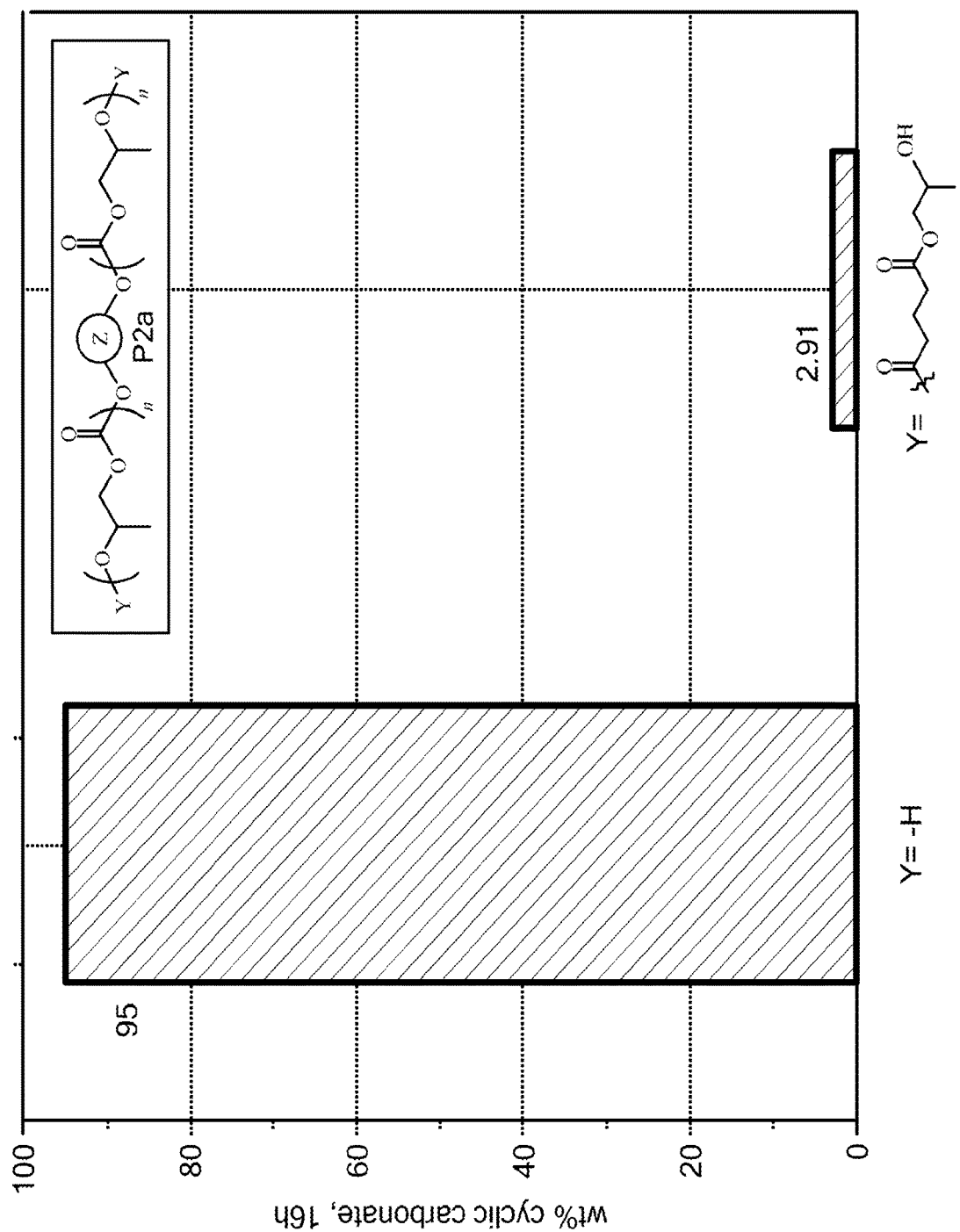
FIG. 5 depicts comparative stability of aliphatic polycarbonate compositions in the presence of dibutylamine.

Experimental Determination of Improved Stability of Aliphatic Polycarbonate Compositions of Formula Q3 in the Presence of Dibutylamine 0.5 g of poly(propylene carbonate) polyol of formula Q3 and 0.5 g of the control poly(propropylene carbonate) polyol (both as described in Example 5a) were placed in 20 mL glass vials, charged with dibutylamine (25 mg, 5 wt %), and heated to 50° C. using an aluminum reaction block. Samples were removed after 16 h and analyzed by 1H NMR for formation of cyclic carbonate (FIG. 5). The results confirm that the inventive polycarbonate Q3 is more stable to tributylamine than the unmodified polyol.

Example 6

Two-Step, One-Pot Reaction to the Ester End-Capped Polyol

Synthesis of an Aliphatic Polycarbonate Composition of Formula P2a:

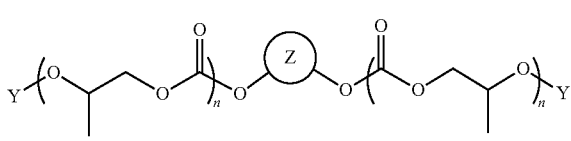

P2a where Ⓩ is (structure)

and Y is (structure)

428 g of poly(propylene carbonate) polyol of formula (structure)

and having a number average molecular weight (Mn) of 1,490 g/mol, a PDI of 1.1, and a carbonate content greater than 99% was combined with methyl propionate (135 mL) in a 500 mL round bottom flask. Succinic anhydride (89 g, 0.88 mol) was charged and the reaction was allowed to stir at 75° C. for 30 min. Di-isopropyl ethyl amine (10.8 g, 0.09 mol) was added portion-wise over 6 minutes and the reaction was stirred at 75° C., under nitrogen, for 4 hours. A sample of the reaction mixture indicated >99% conversion to the desired acid end-capped polyol P1-CO$_2$H

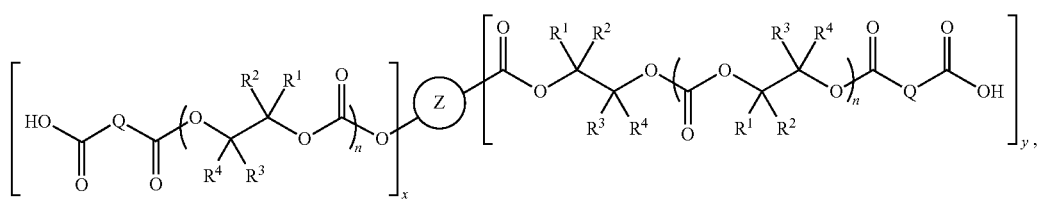

P1-CO$_2$H where ⊗ is

$R^1$, $R^2$, and $R^3$ are —H, $R^4$ is —$CH_3$, Q is

x is 2 and y is 0. The reaction mixture was cooled to room temperature and propylene oxide (99 g, 1.7 mol) was added. A salcy cobalt(III) catalyst (2.1×10$^{-3}$ mol) was added and the mixture was stirred for an additional 4 hours. A sample was taken to show that intermediate polyol P1-CO$_2$H was converted to the desired product P2a:

P2a

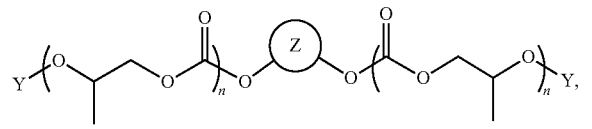

where ⊗ is

and Y is

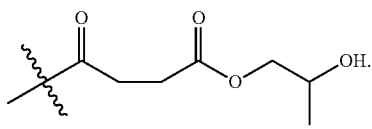 [SMILES: *C(=O)CCC(=O)OCC(C)O]

The polyol solution was stirred over Microcel C (60 g) resin to remove the catalysts, filtered and then the solvent was removed in vacuo to provide the desired end-capped product.

Example 7

Two-Step, One-Pot Reaction to the Ester End-Capped Polyol

Synthesis of an Aliphatic Polycarbonate Composition of Formula P2a:

P2a

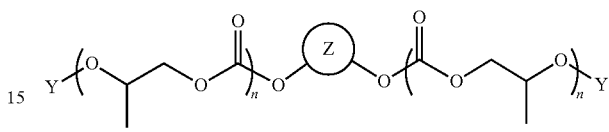

where ⊗ is

and Y is

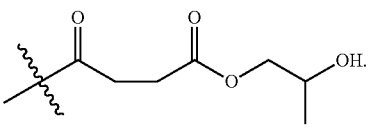

94 g of poly(propylene carbonate) polyol of formula

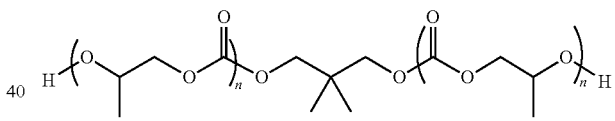

and having a number average molecular weight (Mn) of 1,490 g/mol, a PDI of 1.1, and a carbonate content greater than 99% was combined with dibasic ester (106 g) in a 1000 mL round bottom flask and heated to 50° C. Succinic anhydride (21.6 g, 0.22 mol) was charged to the flask and the reaction was allowed to stir at 50° C. for 10 min. Triethyl amine (14.3 g, 0.14 mol) was added portion-wise over 2 minutes and the reaction was stirred at 50° C., under nitrogen, for 1.5 hours. A sample of the reaction mixture indicated >99% conversion to the desired acid end-capped polyol P1-CO$_2$H

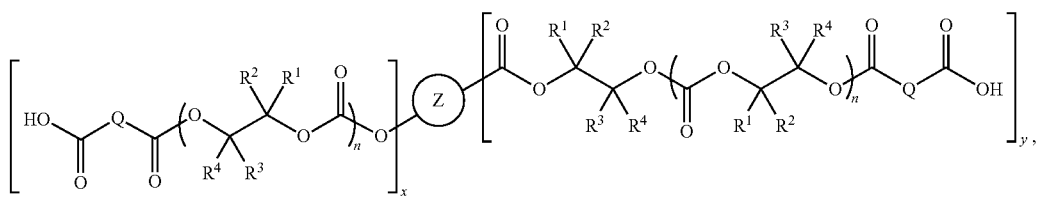

P1-CO$_2$H where ⊙ is

$R^1$, $R^2$, and $R^3$ are —H, $R^4$ is —$CH_3$, Q is

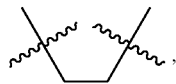 [SMILES: *CC*]

x is 2 and y is 0. Propylene oxide (33 g, 0.56 mol) was added and the mixture was stirred at 50° C. for 23 h. A sample was taken to show that intermediate polyol P1-CO$_2$H was converted to the desired product P2a:

P2a

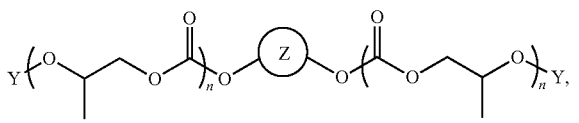

where ⊙ is

and Y is

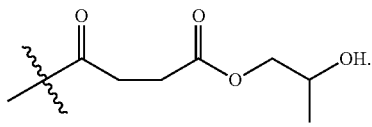 [SMILES: *C(=O)CCC(=O)OCC(C)O]

Example 8

Terminating an Epoxide/CO$_2$ Co-Polymerization with Cyclic Anhydride to Produce an Acid End-Capped Polyol, Followed by Conversion to Hydroxy End-Capped Polyol with Residual Propylene Oxide

Propylene oxide (30 g, 0.52 mol), neopentyl glycol (3.5 g, 0.033 mol) and a salcy cobalt(III) catalyst (45 mg) (see, e.g., WO2010/028362) are added to a 300 mL Parr autoclave. The reactor is brought up to 35° C. and pressurized to 300 psi with CO$_2$. The reaction mixture is stirred for 18 hours (attaining about 90% propylene oxide conversion) and then a mixture of succinic anhydride (6.8 g, 0.068 mol) in methyl propionate (100 mL) is added. The reactor is vented to atmospheric pressure and the temperature is increased to 70° C. for 8 hours.

The reaction mixture is cooled to room temperature, slurried with celite, filtered and the solvent is removed in vacuo to provide the desired product P2a:

P2a

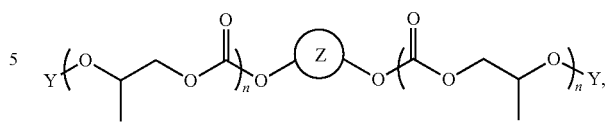

where ⊙ is

and Y is

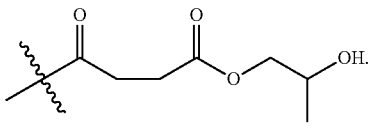 [SMILES: *C(=O)CCC(=O)OCC(C)O]

Example 9

The same procedure of Example 1 is followed, except DMAP is replaced with N-methyl imidazole, triethyl amine, or di-isopropyl amine.

Example 10

The same procedure as Example 6 is followed, except di-isopropyl ethyl amine is replaced with triethyl amine, or a mixture of di-isopropyl amine and triethyl amine is used.

Example 11

The same procedure as Example 7 is followed, except a mixture of di-isopropyl amine and triethyl amine is used.

Example 12

The same procedure as Example 8 is followed, but after venting the reactor, additional catalyst is added.

Example 13

The same procedure as Example 8 is followed, but after venting the reactor, additional propylene oxide is added.

Example 14

The same procedure as Example 8 is followed, but after venting the reactor, triethyl amine (0.5 equivalents relative to neopentyl glycol) is added.

Example 15

The same procedure as Example 8 is followed, but after venting the reactor, a mixture of triethyl amine (0.5 equivalents relative to neopentyl glycol) and di-isoproyl amine (0.5 equivalents relative to neopentyl glycol) are added.

The complete disclosures of all patents, patent applications including provisional patent applications, and publications, and electronically available material cited herein are incorporated by reference. The foregoing detailed description and examples have been provided for clarity of understanding only. No unnecessary limitations are to be understood therefrom. The invention is not limited to the exact details shown and described; many variations will be apparent to one skilled in the art and are intended to be included within the invention defined by the claims.

APPENDIX I

Isocyanate Reagents

As described above, certain compositions of the present invention comprise higher polymers derived from reactions with polyisocyanate reagents. The purpose of these isocyanate reagents is to react with the reactive end groups on the aliphatic polycarbonate polyols to form higher molecular weight structures through chain extension and/or cross-linking.

The art of polyurethane synthesis is well advanced and a very large number of isocyanates and related polyurethane precursors are known in the art. While this section of the specification describes isocyanates suitable for use in certain embodiments of the present invention, it is to be understood that it is within the capabilities of one skilled in the art of polyurethane formulation to use alternative isocyanates along with the teachings of this disclosure to formulate additional compositions of matter within the scope of the present invention. Descriptions of suitable isocyanate compounds and related methods can be found in: *Chemistry and Technology of Polyols for Polyurethanes* Ionescu, Mihail 2005 (ISBN 978-1-84735-035-0), and H. Ulrich, "Urethane Polymers," Kirk-Othmer Encyclopedia of Chemical Technology, 1997, the entirety of each of which is incorporated herein by reference.

In certain embodiments, the isocyanate reagents comprise two or more isocyanate groups per molecule. In certain embodiments, the isocyanate reagents are diisocyanates. In other embodiments, the isocyanate reagents are higher polyisocyanates such as triisocyanates, tetraisocyanates, isocyanate polymers or oligomers, and the like, which are typically a minority component of a mix of predominantly diisocyanates. In certain embodiments, the isocyanate reagents are aliphatic polyisocyanates or derivatives or oligomers of aliphatic polyisocyanates. In other embodiments, the isocyanates are aromatic polyisocyanates or derivatives or oligomers of aromatic polyisocyanates. In certain embodiments, the isocyanates may comprise mixtures of any two or more of the above types of isocyanates.

In certain embodiments, isocyanate reagents usable for the production of the polyurethane adhesive include aliphatic, cycloaliphatic, and aromatic diisocyanate compounds.

Suitable aliphatic and cycloaliphatic isocyanate compounds include, for example, 1,3-trimethylene diisocyanate, 1,4-tetramethylene diisocyanate, 1,6-hexamethylene diisocyanate, 2,2,4-trimethylhexamethylene diisocyanate, 2,4,4-trimethylhexamethylene diisocyanate, 1,9-nonamethylene diisocyanate, 1,10-decamethylene diisocyanate, 1,4-cyclohexane diisocyanate, isophorone diisocyanate, 4,4,'-dicyclohexylmethane diisocyanate, 2,2'-diethylether diisocyanate, hydrogenated xylylene diisocyanate, and hexamethylene diisocyanate-biuret.

Suitable aromatic isocyanate compounds include, for example, p-phenylene diisocyanate, tolylene diisocyanate, xylylene diisocyanate, 4,4'-diphenyl diisocyanate, 2,4'-diphenylmethane diisocyanate, 1,5-naphthalene diisocyanate, 4,4'-diphenylmethane diisocyanate (MDI), 3,3'-methyleneditolylene-4,4'-diisocyanate, tolylenediisocyanate-trimethylolpropane adduct, triphenylmethane triisocyanate, 4,4'-diphenylether diisocyanate, tetrachlorophenylene diisocyanate, 3,3'-dichloro-4,4'-diphenylmethane diisocyanate, and triisocyanate phenylthiophosphate.

In certain embodiments, the isocyanate compound employed comprises one or more of: 4,4'-diphenylmethane diisocyanate, 1,6-hexamethylene hexamethylene diisocyanate and isophorone diisocyanate. In certain embodiments, the isocyanate compound employed is 4,4'-diphenylmethane diisocyanate. The above-mentioned diisocyanate compounds may be employed alone or in mixtures of two or more thereof.

In certain embodiments, an isocyanate reagent is selected from the group consisting of: 1,6-hexamethylaminediisocyanate (HDI), isophorone diisocyanate (IPDI), 4,4' methylene-bis(cyclohexyl isocyanate) ($H_{12}$MDI), 2,4-toluene diisocyanate (TDI), 2,6-toluene diisocyanate (TDI), diphenylmethane-4,4'-diisocyanate (MDI), diphenylmethane-2,4'-diisocyanate (MDI), xylylene diisocyanate (XDI), 1,3-Bis(isocyanatomethyl)cyclohexane (H6-XDI), 2,2,4-trimethylhexamethylene diisocyanate, 2,4,4-trimethylhexamethylene diisocyanate (TMDI), m-tetramethylxylylene diisocyanate (TMXDI), p-tetramethylxylylene diisocyanate (TMXDI), isocyanatomethyl-1,8-ictane diisocyanate (TIN), triphenylmethane-4,4',4"triisocyanate, Tris(p-isocyanatomethyl)thiosulfate, 1,3-Bis(isocyanatomethyl)benzene, 1,4-tetramethylene diisocyanate, trimethylhexane diisocyanate, 1,6-hexamethylene diisocyanate, 1,4-cyclohexyl diisocyanate, lysine diisocyanate, HDI allophonate trimer, HDI urethdione and HDI-trimer and mixtures of any two or more of these.

In certain embodiments, an isocyanate reagent is selected from the group consisting of 4,4'-diphenylmethane diisocyanate, 1,6-hexamethylene diisocyanate, and isophorone diisocyanate. In certain embodiments, an isocyanate reagent is 4,4'-diphenylmethane diisocyanate. In certain embodiments, an isocyanate reagent is 1,6-hexamethylene diisocyanate. In certain embodiments, an isocyanate reagent is isophorone diisocyanate.

Isocyanates suitable for certain embodiments of the present invention are available commercially under various trade names. Examples of suitable commercially available isocyanates include materials sold under trade names: Desmodur® (Bayer Material Science), Tolonate® (Perstorp), Takenate® (Takeda), Vestanat® (Evonik), Desmotherm® (Bayer Material Science), Bayhydur® (Bayer Material Science), Mondur (Bayer Material Science), Suprasec (Huntsman Inc.), Lupranate® (BASF), Trixene (Baxenden), Hartben® (Benasedo), Ucopol® (Sapici), and Basonat® (BASF). Each of these trade names encompasses a variety of isocyanate materials available in various grades and formulations. The selection of suitable commercially-available isocyanate materials as reagents to produce polyurethane compositions for a particular application is within the capability of one skilled in the art of polyurethane coating technology using the teachings and disclosure of this patent application along with the information provided in the product data sheets supplied by the above-mentioned suppliers.

Additional isocyanates suitable for certain embodiments of the present invention are sold under the trade name Lupranate® (BASF). In certain embodiments, the isocyanates are selected from the group consisting of the materials shown in Table 1, and typically from the subset of this list that are between 1.95 and 2.1 functional isocyanates:

TABLE 1

| Products | Description | % NCO | Nominal Funct. |
|---|---|---|---|
| Lupranate M | 4,4' MDI | 33.5 | 2 |
| Lupranate MS | 4,4' MDI | 33.5 | 2 |
| Lupranate MI | 2,4' and 4,4' MDI Blend | 33.5 | 2 |
| Lupranate LP30 | Liquid Pure 4,4' MDI | 33.1 | 2 |
| Lupranate 227 | Monomeric/Modified MDI Blend | 32.1 | 2 |
| Carbodiimide Modified MDI | | | |
| Lupranate 5143 | Carbodiimide Modified 4,4' MDI | 29.2 | 2.2 |
| Lupranate MM103 | Carbodiimide Modified 4,4' MDI | 29.5 | 2.2 |
| Lupranate 219 | Carbodiimide Modified 4,4' MDI | 29.2 | 2.2 |
| Lupranate 81 | Carbodiimide Modified MDI | 29.5 | 2.2 |
| Lupranate 218 | Carbodiimide Modified MDI | 29.5 | 2.2 |
| Polymeric MDI (PMDI) | | | |
| Lupranate M10 | Low Funct. Polymeric | 31.7 | 2.2 |
| Lupranate R2500U | Polymeric MDI Variant | 31.5 | 2.7 |
| Lupranate M20S | Mid-Functionality Polymeric | 31.5 | 2.7 |
| Lupranate M20FB | Mid-Functionality Polymeric | 31.5 | 2.7 |
| Lupranate M70L | High-Functionality Polymeric | 31 | 3 |
| Lupranate M200 | High-Functionality Polymeric | 30 | 3.1 |
| Polymeric MDI Blends and Derivatives | | | |
| Lupranate 241 | Low Functionality Polymeric | 32.6 | 2.3 |
| Lupranate 230 | Low Viscosity Polymeric | 32.5 | 2.3 |
| Lupranate 245 | Low Viscosity Polymeric | 32.3 | 2.3 |
| Lupranate TF2115 | Mid Functionality Polymeric | 32.3 | 2.4 |
| Lupranate 78 | Mid Functionality Polymeric | 32 | 2.3 |
| Lupranate 234 | Low Functionality Polymeric | 32 | 2.4 |
| Lupranate 273 | Low Viscosity Polymeric | 32 | 2.5 |
| Lupranate 266 | Low Viscosity Polymeric | 32 | 2.5 |
| Lupranate 261 | Low Viscosity Polymeric | 32 | 2.5 |
| Lupranate 255 | Low Viscosity Polymeric | 31.9 | 2.5 |
| Lupranate 268 | Low Viscosity Polymeric | 30.6 | 2.4 |
| Select MDI Prepolymers | | | |
| Lupranate 5010 | Higher Functional Prepolymer | 28.6 | 2.3 |
| Lupranate 223 | Low Visc. Derivative of Pure MDI | 27.5 | 2.2 |
| Lupranate 5040 | Mid Functional, Low Viscosity | 26.3 | 2.1 |
| Lupranate 5110 | Polymeric MDI Prepolymer | 25.4 | 2.3 |
| Lupranate MP102 | 4,4' MDI Prepolymer | 23 | 2 |
| Lupranate 5090 | Special 4,4' MDI Prepolymer | 23 | 2.1 |
| Lupranate 5050 | Mid Functional, Mid NCO Prepol | 21.5 | 2.1 |
| Lupranate 5030 | Special MDI Prepolymer | 18.9 | NA |
| Lupranate 5080 | 2,4'-MDI Enhanced Prepolymer | 15.9 | 2 |
| Lupranate 5060 | Low Funct, Higher MW Prepol | 15.5 | 2 |
| Lupranate 279 | Low Funct, Special Prepolymer | 14 | 2 |
| Lupranate 5070 | Special MDI Prepolymer | 13 | 2 |
| Lupranate 5020 | Low Functionality, Low NCO | 9.5 | 2 |
| Toluene Diisocyanate (TDI) | | | |
| Lupranate T80- | 80/20:2,4/2,6 TDI | 48.3 | 2 |
| Lupranate T80- | High Acidity TDI | 48.3 | 2 |
| Lupranate 8020 | 80/20:TDI/Polymeric MDI | 44.6 | 2.1 |

Other isocyanates suitable for certain embodiments of the present invention are sold under the trade name Desmodur® available from Bayer Material Science. In certain embodiments, the isocyanates are selected from the group consisting of the materials shown in Table 2, and typically from the subset of this list that are between 1.95 and 2.1 functional isocyanates:

TABLE 2

| Trade Name | Description |
|---|---|
| Desmodur ® 2460 M | Monomeric diphenylmethane diisocyanate with high 2,4'-isomer content |
| Desmodur ® 44 M | A monomeric diphenylmethane-4,4'-diisocyanate (MDI). |
| Desmodur ® 44 MC | Desmodur 44 MC Flakes is a monomeric diphenylmethane-4,4'-diisocyanate (MDI). |
| Desmodur ® BL 1100/1 | Blocked aromatic polyisocyanate based on TDI |
| Desmodur ® BL 1265 MPA/X | Blocked aromatic polyisocyanate based on TDI |
| Desmodur ® BL 3175 SN | Blocked, aliphatic polyisocyanate based on HDI |
| Desmodur ® BL 3272 MPA | Blocked aliphatic polyisocyanate based on HDI |
| Desmodur ® BL 3370 MPA | Blocked aliphatic polyisocyanate based on HDI |
| Desmodur ® BL 3475 BA/SN | Aliphatic crosslinking stoving urethane resin based on HDI/IPDI |
| Desmodur ® BL 3575/1 MPA/SN | Blocked aliphatic polyisocyanate based on HDI |
| Desmodur ® BL 4265 SN | Blocked, aliphatic polyisocyanate based on IPDI |
| Desmodur ® BL 5375 | Blocked aliphatic polyisocyanate based on H 12 MDI |
| Desmodur ® CD-L | Desmodur CD-L is a modified isocyanate based on diphenylmethane-4,4'-diisocyanate. |
| Desmodur ® CD-S | Desmodur CD-S is a modified isocyanate based on diphenylmethane-4,4'-diisocyanate. |
| Desmodur ® D XP 2725 | Hydrophilically modified polyisocyanate |
| Desmodur ® DA-L | Hydrophilic aliphatic polyisocyanate based on hexamethylene diisocyanate |
| Desmodur ® DN | Aliphatic polyisocyanate of low volatility |
| Desmodur ® E 1160 | Aromatic polyisocyanate prepolymer based on toluene diisocyanate |
| Desmodur ® E 1361 BA | Aromatic polyisocyanate prepolymer based on toluylene diisocyanate |
| Desmodur ® E 1361 MPA/X | Aromatic polyisocyanate prepolymer based on toluene diisocyanate |
| Desmodur ® E 14 | Aromatic polyisocyanate prepolymer based on toluene diisocyanate |
| Desmodur ® E 15 | Aromatic polyisocyanate prepolymer based on toluene diisocyanate. |
| Desmodur ® E 1660 | Aromatic polyisocyanate prepolymer based on toluene diisocyanate. |
| Desmodur ® E 1750 PR | Polyisocyanate prepolymer based on toluene diisocyanate |
| Desmodur ® E 20100 | Modified polyisocyanate prepolymer based on diphenylmethane diisocyanate. |

TABLE 2-continued

| Trade Name | Description |
| --- | --- |
| Desmodur ® E 21 | Aromatic polyisocyanate prepolymer based on diphenylmethane diisocyanate (MDI). |
| Desmodur ® E 2190 X | Aromatic polyisocyanate prepolymer based on diphenylmethane diisocyanate (MDI) |
| Desmodur ® E 22 | Aromatic polyisocyanate prepolymer based on diphenylmethane diisocyanate. |
| Desmodur ® E 2200/76 | Desmodur E 2200/76 is a prepolymer based on (MDI) with isomers. |
| Desmodur ® E 23 | Aromatic polyisocyanate prepolymer based on diphenylmethane diisocyanate (MDI). |
| Desmodur ® E 29 | Polyisocyanate prepolymer based on diphenylmethane diisocyanate. |
| Desmodur ® E 305 | Desmodur E 305 is a largely linear aliphatic NCO prepolymer based on hexamethylene diisocyanate. |
| Desmodur ® E 3265 MPA/SN | Aliphatic polyisocyanate prepolymer based on hexamethylene diisocyanate (HDI) |
| Desmodur ® E 3370 | Aliphatic polyisocyanate prepolymer based on hexamethylene diisocyanate |
| Desmodur ® E XP 2605 | Polyisocyanate prepolymer based on toluene diisocyanate and diphenylmethan diisocyanate |
| Desmodur ® E XP 2605 | Polyisocyanate prepolymer based on toluene diisocyanate and diphenylmethan diisocyanate |
| Desmodur ® E XP 2715 | Aromatic polyisocyanate prepolymer based on 2,4'-diphenylmethane diisocyanate (2,4'-MDI) and a hexanediol |
| Desmodur ® E XP 2723 | Aromatic polyisocyanate prepolymer based on diphenylmethane diisocyanate (MDI). |
| Desmodur ® E XP 2726 | Aromatic polyisocyanate prepolymer based on 2,4'-diphenylmethane diisocyanate (2,4'-MDI) |
| Desmodur ® E XP 2727 | Aromatic polyisocyanate prepolymer based on diphenylmethane diisocyanate. |
| Desmodur ® E XP 2762 | Aromatic polyisocyanate prepolymer based on diphenylmethane diisocyanate (MDI). |
| Desmodur ® H | Monomeric aliphatic diisocyanate |
| Desmodur ® HL | Aromatic/aliphatic polyisocyanate based on toluylene diisocyanate/hexamethylene diisocyanate |
| Desmodur ® I | Monomeric cycloaliphatic diisocyanate. |
| Desmodur ® IL 1351 | Aromatic polyisocyanate based on toluene diisocyanate |
| Desmodur ® IL 1451 | Aromatic polyisocyanate based on toluene diisocyanate |
| Desmodur ® IL BA | Aromatic polyisocyanate based on toluene diisocyanate |
| Desmodur ® IL EA | Aromatic polyisocyante resin based on toluylene diisocyanate |
| Desmodur ® L 1470 | Aromatic polyisocyanate based on toluene diisocyanate |
| Desmodur ® L 67 BA | Aromatic polyisocyanate based on tolulene diisocyanate |
| Desmodur ® L 67 MPA/X | Aromatic polyisocyanate based on tolulene diisocyanate |
| Desmodur ® L 75 | Aromatic polyisocyanate based on tolulene diisocyanate |
| Desmodur ® LD | Low-functionality isocyanate based on hexamethylene diisocyanate (HDI) |
| Desmodur ® LS 2424 | Monomeric diphenylmethane diisocyanate with high 2,4'-isomer content |
| Desmodur ® MT | Polyisocyanate prepolymer based on diphenylmethane diisocyanate |
| Desmodur ® N 100 | Aliphatic polyisocyanate (HDI biuret) |
| Desmodur ® N 3200 | Aliphatic polyisocyanate (low-viscosity HDI biuret) |
| Desmodur ® N 3300 | Aliphatic polyisocyanate (HDI trimer) |
| Desmodur ® N 3368 BA/SN | Aliphatic polyisocyanate (HDI trimer) |
| Desmodur ® N 3368 SN | Aliphatic polyisocyanate (HDI trimer) |
| Desmodur ® N 3386 BA/SN | Aliphatic polyisocyanate (HDI trimer) |
| Desmodur ® N 3390 BA | Aliphatic polyisocyanate (HDI trimer) |
| Desmodur ® N 3390 BA/SN | Aliphatic polyisocyanate (HDI trimer) |
| Desmodur ® N 3400 | Aliphatic polyisocyanate (HDI uretdione) |
| Desmodur ® N 3600 | Aliphatic polyisocyanate (low-viscosity HDI trimer) |
| Desmodur ® N 3790 BA | Aliphatic polyisocyanate (high functional HDI trimer) |
| Desmodur ® N 3800 | Aliphatic polyisocyanate (flexibilizing HDI trimer) |
| Desmodur ® N 3900 | Low-viscosity, aliphatic polyisocyanate resin based on hexamethylene diisocyanate |
| Desmodur ® N 50 BA/MPA | Aliphatic polyisocyanate (HDI biuret) |
| Desmodur ® N 75 BA | Aliphatic polyisocyanate (HDI biuret) |
| Desmodur ® N 75 MPA | Aliphatic polyisocyanate (HDI biuret) |
| Desmodur ® N 75 MPA/X | Aliphatic polyisocyanate (HDI biuret) |
| Desmodur ® NZ 1 | Aliphatic polyisocyanate |
| Desmodur ® PC-N | Desmodur PC-N is a modified diphenyl-methane-4,4'-diisocyanate (MDI). |
| Desmodur ® PF | Desmodur PF is a modified diphenyl-methane-4,4'-diisocyanate (MDI). |
| Desmodur ® PL 340, 60% BA/SN | Blocked aliphatic polyisocyanate based on IPDI |
| Desmodur ® PL 350 | Blocked aliphatic polyisocyanate based on HDI |
| Desmodur ® RC | Solution of a polyisocyanurate of toluene diisocyanate (TDI) in ethyl acetate. |

TABLE 2-continued

| Trade Name | Description |
| --- | --- |
| Desmodur ® RE | Solution of triphenylmethane-4,4',4"-triisocyanate in ethyl acetate |
| Desmodur ® RFE | Solution of tris(p-isocyanatophenyl) thiophosphate in ethyl acetate |
| Desmodur ® RN | Solution of a polyisocyanurate with aliphatic and aromatic NCO groups in ethyl acetate. |
| Desmodur ® T 100 | Pure 2,4'-toluene diisocyanate (TDI) |
| Desmodur ® T 65 N | 2,4- and 2,6-toluene diisocyanate (TDI) in the ratio 67:33 |
| Desmodur ® T 80 | 2,4- and 2,6-toluene diisocyanate (TDI) in the ratio 80:20 |
| Desmodur ® T 80 P | 2,4- and 2,6-toluene diisocyanate (TDI) in the ratio 80:20 with an increased content of hydrolysable chlorine |
| Desmodur ® VH 20 N | Polyisocyanate based on diphenylmethane diisocyanate |
| Desmodur ® VK | Desmodur VK products re mixtures of diphenylmethane-4,4'-diisocyanate (MDI) with isomers and higher functional |
| Desmodur ® VKP 79 | Desmodur VKP 79 is a modified diphenylmethane-4,4'-diisocyanate (MDI) with isomers and homologues. |
| Desmodur ® VKS 10 | Desmodur VKS 10 is a mixture of diphenylmethane-4,4'-diisocyanate (MDI) with isomers and higher functional |
| Desmodur ® VKS 20 | Desmodur VKS 20 is a mixture of diphenylmethane-4,4'-diisocyanate (MDI) with isomers and higher functional |
| Desmodur ® VKS 20 F | Desmodur VKS 20 F is a mixture of diphenylmethane-4,4'-diisocyanate (MDI) with isomers and higher functional |
| Desmodur ® VKS 70 | Desmodur VKS 70 is a mixture of diphenylmethane-4,4'-diisocyanate (MDI) with isomers and homologues. |
| Desmodur ® VL | Aromatic polyisocyanate based on diphenylmethane diisocyanate |
| Desmodur ® VP LS 2078/2 | Blocked aliphatic polyisocyanate based on IPDI |
| Desmodur ® VP LS 2086 | Aromatic polyisocyanate prepolymer based on diphenylmethane diisocyanate |
| Desmodur ® VP LS 2257 | Blocked aliphatic polyisocyanate based on HDI |
| Desmodur ® VP LS 2371 | Aliphatic polyisocyanate prepolymer based on isophorone diisocyanate. |
| Desmodur ® VP LS 2397 | Desmodur VP LS 2397 is a linear prepolymer based on polypropylene ether glycol and diphenylmethane |
| Desmodur ® W | Monomeric cycloaliphatic diisocyanate |
| Desmodur ® W/1 | Monomeric cycloaliphatic diisocyanate |
| Desmodur ® XP 2404 | Desmodur XP 2404 is a mixture of monomeric polyisocyanates |
| Desmodur ® XP 2406 | Aliphatic polyisocyanate prepolymer based on isophorone diisocyanate |
| Desmodur ® XP 2489 | Aliphatic polyisocyanate |
| Desmodur ® XP 2505 | Desmodur XP 2505 is a prepolymer containing ether groups based on diphenylmethane-4,4'-diisocyanates (MDI) with |
| Desmodur ® XP 2551 | Aromatic polyisocyanate based on diphenylmethane diisocyanate |
| Desmodur ® XP 2565 | Low-viscosity, aliphatic polyisocyanate resin based on isophorone diisocyanate. |
| Desmodur ® XP 2580 | Aliphatic polyisocyanate based on hexamethylene diisocyanate |
| Desmodur ® XP 2599 | Aliphatic prepolymer containing ether groups and based on hexamethylene-1,6-diisocyanate (HDI) |
| Desmodur ® XP 2617 | Desmodur XP 2617 is a largely linear NCO prepolymer based on hexamethylene diisocyanate. |
| Desmodur ® XP 2665 | Aromatic polyisocyanate prepolymer based on diphenylmethane diisocyanate (MDI). |
| Desmodur ® XP 2675 | Aliphatic polyisocyanate (highly functional HDI trimer) |
| Desmodur ® XP 2679 | Aliphatic polyisocyanate (HDI allophanate trimer) |
| Desmodur ® XP 2714 | Silane-functional aliphatic polyisocyanate based on hexamethylene diisocyanate |
| Desmodur ® XP 2730 | Low-viscosity, aliphatic polyisocyanate (HDI uretdione) |
| Desmodur ® XP 2731 | Aliphatic polyisocyanate (HDI allophanate trimer) |
| Desmodur ® XP 2742 | Modified aliphatic Polyisocyanate (HDI-Trimer), contains SiO2-nanoparticles |

Additional isocyanates suitable for certain embodiments of the present invention are sold under the trade name Tolonate® (Perstorp). In certain embodiments, the isocyanates are selected from the group consisting of the materials shown in Table 3, and typically from the subset of this list that are between 1.95 and 2.1 functional isocyanates:

TABLE 3

| | |
| --- | --- |
| Tolonate ™ D2 | a blocked aliphatic polyisocyanate, supplied at 75 % solids in aromatic solvent |
| Tolonate ™ HDB | a viscous solvent-free aliphatic polyisocyanate |
| Tolonate ™ HDB-LV | a solvent free low viscosity aliphatic polyisocyanate |

TABLE 3-continued

| | |
|---|---|
| Tolonate ™ HDB 75 B | an aliphatic polyisocyanate, supplied at 75% solids in methoxy propyl acetate |
| Tolonate ™ HDB 75 BX | an aliphatic polyisocyanate, supplied at 75% solids |
| Tolonate ™ HDT | a medium viscosity, solvent-free aliphatic polyisocyanate |
| Tolonate ™ HDT-LV | is a solvent free low viscosity aliphatic polyisocyanate |
| Tolonate ™ HDT-LV2 | a solvent free, very low viscosity aliphatic polyisocyanate |
| Tolonate ™ HDT 90 | an aliphatic polyisocyanate, based on HDI-trimer (isocyanurate), supplied at 90% solids |
| Tolonate ™ HDT 90 B | an aliphatic polyisocyanate, based on HDI-trimer (isocyanurate), supplied at 90% solids |
| Tolonate ™ IDT 70 B | an aliphatic polyisocyanate, based on HDI-trimer (isocyanurate), supplied at 70% solids |
| Tolonate ™ IDT 70 S | an aliphatic polyisocyanate, based on HDI-trimer (isocyanurate), supplied at 70% solids |
| Tolonate ™ X FD 90 B | a high functionality, fast drying aliphatic polyisocyanate based on HDI-trimer, supplied at 90% solids |

Other isocyanates suitable for certain embodiments of the present invention are sold under the trade name Mondur® available from Bayer Material Science. In certain embodiments, the isocyanates are selected from the group consisting of the materials shown in Table 4, and typically from the subset of this list that are between 1.95 and 2.1 functional isocyanates:

TABLE 4

| Trade Name | Description |
|---|---|
| MONDUR 445 | TDI/MDI blend polyisocyanate; blend of toluene diisocyanate and polymeric diphenylmethane diisocyanate; NCO weight 44.5-45.2% |
| MONDUR 448 | modified polymeric diphenylmethane diisocyanate (pMDI) prepolymer; NCO weight 27.7%; viscosity 140 mPa · s @ 25° C.; equivalent weight 152; functionality 2.2 |
| MONDUR 489 | modified polymeric diphenylmethane diisocyanate (pMDI); NCO weight 31.5%; viscosity 700 mPa · s @ 25° C.; equivalent weight 133; functionality 3.0 |
| MONDUR 501 | modified monomeric diphenylmethane diisocyanate (mMDI); isocyanate-terminated polyester prepolymer; NCO weight 19.0%; viscosity 1,100 mPa · s @ 25° C.; equivalent weight 221; functionality 2 |
| MONDUR 541 | polymeric diphenylmethane diisocyanate (pMDI); binder for composite wood products and as a raw material in adhesive formulations; NCO weight 31.5%; viscosity 200 mPa · s @ 25° C. |
| MONDUR 582 | polymeric diphenylmethane diisocyanate (pMDI); binder for composite wood products and as a raw material in adhesive formulations; NCO weight 31.0%; viscosity 200 mPa · s @ 25° C. |
| MONDUR 541-Light | polymeric diphenylmethane diisocyanate (pMDI); NCO weight 32.0%; viscosity 70 mPa · s @ 25° C.; equivalent weight 131; functionality 2.5 |
| MONDUR 841 | modified polymeric MDI prepolymer; NCO, Wt 30.5%; Acidity, Wt 0.02%; Amine Equivalent 132; Viscosity at 25° C., mPa · s 350; Specific gravity at 25° C. 1.24; Flash Point, PMCC, ° F. >200 |
| MONDUR 1437 | modified diphenylmethane diisocyanate (mMDI); isocyanate-terminated polyether prepolymer; NCO weight 10.0%; viscosity 2,500 mPa · s @ 25° C.; equivalent weight 420; functionality 2 |
| MONDUR 1453 | modified diphenylmethane diisocyanate (mMDI); isocyanate-terminated polyether prepolymer based on polypropylene ether glycol (PPG); NCO weight 16.5%; viscosity 600 mPa · s @ 25° C.; equivalent weight 254; functionality 2 |
| MONDUR 1515 | modified polymeric diphenylmethane diisocyanate (pMDI) prepolymer; used in the production of rigid polyurethane foams, especially for the appliance industry; NCO weight 30.5%; viscosity 350 mPa · s @ 25° C. |
| MONDUR 1522 | modified monomeric 4,4-diphenylmethane diisocyanate (mMDI); NCO weight 29.5%; viscosity 50 mPa · s @ 25° C.; equivalent weight 143; functionality 2.2 |
| MONDUR MA-2300 | modified monomeric MDI, allophanate-modified 4,4'-diphenylmethane diisocyanate (mMDI); NCO weight 23.0%; viscosity 450 mPa · s @ 25° C.; equivalent weight 183; functionality 2.0 |
| MONDUR MA 2600 | modified monomeric MDI, allophanate-modified 4,4'-diphenylmethane diisocyanate (mMDI); NCO weight 26.0%; viscosity 100 mPa · s @ 25° C.; equivalent weight 162; functionality 2.0 |
| MONDUR MA 2601 | aromatic diisocyanate blend, allophanate-modified 4,4'-diphenylmethane diisocyanate (MDI) blended with polymeric diphenylmethane diisocyanate (pMDI) containing 2,4'-isomer; NCO weight 29.0%; viscosity 60 mPa · s @ 25° C.; equivalent weight 145; functionality 2.2 |
| MONDUR MA 2603 | MDI prepolymer; isocyanate-terminated (MDI) prepolymer blended with an allophanate-modified 4,4'-diphenylmethane diisocyanate (MDI); NCO weight 16.0%; viscosity 1,050 mPa · s @ 25° C.; equivalent weight 263; functionality 2.0 |
| MONDUR MA-2902 | modified monomeric MDI, allophanate-modified 4,4'-diphenylmethane diisocyanate (mMDI); NCO weight 29.0%; viscosity 40 mPa · s @ 25° C.; equivalent weight 145; functionality 2.0 |
| MONDUR MA-2903 | modified monomeric MDI; isocyanate-terminated (MDI) prepolymer; NCO weight 19.0%; viscosity 400 mPa · s @ 25° C.; equivalent weight 221; functionality 2.0 |
| MONDUR MA-2904 | Allophanate-modified MDI polyether prepolymer; NCO weight 12.0%; viscosity 1,800 mPa · s @ 25° C.; equivalent weight 350; functionality of 2.0 |

TABLE 4-continued

| Trade Name | Description |
| --- | --- |
| MONDUR MB | high-purity grade difunctional isocyanante, diphenylmethane 4,4'-diisocyanate; used in production of polyurethane elastomers, adhesives, coatings and intermediate polyurethane products; appearance colorless solid or liquid; specific gravity @ 50° C. ± 15.5 1.19; flash point 202° C. PMCC; viscosity (in molten form) 4.1 mPa · s; bult density 10 lb/gal (fused) or 9.93 lb/gal (molten); freezing temperature 39° C. |
| MONDUR MLQ | monomeric diphenylmethan diisocyanate; used in a foams, cast elastomers, coatings and ahdesives; appearance light yellow clear liquid, NCO 33.4% wt; 1.19 specific gravity at 25° C., 196° C. flash point, DIN 51758; 11-15° C. freezing temperature |
| MONDUR MQ | high-purity-grade difunctional isocyanate, diphenylmethane 4,4'-diisocyanate (MDI); used in production of solid polyurethane elastomers, adhesives, coatings and in intermediate polyurethane products; appearance colorless solid or liquid; specific gravity 1.19 @ 50° C.; flash point 202° C. PMCC; viscosity 4.1 mPa · s; bulk density 10 lb./gal (fused) or 9.93 lb./gal (molten); freezing temperature 39 C. |
| MONDUR MR | polymeric diphenylmethane diisocyanate (pMDI); NCO weight 31.5%; viscosity 200 mPa · s @ 25° C.; equivalent weight 133; functionality 2.8 |
| MONDUR MR LIGHT | polymeric diphenylmethane diisocyanate (pMDI); NCO weight 31.5%; viscosity 200 mPa · s @ 25° C.; equivalent weight 133; functionality 2.8 |
| MONDUR MR-5 | polymeric diphenylmethane diisocyanate (pMDI); NCO weight 32.5%; viscosity 50 mPa · s @ 25° C.; equivalent weight 129; functionality 2.4 |
| MONDUR MRS | 2,4 rich polymeric diphenylmethane diisocyanate (pMDI); NCO weight 31.5%; viscosity 200 mPa · s @ 25° C.; equivalent weight 133; functionality 2.6 |
| MONDUR MRS 2 | 2,4' rich polymeric diphenylmethane diisocyanate (pMDI); NCO weight 33.0%; viscosity 25 mPa · s @ 25° C.; equivalent weight 127; functionality 2.2 |
| MONDUR MRS-4 | 2,4' rich polymeric diphenylmethane diisocyanate (pMDI); NCO weight 32.5%; viscosity 40 mPa · s @ 25° C.; equivalent weight 129; functionality 2.4 |
| MONDUR MRS-5 | 2,4' rich polymeric diphenylmethane diisocyanate (pMDI); NCO weight 32.3%; viscosity 55 mPa · s @ 25° C.; equivalent weight 130; functionality 2.4 |
| MONDUR PC | modified 4,4' diphenylmethane diisocyanate (mMDI); NCO weight 25.8%; viscosity 145 mPa · s @ 25° C.; equivalent weight 163; functionality 2.1 |
| MONDUR PF | modified 4,4' diphenylmethane diisocyanate (mMDI) prepolymer; NCO weight 22.9%; viscosity 650 mPa · s @ 25° C.; equivalent weight 183; functionality 2 |
| MONDUR TD-65 | monomeric toluene diisocyanate (TDI); 65/35 mixture of 2,4 and 2.6 TDI; NCO weight 48%; viscosity 3 mPa · s @ 25° C.; equivalent weight 87.5; functionality 2 |
| MONDUR TD-80 GRADE A | monomeric toluene diisocyanate (TDI); 80/20 mixture of the 2,4 and 2,6 isomer; NCO weight 48%; viscosity 5 mPa · s @ 25° C.; equivalent weight 87.5; functionality 2 |
| MONDUR TD-80 GRADE A/GRADE B | monomeric toluene diisocyanate (TDI); 80/20 mixture of the 2,4 and 2,6 isomer; NCO weight 48%; viscosity 5 mPa · s @ 25° C.; equivalent weight 87.5; functionality 2 |

In certain embodiments, one or more of the above-described isocyanate compositions is provided in a formulation typical of a mixture known in the art of polyurethane manufacture. Such mixtures may comprise prepolymers formed by the reaction of a molar excess of one or more isocyanates with reactive molecules comprising reactive functional groups such as alcohols, amines, thiols, carboxylates and the like. These mixtures may also comprise solvents, surfactants, stabilizers, and other additives known in the art.

APPENDIX II

Coreactants

In addition to the aliphatic polycarbonate polyols and isocyanate reagents described above, some compositions of the present invention may comprise optional coreactants. Coreactants can include other types of polyols (e.g. polyether polyols, polyester polyols, acrylics, or other classes of polycarbonate polyols), or small molecules with functional groups reactive toward isocyanates such as hydroxyl groups, amino groups, thiol groups, and the like. In certain embodiments, such coreactants comprise molecules with two or more functional groups reactive toward isocyanates.

In certain embodiments, a coreactant comprises a polyhydric alcohol. In certain embodiments, a coreactant comprises a dihydric alcohol. In certain embodiments, the dihydric alcohol comprises a $C_{2-40}$ diol. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentane diol, 2-ethyl-1,3-hexane diol, 2-methyl-1,3-propane diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these.

In certain embodiments, a coreactant comprises a dihydric alcohol selected from the group consisting of: diethylene glycol, triethylene glycol, tetraethylene glycol, higher poly(ethylene glycol), such as those having number average molecular weights from 220 to about 3000 g/mol, dipropylene glycol, tripropylene glycol, and higher poly(propylene glycols) such as those having number average molecular weights from 234 to about 3000 g/mol.

In certain embodiments, a coreactant comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments, a coreactant comprises a polymeric diol. In certain embodiments, a polymeric diol is selected from the group consisting of polyethers, polyesters, hydroxy-terminated polyolefins, polyether-copolyesters, polyether polycarbonates, polycarbonate-copolyesters, and alkoxylated analogs of any of these. In certain embodiments, the polymeric diol has an average molecular weight less than about 2000 g/mol.

In certain embodiments, a coreactant comprises a polyester polyol. In certain embodiments, the polyester polyol present comprises a material based on a diol and a diacid (e.g. a polymer based on adipic acid (AA); sebacic acid (SBA); succinic Acid (SA); dodecanedioic acid (DDA); isophthalic acid (iPA); azelaic acid (Az); ethylene glycol (EG); propylene glycol (PG); 1,3-propane diol; 1,4bButanediol (BDO); 1,6-hexanediol (HID); diethylene glycol (DEG); neopentyl glycol (NPG); 3-Methyl-1,5-pentanediol (MPD). Examples of these include, but are not limited to:

AA-EG polyesters with molecular weights of 500, 1,000, 2,000 or 3,000 g/mol;
AA-EG/BDO polyesters with molecular weights of 500, 1,000, 2,000 or 3,000 g/mol;
AA-PG polyesters with molecular weights of 500, 1,000, 2,000 or 3,000 g/mol
AA-BDO polyesters with molecular weights of 500, 1,000, 2,000 or 3,000 g/mol;
AA-BDO/HID polyesters with molecular weights of 500, 1,000, 2,000 or 3,000 g/mol;
AA-DEG polyesters with molecular weights of 500, 1,000, 2,000 or 3,000 g/mol;
AA-NPG polyesters with molecular weights of 500, 1,000, 2,000 or 3,000 g/mol;
AA-NPG/HID polyesters with molecular weights of 500, 1,000, 2,000 or 3,000 g/mol;
AA-HID polyesters with molecular weights of 500, 1,000, 2,000 or 3,000 g/mol;
AA-MPD polyesters with molecular weights of 500, 1,000, 2,000 or 3,000 g/mol;
SEA-HID polyesters with molecular weights of 2,000, 3,000, 4,000 or 5,000 g/mol;
DDA-HID polyesters with molecular weights of 2,000, 3,000, 4,000 or 5,000 g/mol;
Az-EG polyesters with molecular weights of 500, 1,000, 2,000 or 3,000 g/mol;
Az/iPA-EG/NPG polyesters with molecular weights of 500, 1,000, 2,000 or 3,000 g/mol;
SA-EG polyesters with molecular weights of 500, 1,000, 2,000 or 3,000 g/mol;
SA-DEG polyesters with molecular weights of 500, 1,000, 2,000 or 3,000 g/mol;
SA-NPG polyesters with molecular weights of 500, 1,000, 2,000 or 3,000 g/mol; and
SA-PG polyesters with molecular weights of 500, 1,000, 2,000 or 3,000 g/mol.

In certain embodiments, polyester polyol is formed by ring-opening-polymerization of caprolactone or propiolactone. For example, polycaprolactone with molecular weights of 500, 1,000, 2,000 or 3,000 g/mol; or polypropiolactone with molecular weights of 500, 1,000, 2,000 or 3,000 g/mol.

In some embodiments, a coreactant comprises a triol or higher polyhydric alcohol. In certain embodiments, a coreactant is selected from the group consisting of: glycerol, 1,2,4-butanetriol, 2-(hydroxymethyl)-1,3-propanediol, hexane triols, trimethylol propane, trimethylol ethane, trimethylolhexane, 1,4-cyclohexanetrimethanol, pentaerythritol mono esters, pentaerythritol mono ethers, and alkoxylated analogs of any of these. In certain embodiments, alkoxylated derivatives comprise ethoxylated or propoxylated compounds.

In some embodiments, a coreactant comprises a polyhydric alcohol with four to six hydroxy groups. In certain embodiments, a coreactant comprises dipentaerithrotol or an alkoxylated analog thereof. In certain embodiments, coreactant comprises sorbitol or an alkoxylated analog thereof.

In certain embodiments, a functional coreactant comprises a polyhydric alcohol containing one or more moieties that can be converted to an ionic functional group. In certain embodiments, the moiety that can be converted to an ionic functional group is selected from the group consisting of: carboxylic acids, esters, anhydrides, sulfonic acids, sulfamic acids, phosphates, and amino groups.

In certain embodiments, a coreactant comprises a hydroxy-carboxylic acid having the general formula $(HO)_x Q(COOH)_y$, wherein Q is a straight or branched hydrocarbon radical containing 1 to 12 carbon atoms, and x and y are each integers from 1 to 3. In certain embodiments, a coreactant comprises a diol carboxylic acid. In certain embodiments, a coreactant comprises a bis(hydroxylalkyl) alkanoic acid. In certain embodiments, a coreactant comprises a bis(hydroxylmethyl) alkanoic acid. In certain embodiments the diol carboxylic acid is selected from the group consisting of 2,2 bis-(hydroxymethyl)-propanoic acid (dimethylolpropionic acid, DMPA) 2,2-bis(hydroxymethyl) butanoic acid (dimethylolbutanoic acid; DMBA), dihydroxysuccinic acid (tartaric acid), and 4,4'-bis(hydroxyphenyl) valeric acid. In certain embodiments, a coreactant comprises an N,N-bis(2-hydroxyalkyl)carboxylic acid.

In certain embodiments, a coreactant comprises a polyhydric alcohol containing a sulfonic acid functional group. In certain embodiments, a coreactant comprises a diol sulfonic acid. In certain embodiments, a polyhydric alcohol containing a sulfonic acid is selected from the group consisting of: 2-hydroxymethyl-3-hydroxypropane sulfonic acid, 2-butene-1,4-diol-2-sulfonic acid, and materials disclosed in U.S. Pat. No. 4,108,814 and US Pat. App. Pub. No. 2010/0273029 the entirety of each of which is incorporated herein by reference.

In certain embodiments, a coreactant comprises a polyhydric alcohol containing a sulfamic acid functional group. In certain embodiments, a polyhydric alcohol containing a sulfamic acid is selected from the group consisting of: [N,N-bis(2-hydroxyalkyl)sulfamic acid (where each alkyl group is independently a $C_{2-6}$ straight chain, branched or cyclic aliphatic group) or epoxide adducts thereof (the epoxide being ethylene oxide or propylene oxide for instance, the number of moles of epoxide added being 1 to 6) also epoxide adducts of sulfopolycarboxylic acids [e.g. sulfoisophthalic acid, sulfosuccinic acid, etc.], and aminosulfonic acids [e.g. 2-aminoethanesulfonic acid, 3-aminopropanesulfonic acid, etc.]

In certain embodiments, a coreactant comprises a polyhydric alcohol containing a phosphate group. In certain embodiments, a coreactant comprises a bis (2-hydroxalkyl) phosphate (where each alkyl group is independently a $C_{2-6}$ straight chain, branched or cyclic aliphatic group). In certain embodiments, a coreactant comprises bis (2-hydroxethyl) phosphate.

In certain embodiments, a coreactant comprises a polyhydric alcohol comprising one or more amino groups. In certain embodiments, a coreactant comprises an amino diol. In certain embodiments, a coreactant comprises a diol containing a tertiary amino group. In certain embodiments, an amino diol is selected from the group consisting of: diethanolamine (DEA), N-methyldiethanolamine (MDEA), N-ethyldiethanolamine (EDEA), N-butyldiethanolamine (BDEA), N,N-bis(hydroxyethyl)-α-amino pyridine, dipropanolamine, diisopropanolamine (DIPA), N-methyldiisopropanolamine, diisopropanol-p-toluidine, N,N-Bis(hydroxyethyl)-3-chloroaniline, 3-diethylaminopropane-1,2-diol, 3-dimethylaminopropane-1,2-diol and N-hydroxyethylpiperidine. In certain embodiments, a coreactant comprises a diol containing a quaternary amino group. In certain embodiments, a coreactant comprising a quaternary amino group is an acid salt or quaternized derivative of any of the amino alcohols described above.

Compounds having at least one crosslinkable functional group can also be incorporated into the prepolymers of the present invention, if desired. Examples of such compounds include those having carbonyl, amine, epoxy, acetoacetoxy, urea-formaldehyde, auto-oxidative groups that crosslink via oxidization, ethylenically unsaturated groups optionally with UV activation, olefinic and hydrazide groups, blocked isocyanates, and the like, and mixtures of such groups and the same groups in protected forms (so crosslinking can be delayed until the composition is in its application (e.g., applied to a substrate) and coalescence of the particles has occurred) which can be reversed back into original groups from which they were derived (for crosslinking at the desired time).

What is claimed is:

1. A method comprising the steps of:
   i) reacting a polycarbonate polyol of formula P1-OH,

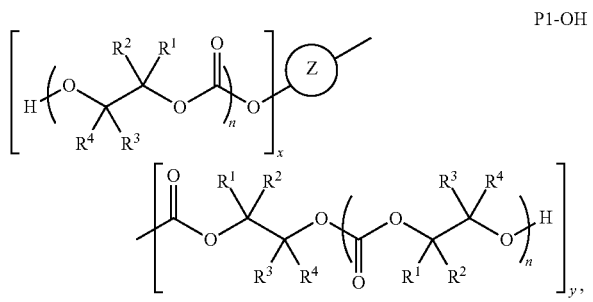

with a cyclic acid anhydride having a formula

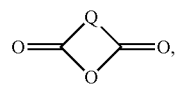

to provide a polycarbonate polyol of formula P1-CO$_2$H,

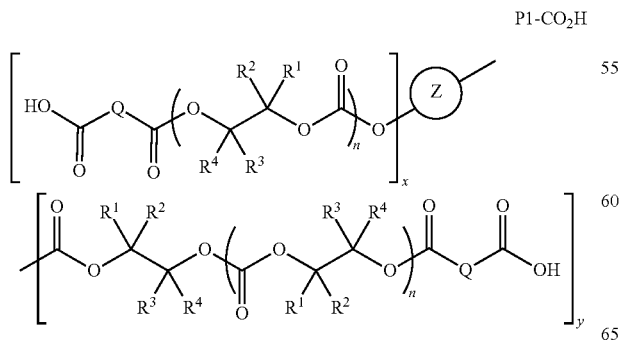

and ii) further treating this polyol with an epoxide of formula

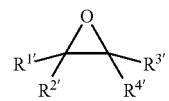

to yield a polymer composition of formula P1,

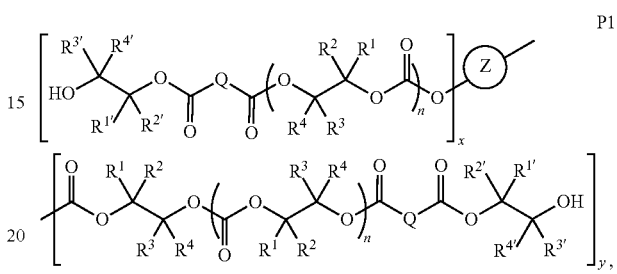

wherein:

- ⊙ is a multivalent moiety;
- $R^1$, $R^2$, $R^3$, and $R^4$ are at each occurrence, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms;
- $R^{1'}$, $R^{2'}$, $R^{3'}$, and $R^{4'}$ are at each occurrence, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^{1'}$, $R^{2'}$, $R^{3'}$ and $R^{4'}$ may optionally be taken together with intervening atoms to form one or more optionally substituted rings optionally containing one or more heteroatoms;
- each n is independently, on average in the composition, within a range from about 2 to about 200;
- Q is an optionally substituted bivalent moiety; and
- x and y are each independently an integer from 0 to 6, where the sum of x and y is between 2 and 6.

2. The method of claim 1, wherein the moiety

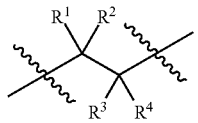

at each occurrence in the aliphatic polycarbonate chains is independently selected from the group consisting of:

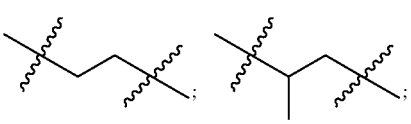

-continued

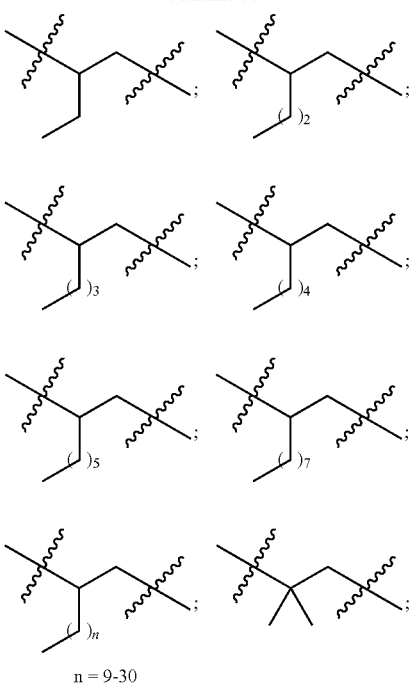

n = 9-30

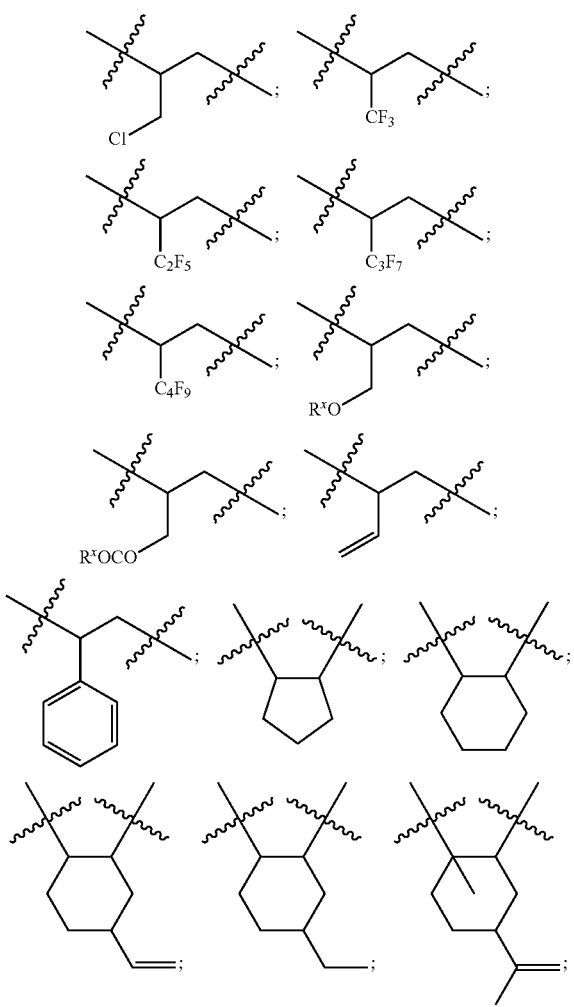

-continued

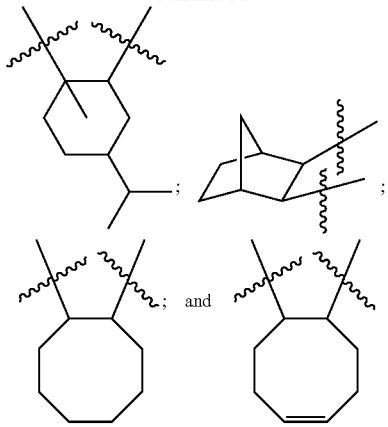

wherein each $R^x$ is independently selected from the group consisting of: optionally substituted aliphatic, optionally substituted heteroaliphatic, optionally substituted aryl and optionally substituted heteroaryl.

3. The method of claim 1, wherein the moiety

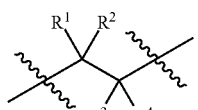

at each occurrence in the aliphatic polycarbonate chains is independently selected from the group consisting of:

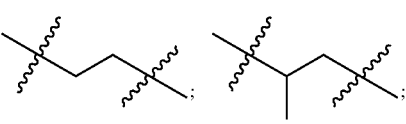

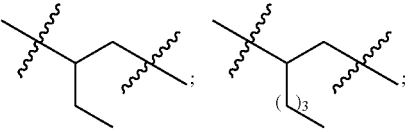

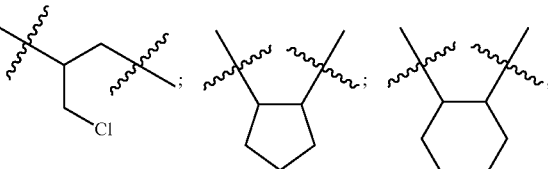

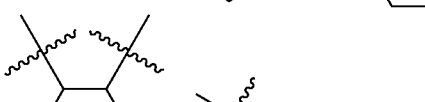

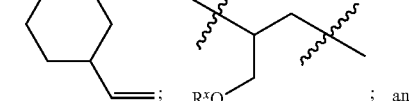

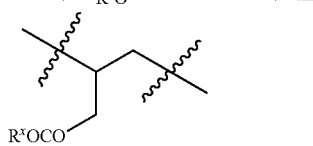

wherein each $R^x$ is independently selected from the group consisting of: optionally substituted aliphatic, optionally substituted heteroaliphatic, optionally substituted aryl and optionally substituted heteroaryl.

4. The method of claim 1, wherein the moiety

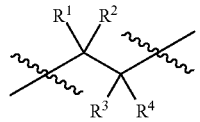

at each occurrence in the aliphatic polycarbonate chains is

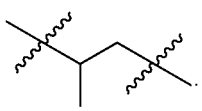 [SMILES: *CC(*)C]

5. The method of claim 1, wherein Q is an optionally substituted bivalent moiety selected from the group consisting of:

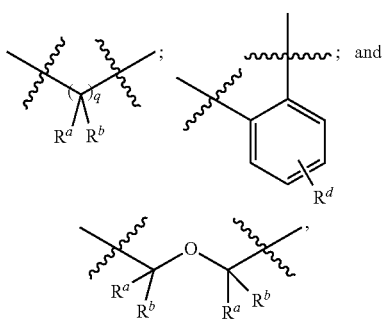

where $R^a$ and $R^b$ are each independently selected from the group consisting of: —H, halogen, optionally substituted $C_{1-8}$ aliphatic, and optionally substituted $C_{1-8}$ heteroaliphatic, where two or more $R^a$ and/or $R^b$ groups (whether on the same or different carbon atoms) may be taken together with intervening atoms to form one or more optionally substituted, optionally unsaturated rings, optionally containing one or more heteroatoms, and where two $R^a$ and $R^b$ groups on the same carbon atom or on adjacent carbon atoms may optionally be taken together to form an alkene or, if on the same carbon atom, an oxo group;

q is an integer from 1 to 10;

$R^d$ is optionally present, and if present are, independently at each occurrence selected from the group consisting of: halogen, —OR, —NR$_2$, —SR, —CN, —NO$_2$, —SO$_2$R, —SOR, —SO$_2$NR$_2$, —CNO, —NRSO$_2$R, —NCO, —N$_3$, —SiR$_3$; or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6-10-membered aryl; 5-10-membered heteroaryl having 1-4 heteroatoms independently selected from nitrogen, oxygen, or sulfur; and 4-7-membered heterocyclic having 1-2 heteroatoms independently selected from the group consisting of nitrogen, oxygen, and sulfur; and R is independently hydrogen, an optionally substituted $C_{1-20}$ aliphatic group, or an optionally substituted aryl group.

6. The method of claim 1, wherein Q is an optionally substituted bivalent moiety selected from the group consisting of:

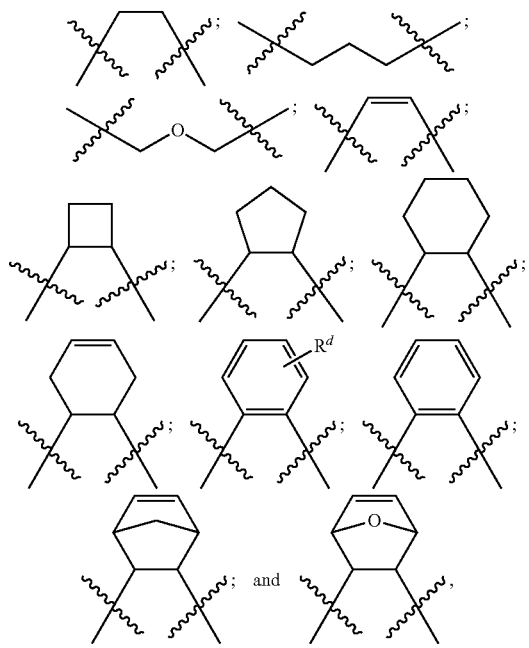

where $R^d$ is independently at each occurrence selected from the group consisting of: halogen, —OR, —NR$_2$, —SR, —CN, —NO$_2$, —SO$_2$R, —SOR, —SO$_2$NR$_2$, —CNO, —NRSO$_2$R, —NCO, —N$_3$, —SiR$_3$; or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6-10-membered aryl; 5-10-membered heteroaryl having 1-4 heteroatoms independently selected from nitrogen, oxygen, or sulfur; and 4-7-membered heterocyclic having 1-2 heteroatoms independently selected from the group consisting of nitrogen, oxygen, and sulfur; and R is independently hydrogen, an optionally substituted $C_{1-20}$ aliphatic group, or an optionally substituted aryl group.

7. The method of claim 1, wherein Q is:

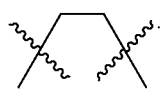

8. The method of claim 1, wherein Q is:

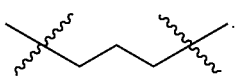 [SMILES: *CCC*]

9. The method of claim 1, wherein:

$R^{3'}$ is selected from the group consisting of an optionally substituted $C_{1-40}$ aliphatic group, an optionally substituted $C_{1-20}$ heteroaliphatic group, and an optionally substituted aryl group; and R[1'], R[2'], and R[4'] are at each occurrence, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of R[1'], R[2'], R[3'] and R[4'] may optionally be taken together with intervening atoms to form one or more optionally substituted rings optionally containing one or more heteroatoms.

10. The method of claim 1, wherein the moiety

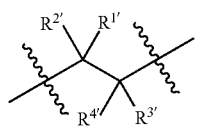

is at each occurrence in the aliphatic polycarbonate chains is:

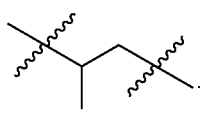 [SMILES: *CC(*)C]

11. The method of claim 1, wherein the moiety

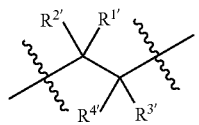

is at each occurrence in the aliphatic polycarbonate chains is:

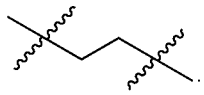

12. The method of claim 1, further comprising in step (i) the use of one or more catalysts.

13. The method of claim 1, further comprising in step (ii) the use of one or more catalysts.

14. The method of claim 13, wherein at least one catalyst is selected from the group consisting of: (salcy)MX (salcy=N,N'-bis(3,5-di-tert-butylsalicylidene)-1,2 diaminocyclohexane; M=Al, Co, Cr, Mn; X=halide or carboxylate), zinc glutarate, TPPM-X (TPP=tetraphenylphorphyrin; M=Al, Co, Cr; X=halide or alkoxide), and (beta-diiminate) zinc acetate.

15. The method of claim 13, wherein at least one catalyst is cobalt(III) salcy (salcy=N,N'-bis(3,5-di-tert-butylsalicylidene).

16. A composition made by the method of claim 1, wherein the composition comprises a polymer having formula P1,

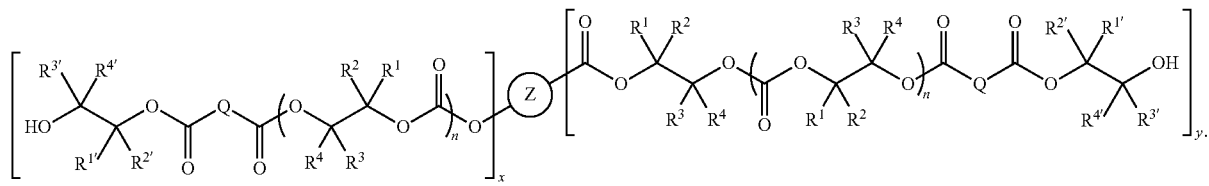

17. The composition of claim 16, wherein Ⓩ comprises one or more atoms selected from the group consisting of carbon, nitrogen, phosphorus, sulfur, and boron.

18. The composition of claim 16, wherein Ⓩ comprises one or more carbon atoms.

19. The composition of claim 16, wherein Ⓩ is:

20. The composition of claim 16, wherein Ⓩ is derived from a polyfunctional chain transfer agent.

21. The composition of claim 16, wherein the moiety

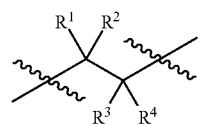

is at each occurrence in the aliphatic polycarbonate chains independently selected from the group consisting of:

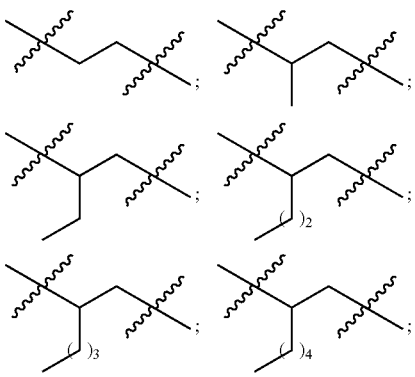

-continued

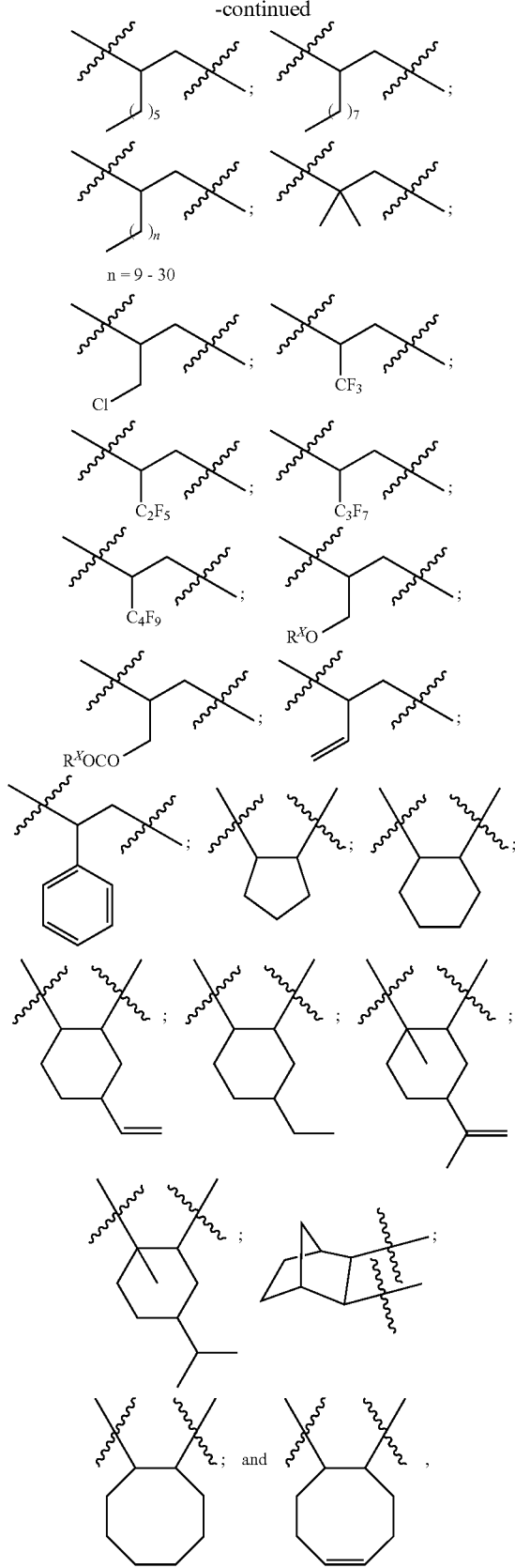

wherein each $R^x$ is independently selected from the group consisting of: optionally substituted aliphatic, optionally substituted heteroaliphatic, optionally substituted aryl and optionally substituted heteroaryl.

22. The composition of claim 16, wherein the moiety

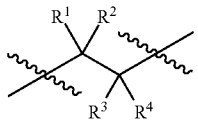

at each occurrence in the aliphatic polycarbonate chains is independently selected from the group consisting of:

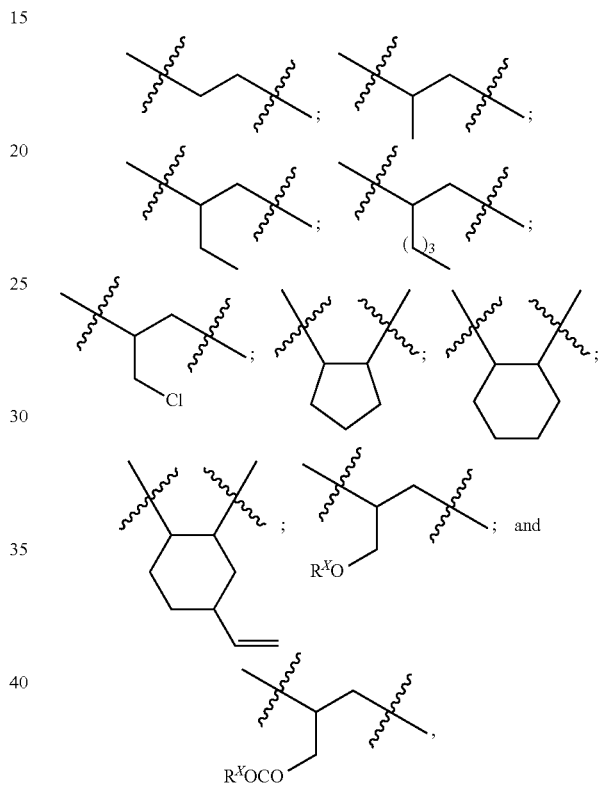

wherein each $R^x$ is independently selected from the group consisting of: optionally substituted aliphatic, optionally substituted heteroaliphatic, optionally substituted aryl and optionally substituted heteroaryl.

23. The composition of claim 16, wherein the moiety

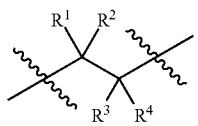

at each occurrence in the aliphatic polycarbonate chains is

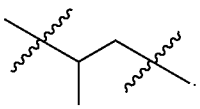

24. The composition of claim 16, wherein Q is an optionally substituted bivalent moiety selected from the group consisting of:

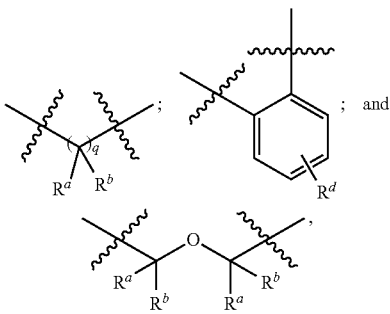

where $R^a$ and $R^b$ are each independently selected from the group consisting of: —H, halogen, optionally substituted $C_{1-8}$ aliphatic, and optionally substituted $C_{1-8}$ heteroaliphatic, where two or more $R^a$ and/or $R^b$ groups (whether on the same or different carbon atoms) may be taken together with intervening atoms to form one or more optionally substituted, optionally unsaturated rings, optionally containing one or more heteroatoms, and where two $R^a$ and $R^b$ groups on the same carbon atom or on adjacent carbon atoms may optionally be taken together to form an alkene or, if on the same carbon atom, an oxo group;

q is an integer from 1 to 10; and $R^d$ is optionally present, and if present are, independently at each occurrence selected from the group consisting of: halogen, —OR, —NR$_2$, —SR, —CN, —NO$_2$, —SO$_2$R, —SOR, —SO$_2$NR$_2$, —CNO, —NRSO$_2$R, —NCO, —N$_3$, —SiR$_3$; or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6-10-membered aryl; 5-10-membered heteroaryl having 1-4 heteroatoms independently selected from nitrogen, oxygen, or sulfur; and 4-7-membered heterocyclic having 1-2 heteroatoms independently selected from the group consisting of nitrogen, oxygen, and sulfur; and R is independently hydrogen, an optionally substituted $C_{1-20}$ aliphatic group, or an optionally substituted aryl group.

25. The composition of claim 16, wherein Q is an optionally substituted bivalent moiety selected from the group consisting of:

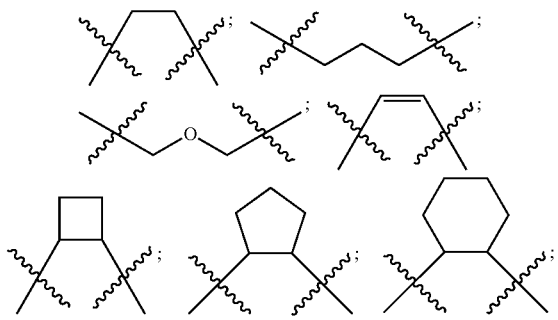

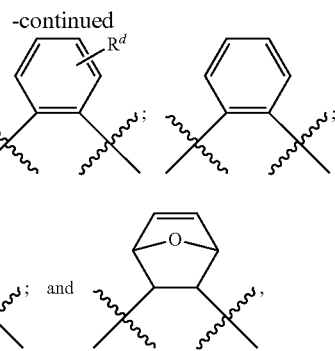

where $R^d$ is independently at each occurrence selected from the group consisting of: halogen, —OR, —NR$_2$, —SR, —CN, —NO$_2$, —SO$_2$R, —SOR, —SO$_2$NR$_2$, —CNO, —NRSO$_2$R, —NCO, —N$_3$, —SiR$_3$; or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6-10-membered aryl; 5-10-membered heteroaryl having 1-4 heteroatoms independently selected from nitrogen, oxygen, or sulfur; and 4-7-membered heterocyclic having 1-2 heteroatoms independently selected from the group consisting of nitrogen, oxygen, and sulfur; and R is independently hydrogen, an optionally substituted $C_{1-20}$ aliphatic group, or an optionally substituted aryl group.

26. The composition of claim 16, wherein Q is:

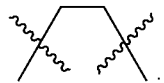

27. The composition of claim 16, wherein Q is:

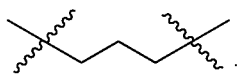 [SMILES: *CCC*]

28. The composition of claim 16, wherein:

$R^{3'}$ is selected from the group consisting of an optionally substituted $C_{1-40}$ aliphatic group, an optionally substituted $C_{1-20}$ heteroaliphatic group, and an optionally substituted aryl group; and $R^{1'}$, $R^{2'}$, and $R^{4'}$ are at each occurrence, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^{1'}$, $R^{2'}$, $R^{3'}$ and $R^{4'}$ may optionally be taken together with intervening atoms to form one or more optionally substituted rings optionally containing one or more heteroatoms.

29. The composition of claim 16, wherein the moiety

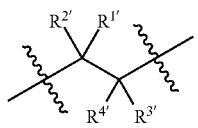

at each occurrence in the aliphatic polycarbonate chains is:
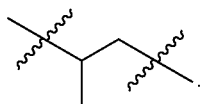
30. The composition of claim 16, wherein the moiety
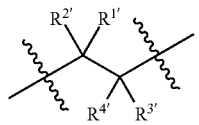
at each occurrence in the aliphatic polycarbonate chains is:
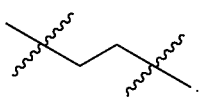 [SMILES: *CC*]
31. The composition of claim 16, comprising an aliphatic polycarbonate polyol selected from the group consisting of Q1, Q2, Q3, Q4, Q5, Q6, Q7, Q8, and mixtures of any two or more of these:
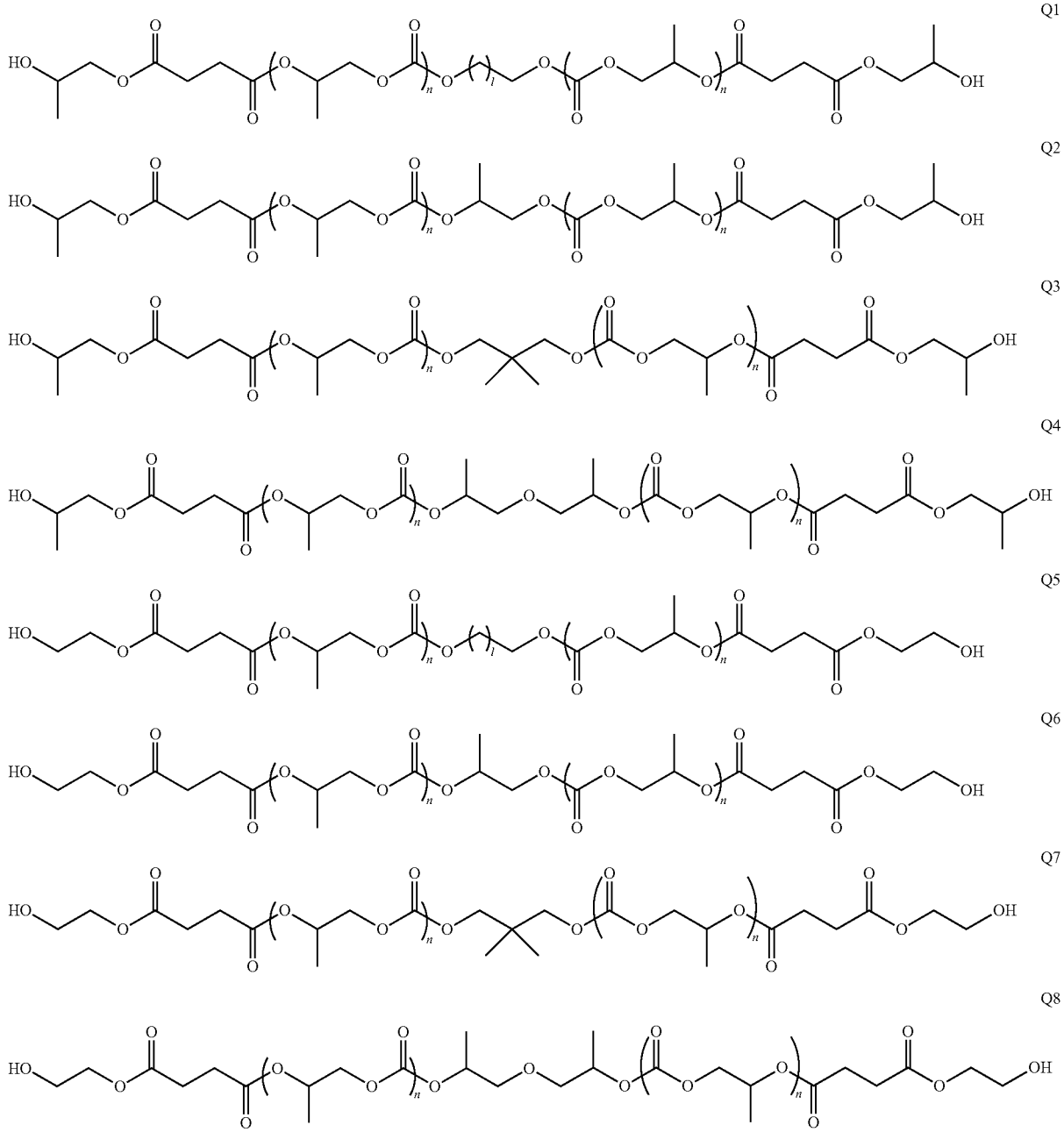

wherein each n is, on average in the composition, within a range from about 2 to about 200, and t is from 0 to 10.

32. The composition of claim 31, wherein the composition comprises:
Poly(propylene carbonate) of any of formulae Q1 through Q8 having an average molecular weight number of between about 500 g/mol and about 3,000 g/mol (e.g. each n is between about 3 and about 15), a polydisperisty index less than about 1.25, at least 95% carbonate linkages, and at least 98% —OH end groups;
Poly(propylene carbonate) of any of formulae Q1 through Q8 having an average molecular weight number of about 500 g/mol (e.g. n is on average between about 3.5 and about 4.5), a polydisperisty index less than about 1.25, at least 95% carbonate linkages, and at least 98% —OH end groups;
Poly(propylene carbonate) of any of formulae Q1 through Q8 having an average molecular weight number of about 1,000 g/mol (e.g. n is on average between about 3.5 and about 4.5), a polydisperisty index less than about 1.25, at least 95% carbonate linkages, and at least 98% —OH end groups;
Poly(propylene carbonate) of any of formulae Q1 through Q8 having an average molecular weight number of about 2,000 g/mol (e.g. n is on average between about 8 and about 9.5), a polydisperisty index less than about 1.25, at least 95% carbonate linkages, and at least 98% —OH end groups; or
Poly(propylene carbonate) of any of formulae Q1 through Q8 having an average molecular weight number of about 3,000 g/mol (e.g. n is on average between about 13 and about 15), a polydisperisty index less than about 1.25, at least 95% carbonate linkages, and at least 98% —OH end groups.

33. The composition of claim 16, comprising an aliphatic polycarbonate polyol selected from the group consisting of Q9, Q10, Q11, Q12, Q13, Q14, and mixtures of any two or more of these:

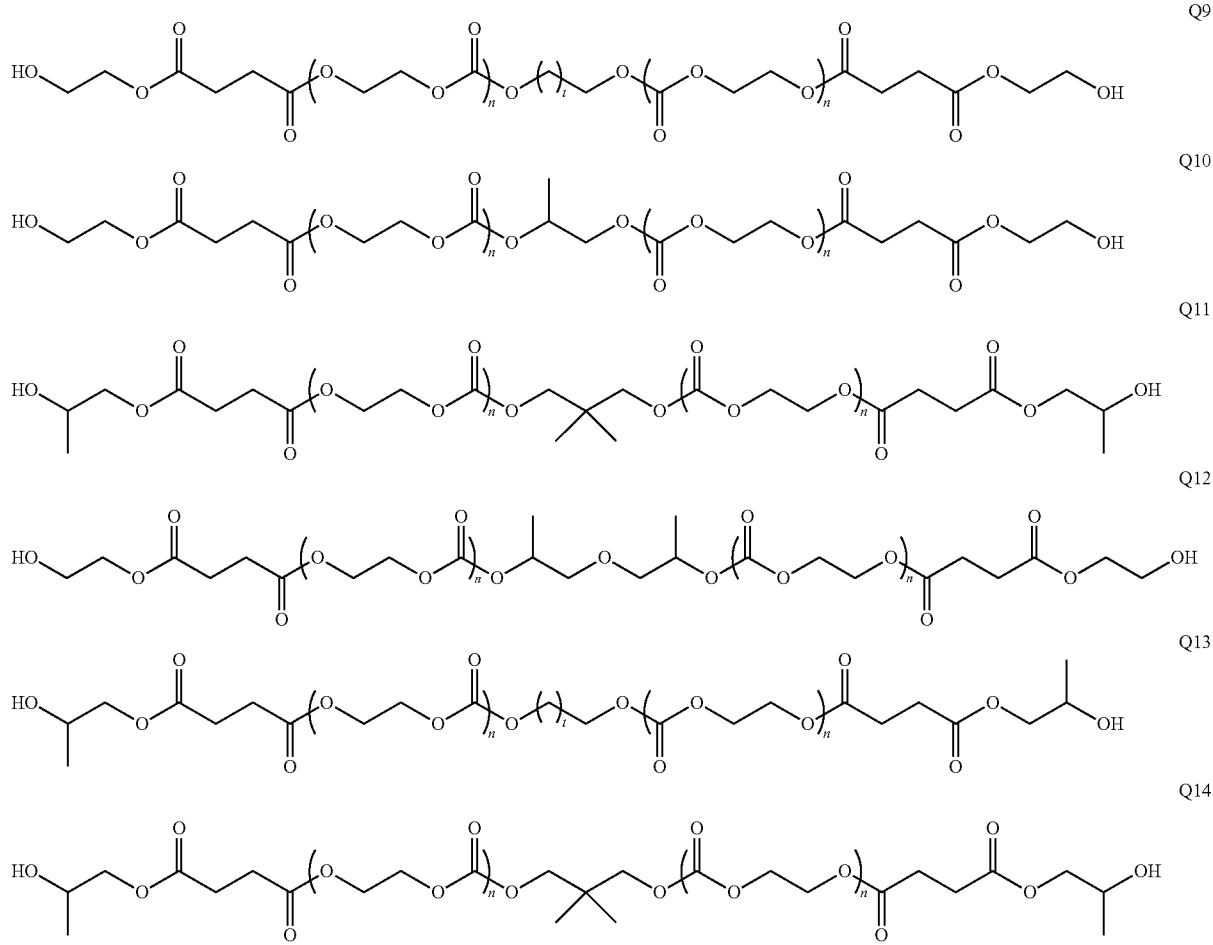

wherein each n is, on average in the composition, within a range from about 2 to about 200, and t is from 0 to 10.

34. The composition of claim 33, wherein the composition comprises:
Poly(ethylene carbonate) of any of formulae Q9 through Q14 having an average molecular weight number of between about 500 g/mol and about 3,000 g/mol (e.g. each n is between about 4 and about 16), a polydisperisty index less than about 1.25, at least 95% carbonate linkages, and at least 98% —OH end groups;
Poly(ethylene carbonate) of any of formulae Q9 through Q14 having an average molecular weight number of about 500 g/mol (e.g. n is on average between about 4 and about 5), a polydisperisty index less than about 1.25, at least 85% carbonate linkages, and at least 98% —OH end groups;

Poly(ethylene carbonate) of any of formulae Q9 through Q14 having an average molecular weight number of about 1,000 g/mol (e.g. n is on average between about 4 and about 5), a polydisperisty index less than about 1.25, at least 85% carbonate linkages, and at least 98% —OH end groups;

Poly(ethylene carbonate) of any of formulae Q9 through Q14 having an average molecular weight number of about 2,000 g/mol (e.g. n is on average between about 10 and about 11), a polydisperisty index less than about 1.25, at least 85% carbonate linkages, and at least 98% —OH end groups; or Poly(ethylene carbonate) of any of formulae Q9 through Q14 having an average molecular weight number of about 3,000 g/mol (e.g. n is on average between about 15 and about 17), a polydisperisty index less than about 1.25, at least 85% carbonate linkages, and at least 98% —OH end groups.

35. The composition of claim 16, comprising an aliphatic polycarbonate polyol represented by the formula:

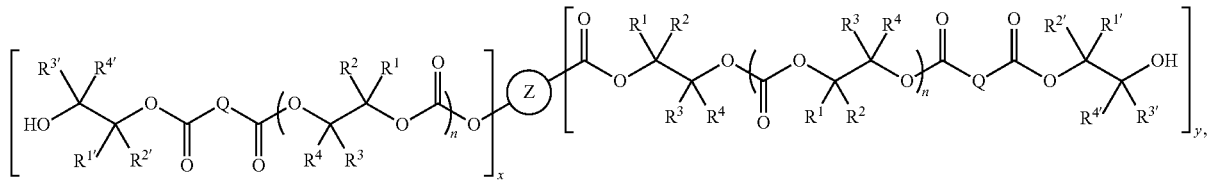

Q3

36. An aliphatic epoxide-$CO_2$ based polycarbonate polyol composition comprising polymer chains of formula P1:

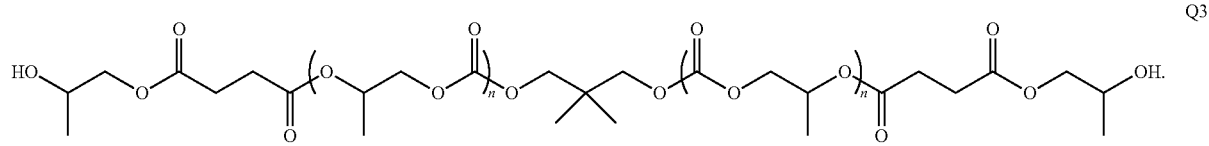

P1 wherein:

Ⓩ is a multivalent moiety;

$R^1$, $R^2$, $R^3$, and $R^4$ are at each occurrence, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms;

$R^{1'}$, $R^{2'}$, $R^{3'}$, and $R^{4'}$ are at each occurrence, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^{1'}$, $R^{2'}$, $R^{3'}$ and $R^{4'}$ may optionally be taken together with intervening atoms to form one or more optionally substituted rings optionally containing one or more heteroatoms;

each n is independently, on average in the composition, within a range from about 2 to about 200;

Q is an optionally substituted bivalent moiety; and x and y are each independently an integer from 0 to 6, where the sum of x and y is between 2 and 6.

37. The composition of claim 36, wherein Ⓩ comprises one or more atoms selected from the group consisting of carbon, nitrogen, phosphorus, sulfur, and boron.

38. The composition of claim 36, wherein Ⓩ comprises one or more carbon atoms.

39. The composition of claim 36, wherein Ⓩ is:

40. The composition of claim 36, wherein Ⓩ is derived from a polyfunctional chain transfer agent.

41. The composition of claim 36, wherein the moiety

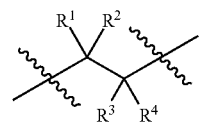

is at each occurrence in the aliphatic polycarbonate chains independently selected from the group consisting of:

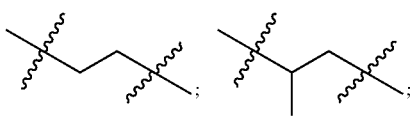

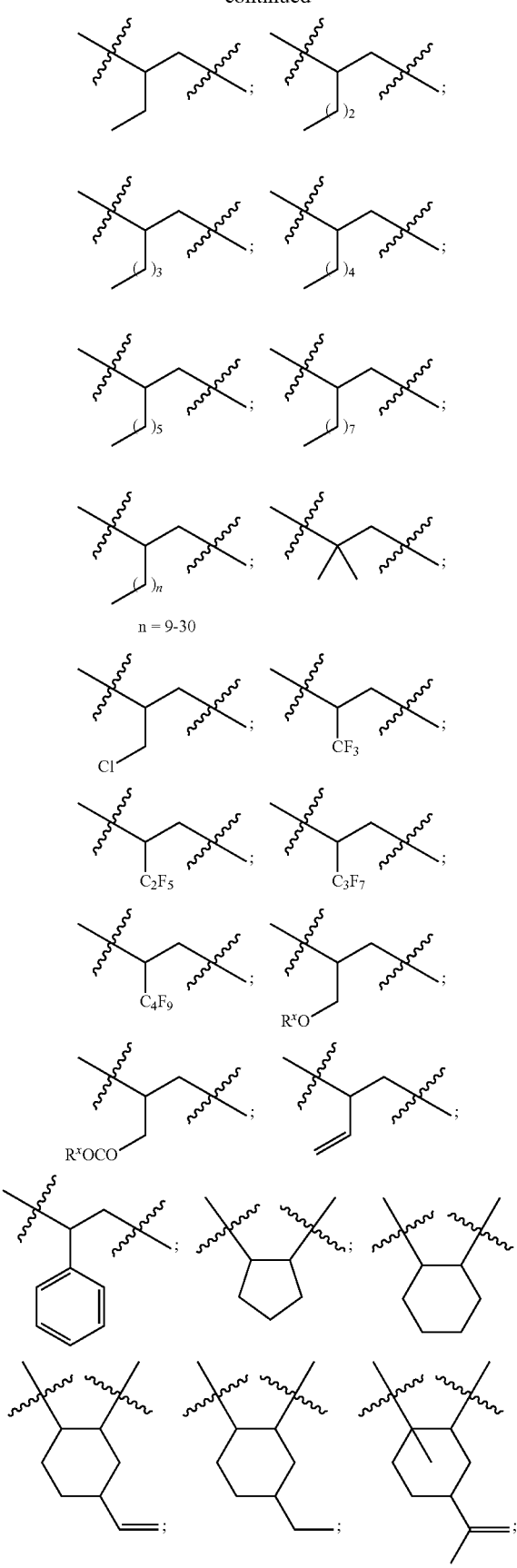

n = 9-30

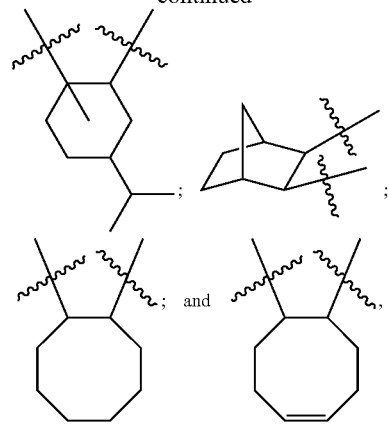

wherein each $R^x$ is independently selected from the group consisting of: optionally substituted aliphatic, optionally substituted heteroaliphatic, optionally substituted aryl and optionally substituted heteroaryl.

42. The composition of claim 36, wherein the moiety

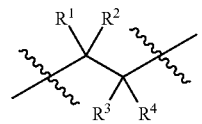

at each occurrence in the aliphatic polycarbonate chains is independently selected from the group consisting of:

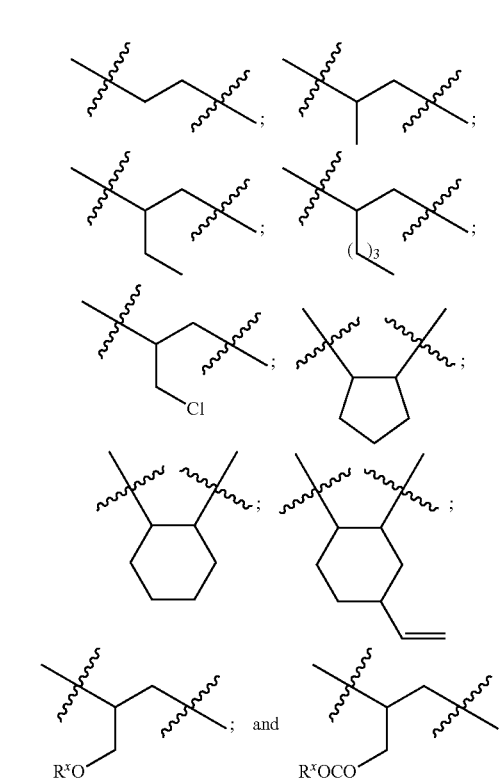

wherein each $R^x$ is independently selected from the group consisting of: optionally substituted aliphatic, optionally substituted heteroaliphatic, optionally substituted aryl and optionally substituted heteroaryl.

43. The composition of claim 36, wherein the moiety

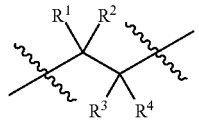

at each occurrence in the aliphatic polycarbonate chains is

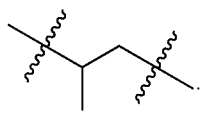 [SMILES: *CC(*)C]

44. The composition of claim 36, wherein Q is an optionally substituted bivalent moiety selected from the group consisting of:

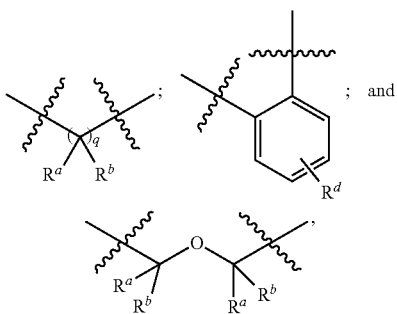

where $R^a$ and $R^b$ are each independently selected from the group consisting of: —H, halogen, optionally substituted $C_{1-8}$ aliphatic, and optionally substituted $C_{1-8}$ heteroaliphatic, where two or more $R^a$ and/or $R^b$ groups (whether on the same or different carbon atoms) may be taken together with intervening atoms to form one or more optionally substituted, optionally unsaturated rings, optionally containing one or more heteroatoms, and where two $R^a$ and $R^b$ groups on the same carbon atom or on adjacent carbon atoms may optionally be taken together to form an alkene or, if on the same carbon atom, an oxo group;

q is an integer from 1 to 10; and $R^d$ is optionally present, and if present are, independently at each occurrence selected from the group consisting of: halogen, —OR, —NR$_2$, —SR, —CN, —NO$_2$, —SO$_2$R, —SOR, —SO$_2$NR$_2$, —CNO, —NRSO$_2$R, —NCO, —N$_3$, —SiR$_3$; or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6-10-membered aryl; 5-10-membered heteroaryl having 1-4 heteroatoms independently selected from nitrogen, oxygen, or sulfur; and 4-7-membered heterocyclic having 1-2 heteroatoms independently selected from the group consisting of nitrogen, oxygen, and sulfur; and R is independently hydrogen, an optionally substituted $C_{1-20}$ aliphatic group, or an optionally substituted aryl group.

45. The composition of claim 36, wherein Q is an optionally substituted bivalent moiety selected from the group consisting of:

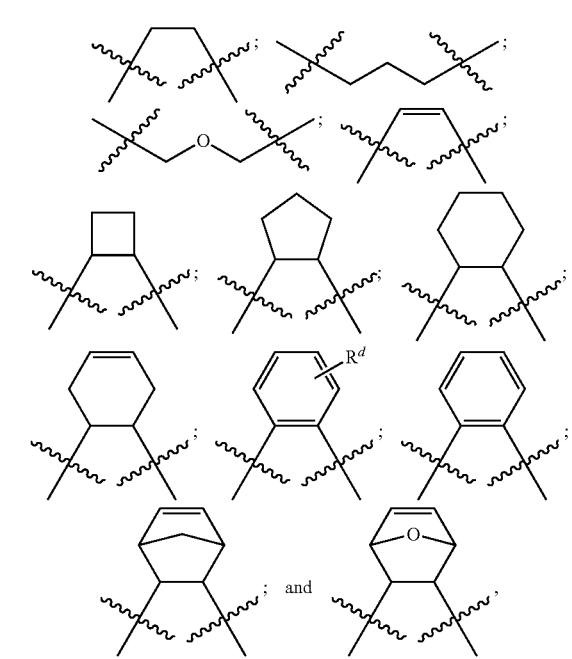

where $R^d$ is independently at each occurrence selected from the group consisting of: halogen, —OR, —NR$_2$, —SR, —CN, —NO$_2$, —SO$_2$R, —SOR, —SO$_2$NR$_2$, —CNO, —NRSO$_2$R, —NCO, —N$_3$, —SiR$_3$; or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6-10-membered aryl; 5-10-membered heteroaryl having 1-4 heteroatoms independently selected from nitrogen, oxygen, or sulfur; and 4-7-membered heterocyclic having 1-2 heteroatoms independently selected from the group consisting of nitrogen, oxygen, and sulfur; and R is independently hydrogen, an optionally substituted $C_{1-20}$ aliphatic group, or an optionally substituted aryl group.

46. The composition of claim 36, wherein Q is:

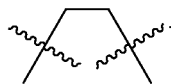 [SMILES: *CC*]

47. The composition of claim 36, wherein Q is:

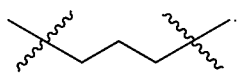 [SMILES: *CCC*]

48. The composition of claim 36, wherein:

$R^{3'}$ is selected from the group consisting of an optionally substituted $C_{1-40}$ aliphatic group, an optionally substituted $C_{1-20}$ heteroaliphatic group, and an optionally substituted aryl group; and $R^{1'}$, $R^{2'}$, and $R^{4'}$ are at each occurrence, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^{1'}$, $R^{2'}$, $R^{3'}$ and $R^{4'}$ may optionally be taken together with intervening atoms to form one or more optionally substituted rings optionally containing one or more heteroatoms.

49. The composition of claim 36, wherein the moiety

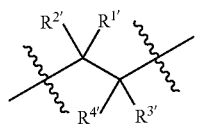

at each occurrence in the aliphatic polycarbonate chains is:

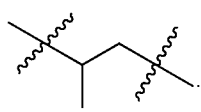 [SMILES: *CC(*)C]

50. The composition of claim 36, wherein the moiety

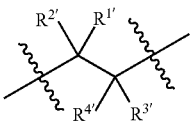

at each occurrence in the aliphatic polycarbonate chains is:

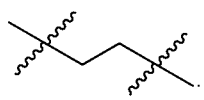 [SMILES: *CC*]

51. The composition of claim 36, comprising an aliphatic polycarbonate polyol selected from the group consisting of Q1, Q2, Q3, Q4, Q5, Q6, Q7, Q8, and mixtures of any two or more of these:

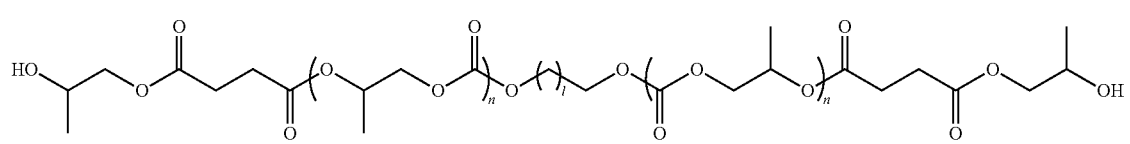

Q1

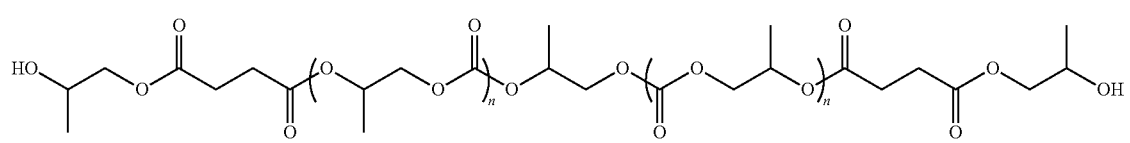

Q2

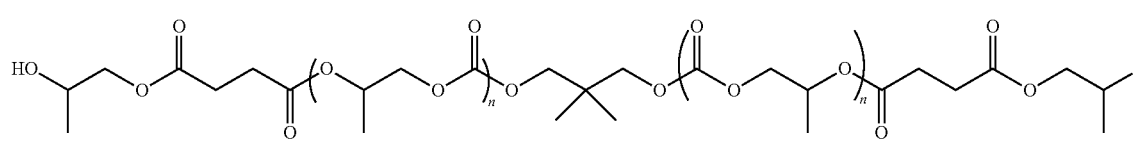

Q3

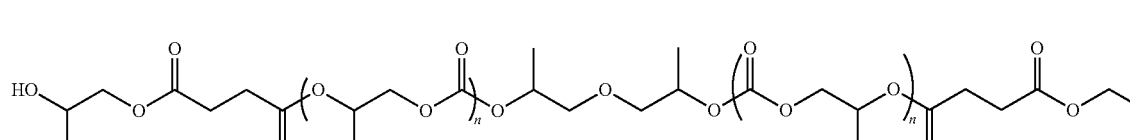

Q4

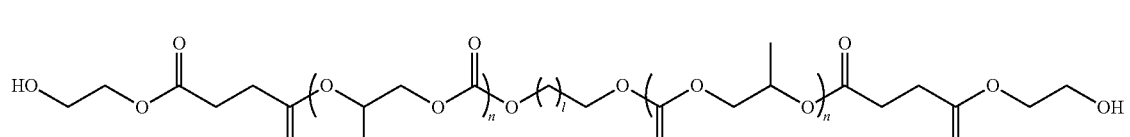

Q5

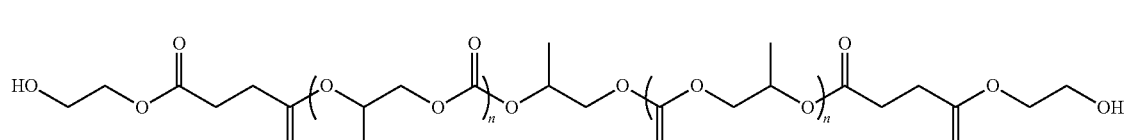

Q6

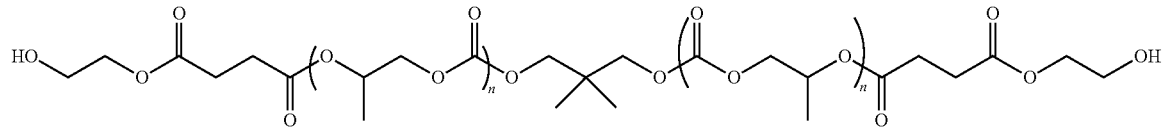

Q7

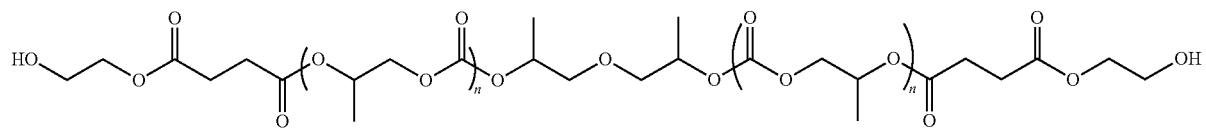

Q8 wherein each n is, on average in the composition, within a range from about 2 to about 200, and t is from 0 to 10.

52. The composition of claim 51, wherein the composition comprises:
Poly(propylene carbonate) of any of formulae Q1 through Q8 having an average molecular weight number of between about 500 g/mol and about 3,000 g/mol (e.g. each n is between about 3 and about 15), a polydisperisty index less than about 1.25, at least 95% carbonate linkages, and at least 98% —OH end groups;
Poly(propylene carbonate) of any of formulae Q1 through Q8 having an average molecular weight number of about 500 g/mol (e.g. n is on average between about 3.5 and about 4.5), a polydisperisty index less than about 1.25, at least 95% carbonate linkages, and at least 98% —OH end groups;
Poly(propylene carbonate) of any of formulae Q1 through Q8 having an average molecular weight number of about 1,000 g/mol (e.g. n is on average between about 3.5 and about 4.5), a polydisperisty index less than about 1.25, at least 95% carbonate linkages, and at least 98% —OH end groups;
Poly(propylene carbonate) of any of formulae Q1 through Q8 having an average molecular weight number of about 2,000 g/mol (e.g. n is on average between about 8 and about 9.5), a polydisperisty index less than about 1.25, at least 95% carbonate linkages, and at least 98% —OH end groups; or
Poly(propylene carbonate) of any of formulae Q1 through Q8 having an average molecular weight number of about 3,000 g/mol (e.g. n is on average between about 13 and about 15), a polydisperisty index less than about 1.25, at least 95% carbonate linkages, and at least 98% —OH end groups.

53. The composition of claim 36, comprising an aliphatic polycarbonate polyol selected from the group consisting of Q9, Q10, Q11, Q12, Q13, Q14, and mixtures of any two or more of these:

Q9

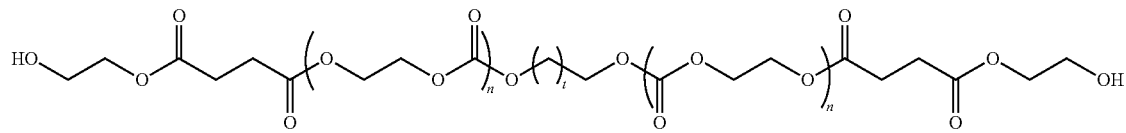

Q10

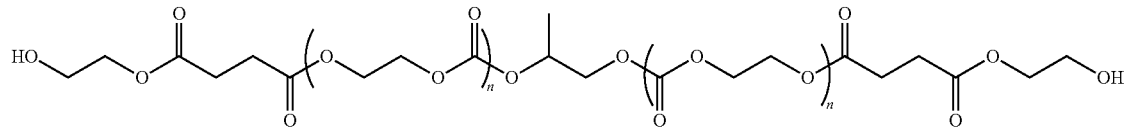

Q11

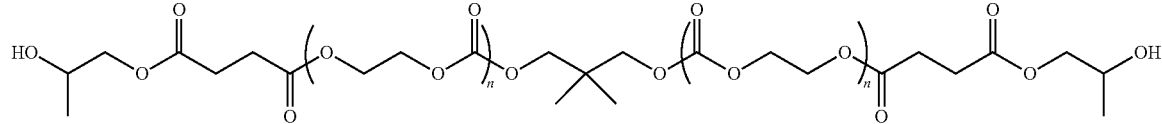

Q12

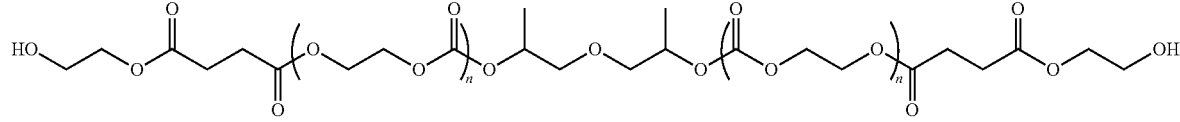

Q13

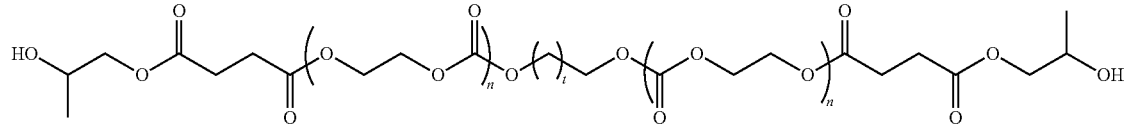

Q14

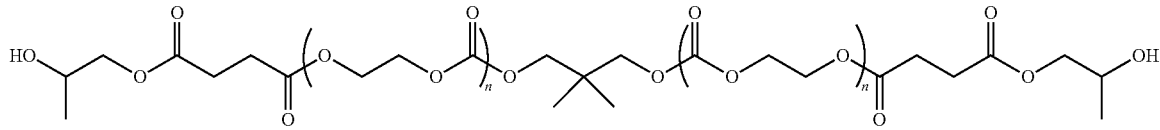

wherein each n is, on average in the composition, within a range from about 2 to about 200, and t is from 0 to 10.

54. The composition of claim 53, wherein the composition comprises:
Poly(ethylene carbonate) of any of formulae Q9 through Q14 having an average molecular weight number of between about 500 g/mol and about 3,000 g/mol (e.g. each n is between about 4 and about 16), a polydisperisty index less than about 1.25, at least 95% carbonate linkages, and at least 98% —OH end groups;
Poly(ethylene carbonate) of any of formulae Q9 through Q14 having an average molecular weight number of about 500 g/mol (e.g. n is on average between about 4 and about 5), a polydisperisty index less than about 1.25, at least 85% carbonate linkages, and at least 98% —OH end groups;
Poly(ethylene carbonate) of any of formulae Q9 through Q14 having an average molecular weight number of about 1,000 g/mol (e.g. n is on average between about 4 and about 5), a polydisperisty index less than about 1.25, at least 85% carbonate linkages, and at least 98% —OH end groups;
Poly(ethylene carbonate) of any of formulae Q9 through Q14 having an average molecular weight number of about 2,000 g/mol (e.g. n is on average between about 10 and about 11), a polydisperisty index less than about 1.25, at least 85% carbonate linkages, and at least 98% —OH end groups; or
Poly(ethylene carbonate) of any of formulae Q9 through Q14 having an average molecular weight number of about 3,000 g/mol (e.g. n is on average between about 15 and about 17), a polydisperisty index less than about 1.25, at least 85% carbonate linkages, and at least 98% —OH end groups.

55. The composition of claim 36, comprising an aliphatic polycarbonate polyol represented by the formula:

Q3

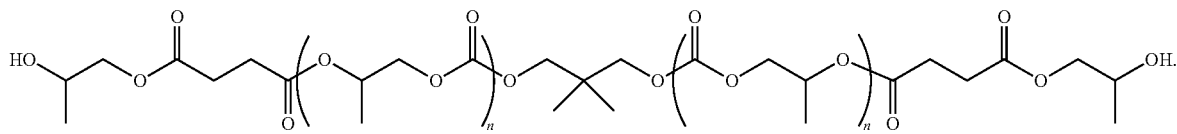

* * * * *